US012692927B2

(12) United States Patent
Reinbold et al.

(10) Patent No.: US 12,692,927 B2
(45) Date of Patent: Jul. 28, 2026

(54) SHIFTING BICYCLE CHAIN HAVING UNIFORM OFFSET CHAIN LINKS, AND CHAIN WHEEL ASSEMBLY COOPERATING THEREWITH

(71) Applicant: SRAM DEUTSCHLAND GmbH, Schweinfurt (DE)

(72) Inventors: Matthias Reinbold, Wuerzburg (DE); Sebastian Andres, Baiersdorf (DE); Pedro Miguel Nunes dos Santos, Coimbra (PT); Luis Miguel Mendes Figueiredo, Antanhol (PT); Joao Carlos Miquelao Santos, Vila Franca de Xira (PT)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 0 days.

(21) Appl. No.: 18/956,650

(22) Filed: Nov. 22, 2024

(65) Prior Publication Data

US 2025/0172193 A1      May 29, 2025

(30) Foreign Application Priority Data

Nov. 24, 2023   (DE) ..................... 10 2023 132 911.1
Oct. 2, 2024    (DE) ..................... 10 2024 128 669.5

(51) Int. Cl.
| | |
|---|---|
| *F16G 13/06* | (2006.01) |
| *B62M 9/00* | (2006.01) |
| *B62M 9/10* | (2006.01) |

(52) U.S. Cl.
CPC ............... *F16G 13/06* (2013.01); *B62M 9/10* (2013.01); *B62M 2009/005* (2013.01)

(58) Field of Classification Search
CPC .......... F16G 13/06; F16G 13/07; F16G 15/12; F16G 15/14; B62M 2009/005; B62M 9/10; B62M 9/12
See application file for complete search history.

(56) References Cited

U.S. PATENT DOCUMENTS

| | | | | | |
|---|---|---|---|---|---|
| 237,771 | A | * | 2/1881 | Paine ..................... | F16G 13/02 474/227 |
| 282,536 | A | * | 8/1883 | Legg ...................... | F16G 13/02 474/227 |
| 758,913 | A | * | 5/1904 | Hampton ................ | F16G 13/02 474/227 |
| 1,027,352 | A | * | 5/1912 | Morse ..................... | F16G 13/04 474/215 |
| 1,568,116 | A | * | 1/1926 | Webb ..................... | F16G 13/07 474/227 |

(Continued)

FOREIGN PATENT DOCUMENTS

| | | |
|---|---|---|
| CN | 210218555 U | 3/2020 |
| DE | 102018106600 | 10/2018 |

*Primary Examiner* — Henry Y Liu

(57) ABSTRACT

A bicycle chain having a plurality of chain links, the chain plates of which are formed and arranged in an offset manner along a longitudinal chain path such that each chain link has a wider longitudinal end, along the transverse chain axis, with a larger link width and a narrower longitudinal end, opposite the wider longitudinal end along the longitudinal chain path, with a smaller link width, is designed for shifting between two coaxial chain wheels that are adjacent along the transverse chain axis.

24 Claims, 19 Drawing Sheets

(56) References Cited

U.S. PATENT DOCUMENTS

| | | | | |
|---|---|---|---|---|
| 2,199,292 A * | 4/1940 | Pierce | F16H 7/06 | 305/198 |
| 2,687,651 A * | 8/1954 | Webb | F16G 13/07 | 474/227 |
| 3,332,297 A * | 7/1967 | Morse | F16G 13/06 | 474/148 |
| 3,334,726 A * | 8/1967 | Fredriksons | F16G 13/12 | 198/852 |
| 3,344,677 A * | 10/1967 | Morse | F16G 13/06 | 474/148 |
| 3,754,477 A * | 8/1973 | Bonifas | F16G 13/07 | 474/230 |
| 3,768,631 A * | 10/1973 | Wahren | B65G 17/086 | 198/840 |
| 4,050,323 A * | 9/1977 | l'Anson | F16G 13/07 | 198/853 |
| 4,895,248 A * | 1/1990 | Wahren | B65G 17/086 | 198/852 |
| 4,960,403 A * | 10/1990 | Nagano | F16G 13/06 | 474/227 |
| 5,437,148 A * | 8/1995 | Karp | F16G 13/06 | 59/5 |
| 5,520,585 A * | 5/1996 | Green | B62M 9/105 | 474/206 |
| 5,803,236 A * | 9/1998 | Wahren | F16G 13/10 | 198/852 |
| 6,173,832 B1 * | 1/2001 | Cockayne | B65G 17/086 | 198/852 |
| 6,209,716 B1 * | 4/2001 | Bogle | B65G 17/385 | 198/852 |
| 6,250,459 B1 * | 6/2001 | Coen | F16G 13/10 | 198/852 |
| 6,340,338 B1 * | 1/2002 | Kamada | B62M 9/122 | 474/160 |
| 6,640,534 B1 * | 11/2003 | Harn | F16G 13/06 | 59/8 |
| 7,427,251 B2 * | 9/2008 | Reiter | F16G 13/06 | 59/5 |
| 8,882,619 B2 * | 11/2014 | Braedt | F16H 7/06 | 474/156 |
| 9,890,830 B2 * | 2/2018 | Wu | F16G 15/00 | |
| 10,190,659 B2 * | 1/2019 | Fukumori | B62M 9/00 | |
| 10,435,112 B2 | 10/2019 | Tetsuka | | |
| 10,919,604 B2 * | 2/2021 | Reineke | B62M 9/10 | |
| 11,466,754 B2 * | 10/2022 | Wang | B62M 9/04 | |
| 11,845,514 B2 * | 12/2023 | Buechner | B62M 9/04 | |
| 11,912,373 B2 * | 2/2024 | Vonend | F16H 7/00 | |
| 11,919,606 B2 * | 3/2024 | Braedt | B62M 9/12 | |
| 12,024,264 B2 * | 7/2024 | Heyna | B62M 9/16 | |
| 12,246,796 B2 * | 3/2025 | Simpson | F16G 13/04 | |
| 12,377,935 B2 * | 8/2025 | Buechner | B62M 9/10 | |
| 2002/0173395 A1 * | 11/2002 | Reiter | F16G 13/06 | 474/230 |
| 2005/0266948 A1 | 12/2005 | Anderson | | |
| 2006/0194664 A1 * | 8/2006 | Wang | F16G 13/06 | 474/209 |
| 2006/0205550 A1 * | 9/2006 | Anderson | B62M 9/00 | 474/230 |
| 2007/0213155 A1 * | 9/2007 | Reiter | B62M 9/10 | 474/160 |
| 2011/0098146 A1 * | 4/2011 | Ghaffarkhan | F16G 13/07 | 474/233 |
| 2013/0072334 A1 * | 3/2013 | Braedt | F16H 7/06 | 474/156 |
| 2015/0292597 A1 * | 10/2015 | Fukumori | F16G 13/06 | 474/226 |
| 2019/0061875 A1 * | 2/2019 | Reineke | B62M 9/132 | |
| 2021/0079980 A1 * | 3/2021 | Wang | B62M 9/06 | |
| 2021/0261218 A1 * | 8/2021 | Vonend | B62M 9/10 | |
| 2022/0126949 A1 * | 4/2022 | Braedt | F16H 55/30 | |
| 2022/0169337 A1 * | 6/2022 | Buechner | B62M 9/04 | |
| 2022/0306241 A1 * | 9/2022 | Heyna | B62M 9/126 | |
| 2023/0023623 A1 * | 1/2023 | Simpson | B62M 9/105 | |
| 2023/0108196 A1 * | 4/2023 | Shahana | B62M 9/132 | 701/58 |
| 2024/0067300 A1 * | 2/2024 | Buechner | B62M 9/12 | |

* cited by examiner

SHIFTING BICYCLE CHAIN HAVING UNIFORM OFFSET CHAIN LINKS, AND CHAIN WHEEL ASSEMBLY COOPERATING THEREWITH

This application claims the benefit of German Patent Application No. 10 2023 132 911.1, filed Nov. 24, 2023, and German Patent Application 10 2024 128 669.5, filed Oct. 2, 2024, which are hereby incorporated by reference in their entirety.

BACKGROUND

Bicycle chains having inner and outer plates that follow one another alternately along the longitudinal chain path are known. These conventional bicycle chains are characterized by their excellent shifting capability between coaxial chain wheels. This shifting capability arises substantially from the construction of conventional bicycle chains, in which outer plate chain links have a tooth engagement space with a larger clear inner chain link width and thus, when the bicycle chain is shifted to a target chain wheel, allow the initial engagement of a tooth of the target chain wheel particularly readily, while inner plate chain links have a tooth engagement space with a smaller clear inner chain link width and have, above all, a smaller outer chain link width, such that, when the bicycle chain is shifted to a target chain wheel, on account of the longitudinal spacing between two outer plates that follow one another along the longitudinal chain path, they allow axial approaching of the sprocket of the target chain wheel. Although no engagement of a tooth of the target chain wheel in the inner plate chain link occurs in the process, initial "catching" engagement of a tooth of the target chain wheel in the outer plate chain link that has axially approached the tooth in such a way is made much easier.

Such a bicycle chain, which is formed for the most part from identical chain links, is known for example in the form of a low-lubrication bicycle chain from U.S. Pat. No. 3,332,297 and from the related U.S. Pat. No. 3,344,677. Both documents disclose, as the smaller of two gear wheels around which the prior art chain circulates, one with seven teeth.

The chain plates of a chain link of the known bicycle chain are mutually parallel in the two longitudinal end regions. Between the wider and the narrower longitudinal end region, a narrowing portion is formed, in which the clear inner chain link width, to be measured along the transverse chain axis between the mutually facing inner sides of the chain plates or chain plate inner surfaces, is reduced from the larger clear chain link width in the wider longitudinal end region, along the longitudinal chain path, to the smaller clear chain link width in the narrower longitudinal end region. The narrowing portion of the chain plates, when the tooth engaging in chain links of the known chain is considered, is located approximately in the longitudinal middle of the tooth.

A roller chain which is structurally similar but is disclosed without any reference to use on a bicycle is known from U.S. Pat. No. 9,890,830 B2. On the chain known from U.S. Pat. No. 9,890,830 B2, too, the narrower longitudinal end region of a chain link extends, along the longitudinal chain path, deep into the tooth engagement space.

FIG. 27 of U.S. Pat. No. 10,435,112 B2 shows, singularly, a modified bicycle chain which substantially corresponds structurally to the above-described bicycle chains.

A further bicycle chain with offset chain links is known from US 2005/0266-948 A1. These bicycle chains disclose that the spacing between two immediately successive roller axes, i.e. basically the chain pitch, forms the minimum increment of the chain length, while conventional bicycle chains with inner plates and outer plates that follow one another alternately can be shortened or lengthened only by twice the spacing, i.e. by twice the chain pitch, as minimum increment value.

Finally, a bicycle chain having identical offset chain links is known from US 2011/0098146 A1, which discloses that the chain plates of a chain link are formed as portions of an integrally cohesive bending component.

SUMMARY

What is disclosed is a bicycle chain, also referred to as "chain" for short below, having a plurality of chain links that follow one another along a virtual longitudinal chain path, wherein chain links that immediately follow one another along the longitudinal chain path are pivotable relative to one another about mutually parallel virtual pivot axes, wherein the pivot axes extend along a virtual transverse chain axis oriented transversely to the longitudinal chain path, wherein the two pivot axes of a chain link that are spaced apart from one another along the longitudinal chain path define a virtual reference plane, containing the pivot axes, for the chain link, wherein each chain link has two flat chain plates that are formed separately from one another and are located opposite one another along the transverse chain axis, wherein the chain plates have their greatest dimensions along the longitudinal chain path and along a vertical chain axis that extends both transversely to the longitudinal chain path and transversely to the transverse chain axis, wherein the chain plates are formed and arranged in an offset manner along the longitudinal chain path such that each chain link has a wider longitudinal end, along the transverse chain axis, with a larger link width and a narrower longitudinal end, opposite the wider longitudinal end along the longitudinal chain path, with a smaller link width, wherein a chain roller is accommodated between the chain plates in a narrower longitudinal end region located closer to the narrower longitudinal end than to the wider longitudinal end, wherein, for chain links that follow one another along the longitudinal chain path, it is the case that in each case a narrower longitudinal end region of a chain link projects into a wider longitudinal end region, located closer to the wider longitudinal end than to the narrower longitudinal end, of a chain link that is immediately adjacent along the longitudinal chain path, such that the bicycle chain has chain rollers following one another along the longitudinal chain path that are arranged between chain plates of one and the same chain link once in the narrower longitudinal end region thereof and once more in the wider longitudinal end region thereof such that the chain plates of a chain link, together with the two chain rollers arranged between them, enclose a tooth engagement space for the engagement of a tooth of a chain wheel assembly.

Figure 1:
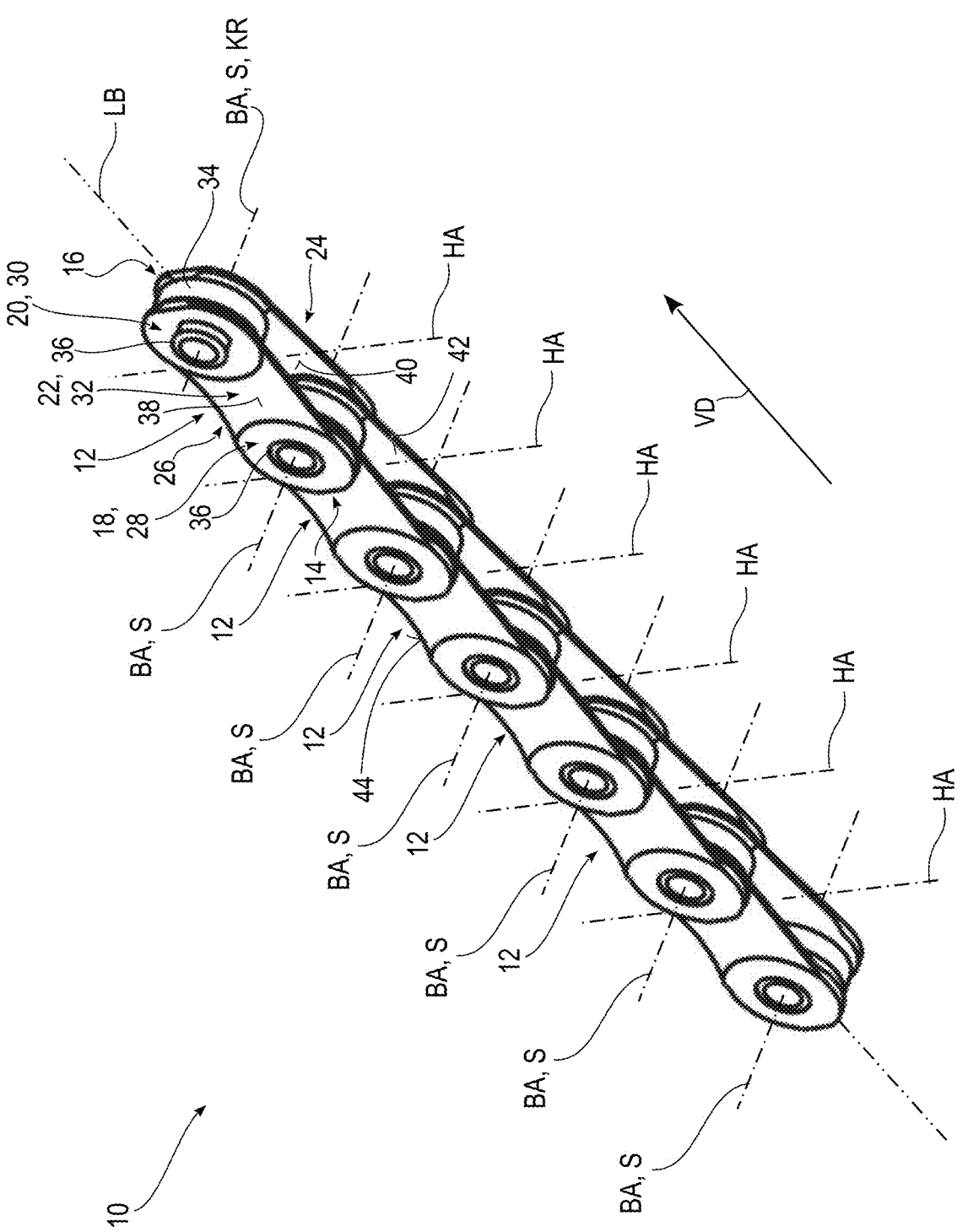
FIG. 1 is a perspective, schematic view of one embodiment of a bicycle chain on the side with the rectilinear edge of the chain plates.

The figures are not true to scale. For greater clarity, not all modules and components of identical design are each provided with reference signs in FIGS. 1 to 15.

DETAILED DESCRIPTION

Since, on bicycle chains of the type mentioned at the beginning, the chain links of which, possibly apart from a chain link that serves as a chain lock, have a substantially identical construction, the tooth engagement space of chain links that follow one another along the longitudinal chain path likewise has an identical construction, the features, known from conventional bicycle chains, that facilitate shifting, such as providing outer plate and inner plate chain links that follow one another alternately along the longitudinal chain path, are not present and not usable on bicycle chains of the type mentioned at the beginning.

The present disclosure addresses the problem of improving the bicycle chain mentioned at the beginning and to make it usable in a functional scope comparable with conventional bicycle chains.

Fundamentally, the present disclosure solves this problem on a bicycle chain of the type mentioned at the beginning in that the bicycle chain is designed for shifting between two coaxial chain wheels that are adjacent along the transverse chain axis.

This configuration is explained in the following text using different aspects of the bicycle chain discussed herein.

In principle, it is sufficient for the three coordinates that are used to describe the bicycle chain: longitudinal chain path, transverse chain axis and vertical chain axis, to extend transversely to one another in pairs in each case. As a rule, the abovementioned coordinates define a Cartesian coordinate system, in which the longitudinal chain path, the transverse chain axis and the vertical chain axis ore oriented orthogonally to one another locally in pairs.

The bicycle chain may, although it is unusable for driving operation, but is readily identifiable as a bicycle chain, be in the form of an open bicycle chain or as an operational bicycle chain that circulates in a closed manner. In the case of the bicycle chain that circulates in a closed manner, the bicycle chain is generally curved around an axis of curvature parallel to the transverse chain axis. As a result, the transverse chain axis exhibits the same spatial direction for all chain links, but the longitudinal chain path has or may have a different spatial orientation depending on its location along the bicycle chain on account of the locally different chain curvature. The longitudinal chain path always extends transversely (or orthogonally) to the transverse chain axis, however. Since the vertical chain axis is oriented transversely (or orthogonally) both to the transverse chain axis and to the longitudinal chain path, the absolute orientation of the vertical chain axis in space is also dependent on the location of viewing of the bicycle chain along the longitudinal chain path.

In the case of a bicycle chain engaged with a chain wheel, the vertical chain axis extends, in the engagement region with the chain wheel, generally in the radial direction with respect to the axis of rotation of the engaging chain wheel, and the longitudinal chain path extends, in the engagement region with the chain wheel, circumferentially about the axis of rotation thereof, or tangentially thereto.

In the present application, the term "chain wheel" is used as an umbrella term for a gear wheel designed for meshing engagement with the bicycle chain. In a bicycle drive assembly, at least one front chainring coupled directly to cranks, and at least one rear pinion connected to the coaxially arranged rear wheel for torque transmission are usually present as chain wheels.

Unless stated otherwise, the indications "axial", "radial", "along a circumferential path about" in the present application relate to an assembly axis of a chain wheel assembly engaged with the chain.

To provide or improve the shifting capability of the bicycle chain discussed herein by shifting between two coaxial chain wheels, the bicycle chain may be configured such that, for a plurality of the chain links, or in another embodiment all the chain links, it is the case that each chain plate of a chain link has a first offset region located closer to the wider longitudinal end and a second offset region located closer to the narrower longitudinal end. Similarly to the prior art, these offset regions have the effect that the narrower longitudinal end region transitions, along the longitudinal chain path, into the wider longitudinal end region, and vice versa.

In this case, the clear inner chain link width to be measured between the chain plates along the transverse chain axis decreases on progressing along the longitudinal chain path from the first to the second offset region. In an embodiment, a clear inner chain link width changes, on progressing along the longitudinal chain path, only between a first and a second offset region, while a mutually facing inner surfaces of the two longitudinal end regions: narrower longitudinal end region and wider longitudinal end region, are formed parallel to one another. The length region between the first and the second offset region thus forms a narrowing portion of the chain link.

If, however, the clear inner chain link width also changes in the region of the narrower longitudinal end region and/or of the wider longitudinal end region on progressing along the longitudinal chain path, the change, in relation to a length unit along the longitudinal chain path, in the clear inner chain link width is greater in the length region between the first and the second offset region than in the narrower and/or in the wider longitudinal end region. The change, in relation to a length unit along the longitudinal chain path, in the clear inner chain link width can be understood as being a length gradient of the clear inner chain link width.

In principle, it is the case that the clear inner chain link width changes to a greater extent along the longitudinal chain path between the first and the second offset region than in the longitudinal region between the wider longitudinal end and the first offset region and/or between the narrower longitudinal end and the second offset region.

Since, in the present case, it is a matter of the length gradient of the clear inner chain link width, formations, not associated with the chain link width, on the inner side of chain plates, for example a collar formed on an inner side of a chain plate as a receptacle for a chain roller, are not taken into consideration when determining the clear inner chain link width. In another embodiment a collar is formed integrally on an inner side of a chain plate as a receptacle for a chain roller.

The statements given above in relation to the change in the clear inner chain link width of the plurality of chain links, or in another embodiment of all the chain links, on progressing along the longitudinal chain path apply, in the case of doubt, along the reference plane, also on both sides of the reference plane, or also over the entire chain link height to be measured along the vertical chain axis.

In order to give the bicycle chain leeway for a shifting operation at a chain wheel tooth engaging in said bicycle chain, or in a tooth engagement space, the spacing, at least in the chain plate inner surface, of the first and the second offset region of a chain plate from one another should differ from the radius of the chain rollers, at least in the virtual reference plane, by no more than 15% relative to the radius of the chain rollers. In another embodiment, a spacing, at least in a chain plate inner surface, of a first and a second offset region of a chain plate from one another differs from a radius of the chain rollers, at least in the virtual reference plane, by no more than 10% relative to the radius of the chain rollers. In yet another embodiment, a spacing, at least in a chain plate inner surface, of a first and a second offset region of a chain plate from one another differs from a radius of the chain rollers, at least in the virtual reference plane by no more than 7%, relative to the radius of the chain rollers. This generally ensures that a chain wheel tooth engaging in the tooth engagement space bears against a chain roller of the chain only with its load-bearing flank, while its opposite flank, facing away from the load-bearing flank, is arranged at a spacing from the chain roller located closest to it and is located opposite the latter. The abovementioned dimensional relationship applies for both chain plates of a chain link. The dimensional relationship likewise applies for a plurality, or all, of the chain links.

In another embodiment, chain plates have only a first and a second offset region and no further offset regions. Likewise, the clear inner chain link width and/or the external width dimension, to be measured along the transverse chain axis over the outer surfaces of the chain plates, of a chain link does not increase along the longitudinal chain path from the wider longitudinal end to the first offset region and/or from the second offset region to the narrower longitudinal end in at least one vertical portion along the vertical chain axis. Rather, the clear inner chain link width and/or the external width dimension of a chain link is either constant or decreases in said longitudinal portions along the longitudinal chain path in at least the vertical portion, over the entire chain height. This is the case in particular for the clear inner chain link width, without the abovementioned formations being taken into account. This is the case, as already stated above, for a plurality of the chain links, or for all the chain links.

The offset directions of the first and second offset region are, in an embodiment, opposite to one another to achieve the desired shape of a chain plate, i.e. when viewing an outer side of a chain plate along the transverse chain axis, a convex offset is formed in the first offset region and a concave offset is formed in the second offset region.

In contrast to conventional bicycle chains with outer plate chain links and inner plate chain links that follow one another alternately along the longitudinal chain path, the plurality of chain links, or all the chain links, of the above-discussed bicycle chain may have a substantially identical construction, and so it is not possible, in principle, to provide large and small tooth engagement spaces, of which the large tooth engagement spaces of the outer plate chain links make it easier for the target chain wheel to catch the chain and of which the inner plate chain links, with their small tooth engagement spaces, do allow secure meshing engagement with a chain wheel but otherwise, during a shifting operation, allow axial approaching of the target chain wheel in order to prepare for the catching of the chain at an outer plate chain link.

In order to create, for the above-discussed bicycle chain relative to a chain wheel tooth, axial leeway, in relation to the axis of rotation of the chain wheel bearing the chain wheel tooth, within the tooth engagement space, this being, as a rule, relative movement of a chain link relative to the chain wheel tooth along the transverse chain axis, according to an embodiment of the present disclosure, the tooth engagement space enclosed by the chain plates of a chain link along the transverse chain axis and by the two chain rollers, arranged between the chain plates of the chain link, along the longitudinal chain path, has a trapezoidal cross section in the reference plane as section plane. Of this trapezoidal cross section, the lateral surfaces of the chain rollers form the parallel trapezium sides and the chain plate inner surfaces that face one another along the transverse chain axis form the trapezium sides that are inclined towards one another. On the wider one of the two parallel trapezium sides, a longitudinal end of a chain plate is located on each respective side of the chain roller. The longitudinal ends of the chain plates are located, as described in more detail below, so close to the lateral surface of the chain roller along the longitudinal chain path that they lengthen, so to speak, the portion, formed by the chain roller lateral surface, of the wider one of the two parallel trapezium sides to the closest chain plate inner surfaces along the transverse chain axis. On the narrower one of the two parallel trapezium sides, at least in the reference plane, or also in further viewing planes that are parallel to the reference plane and spaced apart from the reference plane, on the mutually facing inner sides of the chain plates, the transition between the narrower longitudinal end region and the narrowing region along the longitudinal chain path is located, in an embodiment, at the location of the lateral surface of the chain roller located between the narrower longitudinal end region, or is at a distance of at least no more than 5%, or in another embodiment no more than 3%, of the radius of this chain roller from the lateral surface. As a result, the clear width between the chain plates increases, as far as possible directly, from the lateral surface of the chain roller of the chain link in the narrower longitudinal end region along the longitudinal chain path towards the chain roller, accommodated between the chain plates in the wider longitudinal end region of the chain link, of the following chain link.

On account of the offset shape of the chain link with a narrower and a wider longitudinal end, different local movement spaces of the bicycle chain or of a chain link, relative to a tooth engaging therein along the transverse chain axis at the two different tooth flanks: leading and trailing tooth flank, are almost unavoidable. As a result of the trapezoidal shape in the region of the reference plane, it is possible, however, for the chain link and thus the bicycle chain to be moved along the transverse chain axis in the region of at least one of the two tooth flanks of a chain wheel tooth engaging therein or to be pivoted about a pivot axis parallel to the vertical chain axis. The possibility of pivoting the bicycle chain about a pivot axis parallel to the vertical chain axis, that is to say a pivot axis parallel to the radial extension direction of the tooth engaging in the chain, means a possibility of pivoting the bicycle chain relative to the respective assembly planes of mutually adjacent coaxial sprockets and thus of arranging the chain in a connecting section which connects together two coaxial chain wheels of different sizes of a chain wheel assembly. This considerably increases the shifting readiness of the above-discussed bicycle chain.

According to a second embodiment of the present disclosure, the axial movement capacity, with respect to the axis of rotation of the chain wheel bearing the chain wheel tooth, within the tooth engagement space can be provided in that both the first offset region and the second offset region of a chain link are located, at least in the reference plane, closer to the narrower longitudinal end region than to the wider longitudinal end region of the chain link. In other words, both the first offset region and the second offset region of a chain link can be located, in the reference plane, closer to a chain roller axis passing through the narrower longitudinal end region than to a chain roller axis passing through the wider longitudinal end region. For this embodiment, too, it is the case that, at least in the reference plane, also in the abovementioned further parallel viewing planes, on the mutually facing inner sides of the chain plates, the transition between the narrower longitudinal end region and the narrowing region along the longitudinal chain path is located at the location of the lateral surface of the chain roller located between the narrower longitudinal end region, or is at a distance of at least no more than 5%, or in another embodiment no more than 3%, of the radius of this chain roller from the lateral surface.

The first offset region as the transition between the narrowing region and the wider longitudinal end region is located, on the mutually facing inner sides of the chain plates of the chain link of the second embodiment, at least in the reference plane, also in the abovementioned further viewing planes parallel to the reference plane, closer to the chain roller, located in the narrower longitudinal end region, of the chain link than to the chain roller, accommodated in the wider longitudinal end region, of the following chain roller along the longitudinal chain path. In this way, the narrowing region can be kept short, with the result that the tooth engagement space, at least in the reference plane, can have a clear width to be measured over at least 50%, or in another embodiment over at least 60%, of the spacing, to be measured along the longitudinal chain path, between the lateral surfaces of chain rollers that immediately follow one another, said clear width corresponding to the clear width between the chain plates in the wider longitudinal end region.

The two abovementioned embodiments of the chain links each provide a tooth engagement space with a larger cross-sectional area, compared with the prior art, in the reference plane, or even one with a greater volume. The guiding properties of a bicycle chain formed from such chain links are reduced compared with the offset bicycle chains known from the prior art cited at the beginning, this normally being undesired, but, in the case of the above-discussed bicycle chain with offset chain links, creating the shifting capability thereof between adjacent chain wheels by a derailleur.

An undesired restriction of the movement space of the bicycle chain relative to a chain wheel tooth engaging in the tooth engagement space of one of the chain links thereof can also be avoided in that the chain plates, at least in the reference plane, in particular in a height portion that contains the reference plane and extends along the vertical chain axis, and at least at the narrower longitudinal end, project beyond the chain roller, arranged there, along the longitudinal chain path by no more than 5% of the radius of the chain roller. The less the chain plates project beyond the chain roller along the longitudinal chain path, the less the chain plates project into the tooth engagement space and take up a region thereof. Available space that is already occupied by chain plates can no longer be occupied by a chain wheel tooth. The situation at the wider longitudinal end of a chain link corresponds, with regard to the projecting of the chain plates beyond the chain roller arranged in the wider longitudinal end region, to the situation of projecting beyond at the narrower longitudinal end. Since, however, in the case of the bicycle chain according to the disclosure, the narrower end regions of a chain link along the longitudinal chain path project into the wider longitudinal end regions of the immediately adjacent chain link, protrusion of the chain plates along the longitudinal chain path beyond the chain rollers at the narrower longitudinal end has a much greater influence on the design and the size of the tooth engagement space than protrusion of the chain plates beyond the chain rollers at the wider longitudinal end. The chain plates of a plurality of chain links, or in another embodiment of all the chain links, project, in a height portion extending along the vertical chain axis, in particular in such a height portion containing the reference plane, at the narrower longitudinal end, beyond the chain roller accommodated there, for the abovementioned reasons, by no more than 3%, more or in another embodiment not at all, i.e. the chain plates end flush with the chain roller.

In another embodiment, the chain plates remain, at least in the reference plane and at least at the narrower longitudinal end, at least partially behind the lateral surface of the chain roller accommodated in the narrower longitudinal end region. This means that the lateral surface of the chain roller then projects at least partially beyond an edge of the chain plate in the region of the narrower longitudinal end region. This is the case at least for the abovementioned height portion containing the reference plane. As a result, it is possible to ensure that force between a chain wheel tooth engaging in the tooth engagement space of a chain link and a narrower longitudinal end, delimiting the tooth engagement space, of a chain link is transmitted only by bearing engagement between the engaging tooth and the chain roller, but not by bearing engagement between the engaging tooth and an edge of the chain plate. This is particularly the case for the narrower longitudinal end of a chain link, which projects into a wider longitudinal end region of another chain link. This narrower longitudinal end delimits the tooth engagement region that follows the chain link with the narrower longitudinal end along the longitudinal chain path and is formed between the chain plates of the chain link with the wider longitudinal end region. In order for it to be possible to provide sufficient guidance for the rotary movement of the chain roller about its chain roller axis in the narrower longitudinal end region, the chain roller projects beyond the narrower longitudinal end of the chain plates bearing it at least in the abovementioned height portion by no more than 5% of the chain roller radius, optionally by no more than 3%.

Projecting of the chain roller beyond the chain plate longitudinal ends, or vice versa, with a degree of projection of no more than 5% of the chain roller radius is considered, within the meaning of the present application, to be so low that the longitudinal ends of the chain plates, in the reference plane, merely lengthen the lateral line of the lateral surface of the chain roller to form a trapezoidal cross section of the tooth engagement region.

For a shifting operation, the establishment of engagement of a chain wheel tooth of the target chain wheel, onto which the chain is intended to be shifted in the shifting operation, is paramount. In this case, it is useful for the chain wheel tooth of the target chain wheel to be supported, on moving into the tooth engagement space of a chain link, by the physical design of the chain link. Such support can be achieved structurally in that, for the chain plates of at least a plurality of the chain links, or in another embodiment of all the chain links, it is the case that a longitudinal spacing, to be measured along the longitudinal chain path, of the first and the second offset region of a chain plate from one another, at least in the chain plate inner surface, is greater in at least one virtual viewing plane parallel to the reference plane than in the reference plane. The viewing plane is located in this case, on account of its spacing from the reference plane which is defined by the pivot axis of chain links connected together in an articulated manner, closer to a longitudinal edge, extending along the longitudinal chain path, of the respective chain link than the reference plane. The first and the second offset region usually form, at least on the chain plate inner surfaces, a physical step or physical kink which also extends along the vertical chain axis and which can serve to guide a relative movement of the respective chain link along the vertical chain axis relative to a tooth entering the tooth engagement space thereof. As a result of the first and the second offset region being designed such that their spacing is greater in the outlined viewing plane than in the reference plane, the space between the steps or kinks formed by the offset regions can narrow from the longitudinal edge of the chain link towards the reference plane thereof, and act, so to speak, as an insertion aid for a tooth entering the tooth engagement space.

Ideally, the virtual pivot axes of chain links that immediately follow one another along the longitudinal chain path are also the virtual axes of rotation of the chain rollers arranged between the chain plates of a chain link.

In principle, it is sufficient for only one offset region, at least in a chain plate inner surface, to have a profile both with a component along the vertical chain axis and with a component along the longitudinal chain path, while the other offset region, as in the prior art, can extend substantially parallel to the vertical chain axis. However, the chain plates can provide a greater insertion aid when their two offset regions, at least in the chain plate inner surface, each have a component along the longitudinal chain path and a component along the vertical chain axis.

On account of the offsets leading to a narrower and a wider longitudinal end, the offset chain links may not be formed symmetrically with respect to a plane of symmetry orthogonal to the longitudinal chain path. To achieve good support for an insertion movement of a chain wheel tooth along the vertical chain axis into the tooth engagement space, it is possible, however, for at least the part, located in the chain plate inner surface of a chain plate, of the first and of the second offset region, when viewing a projection of the two offset regions along the transverse chain axis onto a projection plane orthogonal to the transverse chain axis, to be formed, in relation to the abovementioned plane of symmetry orthogonal to the longitudinal chain path, at least partially, or in another embodiment along a majority of the extension length of the abovementioned parts, or in yet another embodiment entirely in mirror-symmetric manner.

The bicycle chain is, in another embodiment, formed in a mirror-symmetric manner with respect to a plane of symmetry that is oriented orthogonally to the transverse chain axis.

The bicycle chain may also be formed in a mirror-symmetric manner with respect to the reference plane. This does not have to be the case, however. When the bicycle chain, or the chain links thereof, are not formed in a mirror-symmetric manner with respect to the reference plane and the bicycle chain, starting from its open stretched-out state is intended to form a functioning closed circulating bicycle chain only by way of a single possible closing movement, the viewing plane is, in another embodiment, located on that side of the reference plane that faces the radially inner edge of the closed circulating bicycle chain, since the chain wheel tooth enters the tooth intermediate space and exits the latter again only at this radially inner edge.

What was stated above only for a single viewing plane applies to the achievement of the desired support of the movement of a chain wheel tooth into the tooth engagement space for a plurality of viewing planes that are parallel both to one another and to the reference plane, specifically such that the longitudinal spacing of the first and the second offset region from one another, at least in the chain plate inner surface of one chain plate, or of both chain plates, of a chain link, is greater in a plurality of virtual viewing planes parallel to the reference plane than in the reference plane, wherein the longitudinal spacing becomes greater with increasing distance of the viewing planes from the reference plane. With increasing distance of the viewing planes from the reference plane, the viewing planes become closer to a longitudinal edge, extending along the longitudinal chain path, of the bicycle chain, wherein the engagement of the chain wheel tooth with the bicycle chain begins.

In principle, the spacing, becoming greater towards the longitudinal edge of the bicycle chain, along the longitudinal chain path between the first and the second offset region, at least on the chain plate inner surface of a chain plate, can be achieved by a rectilinear offset region from the first and second offset region, said rectilinear offset region extending only non-parallel to the vertical chain axis. Considering the fact that, between the chain plates of one and the same chain link, there are chain rollers which likewise support the insertion of a chain wheel tooth into the tooth engagement space by way of their cylindrical lateral surfaces, at least one offset region from the first and second offset region is formed, at least on the chain plate portion located on one side of the reference plane, at least on the chain plate inner surface, optionally also on the chain plate outer surface, so as to extend at least partially in a curved manner. An axis of curvature determining the curvature of the at least one offset region extends parallel to the transverse chain axis or is inclined with respect to the latter by no more than 20°, and in another embodiment by no more than 10°.

For the above-described second embodiment of an offset chain link, it is sufficient for only the second offset region, located closer to the chain roller in the narrower longitudinal end region, at least on the chain plate inner surface, optionally also on the chain plate outer surface, to be formed so as to extend in a curved manner as described above.

To achieve an even greater funnel effect of the offset regions by way of a spacing, increasing even more greatly with distance from the reference plane, between the first and second offset region, particularly both offset regions, at least on the chain plate inner surface, are formed so as to extend at least partially in a curved manner. In this case, a curvature which curves the respective offset region, with increasing distance from the reference plane, in particular towards the radially inner longitudinal edge of the bicycle chain, at least on the chain plate inner surface, away from a central plane, orthogonal to the longitudinal chain path, of a chain link. The chain plates are produced so as to form at least one curved offset region with involvement of a stamping process which allows the formation of curved offset regions in a simple manner. Using such a stamping process, at least one offset region can also be formed in a curved manner on the chain plate inner surface.

In principle, for a plurality of chain plates, and in another embodiment for all the chain plates, of the bicycle chain, it may be the case that the chain plates of the chain link are formed in a mirror-symmetric manner with respect to the reference plane. In a longitudinal central region of the chain plates and of the chain link, the height dimension of the chain plates along the vertical chain axis may be reduced compared with longitudinal portions which comprise the pivot axes of adjacent chain links, for instance in order to make it easier to move the chain plate on shifting radially outwardly over a tooth tip. In the case of a design of the chain links, in particular of the entire bicycle chain, which is mirror-symmetric with respect to the reference plane, it is almost impossible to arrange the bicycle chain incorrectly on a drive train having two chain wheels or only on one chain wheel.

To achieve greater tensile strength while at the same time having a concave curvature of a longitudinal peripheral portion, comprising the longitudinal centre of a chain plate, so as to make it easier to move the chain plate axially with respect to the axis of rotation of a target chain wheel radially outwardly past a tooth tip, it may be the case, for the chain plates of a plurality of chain links, or in another embodiment of all the chain links, of the bicycle chain, that only one chain plate longitudinal edge, delimiting the respective chain plate along the vertical chain axis, to be formed in a concavely curved manner in a longitudinal portion comprising the longitudinal centre of the chain plate. The opposite chain plate longitudinal edge, along the vertical chain axis, of the same chain plate may, by contrast, be formed in a rectilinear manner or with a smaller curvature. Such chain plates are known, for example from Taiwan Patent TW M268483 U or from U.S. Pat. No. 9,890,830 B2, already mentioned above. The chain is then assembled such that the chain plate longitudinal edges are located with the concavely curved longitudinal central portion on the engagement side of the chain links, on which side the entry of a chain wheel tooth into the tooth engagement space takes place. In the case of a closed circulating bicycle chain, this is the radially inner chain plate longitudinal edge.

As an alternative or additional insertion aid for supporting an engagement movement of a chain wheel tooth into the tooth engagement space, the chain plate longitudinal edge may have, in its longitudinal central portion, a bevel that extends along the chain plate longitudinal edge. The bevel may be formed on both chain plates of a chain link, specifically such that the spacing of the chain plate inner surfaces that are opposite along the transverse chain axis becomes smaller with increasing proximity to the reference surface.

As has already been set out above, to reinforce the insertion support for a chain wheel tooth into the tooth engagement space, in an embodiment both offset regions from the first and the second offset region are formed at least partially in a curved manner at least on the same chain plate portion between the reference plane and a longitudinal edge of the chain plate, at least in the chain plate inner surface. This is the case for a plurality of chain links, or in another embodiment for all the chain links of the bicycle chain, and in yet another embodiment for both chain plates of a chain link.

The direction of curvature of the at least one offset region formed in a curved manner at least in the chain plate inner surface has also already been discussed above. In other words, the direction of curvature of the at least one offset region, partially curved at least in the chain plate inner surface, from the first and second offset region is such that it is concavely curved as seen from the chain roller axis of rotation of the chain roller located closer to the partially curved offset region, and is convexly curved as seen from the chain roller axis of rotation of the chain roller located farther away from the partially curved offset region. Then, the tooth engagement space between the first and the second offset region widens in the direction away from the reference plate to a longitudinal edge of the chain link, at which tooth engagement takes place, gradually, i.e. the spacing, to be measured along the longitudinal path, of the first and the second offset region from one another increases disproportionately with increasing distance from the reference plane.

According to an embodiment of the present disclosure, at least one offset region from the first and the second offset region, or both offset regions, at least in the chain plate inner surface, may be formed at least partially concentrically with the chain roller located closest to the respective offset region. Then, the first and/or the second offset region, at least in the chain plate inner surface, may extend at least partially parallel to the lateral surface of the chain roller located closest to it. In another embodiment, the radius of the curved portion of the first and/or of the second offset region, at least in the chain plate inner surface, differs from the radius of the chain roller located closest to it by no more than 5%, or in another embodiment by no more than 3%, with respect to the radius of the chain roller. In this way, a gap or space, favouring undesired accumulation of dirt, between an end face, facing in the direction of its chain roller axis, of the chain roller and the chain plate inner surface located closest to it can be reduced or even avoided completely.

For very good movement guidance of the chain roller in its rotary movement about its chain roller axis relative to the chain plates of a chain link, in some embodiments a plurality of the chain links, or in other embodiments all the chain links, of the bicycle chain, that each of the chain plates of a chain link, on its side facing the chain roller, has a planar surface portion, located in the extension of the chain roller, optionally adjacent to the chain roller, in the wider longitudinal end region and/or in the narrower longitudinal end region.

Between planar surface portions of the chain plate inner surface, in an embodiment of the operational bicycle chain, there extends a pin and/or a sleeve as a hollow pin. In the following text, for the sake of simplicity, only a pin is mentioned. This designation also includes a sleeve as a hollow pin. For a plurality of the chain links, for all the chain links, of the bicycle chain, it is the case that the pin connects together the chain plates, located opposite one another along the transverse chain axis, of the respective chain link in the wider longitudinal end region of the chain link. Moreover, the pin may carry a chain roller accommodated between the chain plates. On account of the particular design, mentioned at the beginning, of a chain link, the pin, which extends along the transverse chain axis, in particular parallel to the transverse chain axis, passes through the chain plates of a chain link in the narrower longitudinal end region and projects, in the wider longitudinal end region of the chain link that immediately follows along the longitudinal chain path, into the chain plates thereof. This is because a narrower longitudinal end region of a chain link projects, as described at the beginning, into the wider longitudinal end region of the chain link, following along the longitudinal chain path, between the chain plates thereof.

The shifting readiness of the above-discussed chain is also supported in that the pins that connect together the chain plates of a chain link do not, in an embodiment, protrude beyond the chain plates at the outer side of the latter. In this way, a greater local width dimension of the bicycle chain in the region of the pins can be avoided. In some embodiments, the pins end flush with a chain plater outer surface of the chain plates. In this way, at the outer side, facing away from the chain rollers along the transverse chain axis, of the chain links, it is possible to avoid steps, which may have a negative effect: if the pins project beyond the chain plate outer surfaces, a step formed in this way may have the effect that the bicycle chain undesirably gets caught, with the longitudinal end, protruding from its lateral surface, of a pin, on a contour on a chain wheel and thus impedes a smooth movement, in particular shifting movement, of the above-discussed bicycle chain. If, by contrast, the pins remain behind the chain plate outer surface, a recess arises, in which dirt can undesirably accumulate.

In an embodiment, a first offset region at least partially delimits a planar surface portion in a wider longitudinal end region, at least in a chain plate inner surface, optionally also in a chain plate outer surface, such that a structural design of a chain plate can be kept simple and separate delimiting of the planar surface portion is not required. Alternatively, or additionally, the second offset region, for the same reason, may at least partially delimit the planar surface portion in the narrower longitudinal end region, at least in the chain plate inner surface, optionally also in the chain plate outer surface. In another embodiment, a first and/or a second offset region delimits or delimit planar surface portions, located closest to them, in longitudinal end regions, located respectively closest to them, of chain plates not just partially, but completely.

The present disclosure also relates to a bicycle drive assembly comprising, as chain wheel assemblies, a chainring assembly and a bicycle pinion assembly arranged at a distance therefrom, wherein the chainring assembly and the bicycle pinion assembly are each rotatable about mutually parallel assembly axes, and wherein the bicycle drive assembly comprises a bicycle chain, as described and developed above, which runs in a closed manner about the assembly axes and, in order to transmit torque from the chainring assembly to the bicycle pinion assembly, is in form-fitting engagement with each of these assemblies.

The shifting bicycle chain, discussed herein, with the design mentioned at the beginning, can be shifted, in a manner known per se, by a derailleur from a starting chain wheel to a target chain wheel. In order for a shifting operation to be possible in the first place, at least one chain wheel assembly from the chainring assembly and the bicycle pinion assembly must have, as a shifting chain wheel assembly, at least two coaxial chain wheels with different numbers of chain wheel teeth.

To solve the abovementioned problem, the bicycle drive assembly has a derailleur which is displaceable at least also along the parallel assembly axes, has the bicycle chain passing through it, and is designed, by being displaced along the common assembly axis of the at least two coaxial chain wheels, to shift the bicycle chain from one of the at least two coaxial chain wheels, with which the bicycle chain is engaged, onto at least another of the at least two coaxial chain wheels, in order to bring the other chain wheel into engagement with the bicycle chain.

The bicycle drive assembly is configured such that, upon engagement of chain wheel teeth in tooth engagement spaces of the chain links of the bicycle chain, force transmission between the respective chain wheel tooth and the chain link takes place in a form-fitting manner only via a chain roller of the respective chain link, not via the chain plates of the chain link. Any incidental friction forces, transmitted by a force fit or friction fit, between a chain wheel tooth and a chain plate in contact therewith are not intended to be taken into consideration on account of their negligible magnitude compared with the force transmitted between the form-fitting tooth flank and chain roller. In an embodiment, the chain rollers and the chain plates are dimensioned such that the load-bearing tooth flank of a chain wheel tooth engaged in a tooth engagement space passes into bearing engagement only with the lateral surface of a chain roller of the chain link, but not with a chain plate edge located between the chain plate inner surface and chain plate outer surface. This can be achieved by the abovementioned partial dimensioning of the chain plates of a chain link relative to the chain rollers arranged therebetween along the transverse chain axis. For example, the chain plates, in portions which, during operation of the bicycle drive assembly, face an assembly axis and a tooth engaging in a tooth engagement space of a chain link, may not protrude radially beyond the lateral surface of the chain roller with respect to the chain roller axis of the closest chain roller or may even remain radially behind the lateral surface of the chain roller, such that the lateral surface of the chain roller physically prevents contact of the tooth flank of the chain wheel teeth with the edge of the chain plates.

The coaxial chain wheels of the shifting chain wheel assembly are arranged in a direction referred to in the following text as a "sequential direction" with decreasing numbers of chain wheel teeth. On a target chain wheel with a larger number of teeth, in order to carry out a first shifting operation from a starting chain wheel with a smaller number of teeth to a target chain wheel, adjacent thereto counter to the sequential direction, with a larger number of teeth than the starting chain wheel, on the target chain wheel at least one tooth is in the form of a catching tooth for the first shifting operation. A plurality, or even, in particular for chain wheels with only one shifting gate, the majority, of standard teeth of the target chain wheel have a uniform, matching tooth shape. These standard teeth with this uniform, matching tooth shape serve as a rule only for transmitting force or torque between the chain and the chain wheel by physical engagement of the standard teeth in the tooth engagement spaces of the chain links of the bicycle chain. The tooth shape of the catching tooth differs from this tooth shape of the standard teeth. The tooth shape of the catching tooth facilitates the physical form-fitting engagement of the bicycle chain leaving the starting chain wheel under the influence of the derailleur. The catching tooth is therefore that tooth of the target chain wheel that, during the first shifting operation discussed here, passes, as first tooth, into a tooth engagement space of a chain link of the bicycle chain and thus engages the chain with the target chain wheel.

To make it easier to engage in the bicycle chain shifted to the target chain wheel or in the tooth engagement spaces of the chain links thereof, the catching tooth has, in an embodiment, on its tooth side facing away from the starting chain wheel, a catching recess, or a catching recess at least partially in the form of a catching bevel. In order to make it easier, as a result of the catching recess, for the catching tooth to enter a tooth engagement space of a chain link of the bicycle chain displaced axially in the direction of the target chain wheel by the derailleur, the catching recess extends from the tip of the catching tooth radially inwards in the direction of the assembly axis. In this way, the catching recess brings about a reduction in thickness of the tooth tip of the catching tooth on the side of the target chain wheel facing away from the starting chain wheel, the consequence of this being an effective axial displacement of the tooth tip of the catching tooth towards the starting chain wheel. A meshing surface or, in the case of an axial extent of the meshing surface of zero, a meshing line as the formation of the catching tooth that extends along a circumferential path about the assembly axis and delimits the catching tooth or the tooth head thereof radially on the outside is located, on account of the described catching recess, closer to the starting chain wheel. Furthermore, the tooth tip of the catching tooth is, as a result of the catching recess, axially thinner than a tooth tip of the standard teeth, such that the catching tooth, compared with the standard teeth, can engage more easily in a tooth engagement space of a chain link of the bicycle chain moved from the starting chain wheel towards the catching tooth.

The described catching recess may, at least in the radial portion of the catching tooth that extends directly from the meshing line or meshing surface of the catching tooth, may be in the form of a catching bevel on the tooth tip and thus serve as a kind of lead-in chamfer of the catching tooth into a tooth engagement space. The catching bevel is then, in some embodiments, formed such that the radial thickness of the catching tooth increases with increasing radial distance from the meshing line or meshing surface of the catching tooth in the direction of the assembly axis. The surface of the catching bevel may be formed in a manner inclined about an inclination axis that is tangential to a circumferential path about the assembly axis or that is inclined with respect to a tangent to a circumferential path about the assembly axis by no more than 20°, or in another embodiment by no more than 10°.

The catching recess on the side of the catching tooth facing away from the starting chain wheel may extend from the meshing line or meshing surface of the tooth tip of the catching tooth in the direction of the assembly axis over at least 25% of the radial extension of the catching tooth, or in another embodiment over at least 35%, or optionally over at least 50% of the radial extension of the catching tooth. The radial extension of the catching tooth is intended to be determined starting from the radial coordinate of the root circle of the target chain wheel. As a result of the design of the catching recess of the catching tooth starting from the meshing line or meshing surface as far as the radial centre of the catching tooth or even beyond the latter, cross-chaining, functionally necessary during the first shifting operation discussed herein, can be reduced to a degree. For sufficient guidance of the bicycle chain by the catching tooth following successful shifting of the bicycle chain to the target chain wheel with conventional tooth engagement, the catching recess, in some embodiments, does not extend radially as far as the root circle of the sprocket of the target chain wheel. In another embodiment, the catching recess extends from the tooth tip of the catching tooth over no more than 80% of the radial dimension of the catching tooth. The catching recess likewise extends, in some embodiments, over the entire circumferential extension of the catching tooth along a circumferential path about the assembly axis.

An outer surface portion, located radially farther away from the tooth tip on the side of the target chain wheel facing away from the starting chain wheel, of the catching tooth as a further boundary surface portion of the catching recess may, for better guidance of the chain after deeper penetration of the catching tooth into the tooth engagement space, have a more radial and less axial course than an outer surface portion, starting directly from the meshing line or meshing surface, of the catching tooth, in particular than the above-described catching bevel. The outer surface portions, formed by the catching recess, of the catching tooth on the side of the target chain wheel facing away from the starting chain wheel may be formed at least partially in a polyhedral manner, forming edges at their boundary regions, and/or may at least partially be in the form of a curved common outer surface region, with at least one axis of curvature that extends predominantly or entirely tangentially to a circumferential path about the assembly axis and/or through no more than 20°, or in some embodiments 10°, with respect to a tangent to a circumferential path about the assembly axis. In another embodiment, the curvature of the curved outer surface region may, to form the outer surface portions, vary away from the meshing line or meshing surface in the radial direction towards the assembly axis, wherein the curvature is then greater closer to the meshing line or meshing surface, i.e. has a shorter radius of curvature, than radially farther away from the meshing line or meshing surface. A curvature, varying in the radial course of the catching tooth, of the outer surface thereof means a plurality of curvature axes that determine the respectively local curvature of the outer surface portions.

If the catching tooth on the tooth tip, starting from the meshing line or meshing surface, also has an inclined surface or bevel on the side facing the starting chain wheel, the catching bevel on the side facing away from the starting chain wheel is greater than the bevel, formed on the tooth tip, on the side facing the starting chain wheel.

The catching tooth may, for easier initial engagement in a tooth engagement space, be formed in a radially shorter manner than the standard teeth and/or than chain wheel teeth that are adjacent to it along a circumferential path.

The target chain wheel of the described first shifting operation may have a preparation recess in the region of a preparation tooth, directly ahead of the catching tooth in the forward-travel direction of rotation of the chain wheel assembly, on the side facing the starting chain wheel, in order to allow, in this region, during the shifting of the bicycle chain, greater axial approaching of the target chain wheel by the bicycle chain. The forward-travel direction of rotation is, in this case, the direction of rotation in which the chain wheel assembly rotates while driving a bicycle, bearing the bicycle drive assembly, for forward travel.

In an embodiment, the preparation recess extends in the radial direction over the entire radial extension of the preparation tooth. The preparation recess may furthermore extend in the circumferential region of the tooth intermediate space that is directly ahead of the preparation tooth in the forward-travel direction of rotation. In order for the target chain wheel to be approached axially by the bicycle chain in as uncomplicated a manner as possible, the preparation recess may extend along a circumferential path about the assembly axis as far as the tooth that is directly ahead of the preparation tooth in the forward-travel direction of rotation, but for strength reasons does not extend beyond the circumferential centre of this tooth.

The preparation recess may radially approach the assembly axis of the chain wheel assembly differently along a circumferential path about the assembly axis, wherein the preparation recess radially approaches the assembly axis in the forward-travel direction of rotation starting from the catching tooth, in order to at least approximately reproduce the course of the bicycle chain from the starting chain wheel to the target chain wheel in the radial direction.

The catching tooth and the preparation tooth with the preparation recess form a particularly effective feature combination that promotes the shifting capability of the chain on the shifting chain wheel assembly.

In order to avoid excessive cross-chaining of the bicycle chain during the first shifting operation, the tooth that directly trails the catching tooth in relation to the forward-travel direction of rotation may have, on the chain wheel side facing away from the starting chain wheel, an auxiliary recess. In an embodiment, the trailing tooth has, in the half of its radial extension that is located radially farther out, a smaller axial thickness than a standard tooth. The auxiliary recess may be formed so as to approach the assembly axis in the circumferential direction away from the catching tooth. In some embodiments, the auxiliary recess does not extend, at both opposite circumferential ends of the trailing tooth, starting from the tooth tip, as far as the root circle of the target chain wheel. Along a circumferential path about the assembly axis, the auxiliary recess extends over the entire circumferential extension of the tooth.

In order to make it easier to insert the catching tooth into a tooth engagement space of chain links of the bicycle chain, the catching tooth may have, on its flank that is unloaded and/or ahead in the forward-travel direction of rotation, on the side facing away from the starting chain wheel, a sliding bevel that supports a first shifting operation. The sliding bevel formed on the tooth flank is designated in this way substantially to verbally distinguish it from the above-described catching bevel. In fact, during a first shifting operation, a chain link of the bicycle chain may slide, with its chain plate located farther away from the starting chain wheel, along the sliding bevel and in physical contact therewith radially down the catching tooth in the direction of the assembly axis. During this movement, with which the abovementioned sliding contact can be associated, but does not have to be associated, the catching tooth passes more deeply into the tooth engagement space of the chain link in question and thus physically engages with the latter. The sliding bevel may be formed in an inclined manner such that a normal vector of an outer surface, formed by the sliding bevel, of the catching tooth has a circumferential vector component in the direction away from the trailing and/or load-bearing flank of the catching tooth, an axial vector component parallel to the common chain wheel assembly axis in the direction away from the starting chain wheel, and a radial vector component in the direction away from the common chain wheel assembly axis. With this configuration of the sliding bevel on the catching tooth, the catching tooth can be adapted to the shape of the tooth engagement space with its narrowing portion. The inclined position of the chain plate portions, delimiting a tooth engagement space along the transverse chain axis, relative to a plane orthogonal to the common assembly axis of the coaxial chain wheels may, in an end region along the transverse chain axis of a chain link, be reinforced further by an inclined position, brought about by the derailleur, of the chain during the first shifting operation and be reduced in the opposite end region. This results in a completely different orientation of the side faces, delimiting a tooth engagement space, of a chain link relative to a catching tooth than in conventional bicycle chains.

The sliding bevel extends from the region of the tooth tip of the catching tooth radially as far as the root of the catching tooth and in the circumferential direction into the tooth intermediate space ahead of the catching tooth in the forward-travel direction of rotation. The sliding bevel may extend in the circumferential direction into a circumferential extension portion of the tooth intermediate space between the catching tooth and the tooth directly ahead of the catching tooth in the forward-travel direction of rotation, said circumferential extension portion containing the circumferential centre of the tooth intermediate space and extending from the circumferential centre to in each case a sixth, or in another embodiment to in each case an eighth, of the tooth pitch symmetrically on both sides of the circumferential centre. The point of the tooth intermediate space that is closest to the assembly axis is usually located in the circumferential centre.

In an embodiment, a bevel, namely the sliding bevel, is formed only at a transition between two tooth sides of the catching tooth that follow one another in the circumferential direction about the catching tooth. If bevels are formed at more than one transition between two tooth sides that follow one another in the circumferential direction about the catching tooth, the sliding bevel is the greatest bevel, in particular the bevel with the greatest area, on two tooth sides of the catching tooth that follow one another in the circumferential direction about the catching tooth.

On the tooth that directly trails the catching tooth with regard to the forward-travel direction of rotation and may have the auxiliary recess, a further sliding bevel may be formed, which, in terms of shape, dimensions and location of formation, corresponds substantially to the sliding bevel of the catching tooth. What was stated above in relation to the sliding bevel of the catching tooth therefore also applies, mutatis mutandis, to a further sliding bevel on the directly trailing tooth. The further sliding bevel behaves in relation to the auxiliary recess substantially in the same way as the sliding bevel behaves in relation to the catching recess.

Desired smooth shifting of the bicycle chain from the starting chain wheel with a smaller number of chain wheel teeth to the adjacent target chain wheel with a larger number of chain wheel teeth can only take place along a first shifting gate. A first shifting gate is formed where the spacing between a first chain link engagement on the target chain wheel and a last chain wheel engagement on the starting chain wheel amounts to between 90% and 110%, or in another embodiment between 95% and 105%, of an integral multiple of the chain pitch.

On the bicycle drive assembly described herein, the number of first shifting gates on the target chain wheel may be chosen to be less than or equal to the difference in the number of teeth between the starting chain wheel and the target chain wheel. In an embodiment, the first shifting gates are distributed equidistantly in the circumferential direction over the circumference of the target chain wheel. Since shifting gates can be formed with a catching tooth only discretely at circumferential locations, "equidistantly" means, in this case, that the circumferential spacing between k shifting gates of a target chain wheel having n teeth, expressed in angular degrees, corresponds in each case to $360°/k \pm 0.5 \times 360°/n$, wherein k and n are each whole numbers and n>k.

For the mechanical strength of the target chain wheel and consequently for the lifetime thereof, it has been found that chain wheels as target chain wheels only have to have exactly one catching tooth per shifting gate on the target chain wheel, in order to allow a reliable and repeatable shifting operation. Unlike in conventional bicycle chains with inner plate chain links and outer plate chain links, in the case of the bicycle chain discussed herein, one chain link with a uniform known shape always arrives at the sprocket of the target chain wheel in order to be engaged by the target chain wheel. In another embodiment a design with only one catching tooth per first shifting gate is provided.

To make it easier to carry out a second shifting operation, in the opposite direction compared with the first shifting operation discussed above, from a starting chain wheel with a larger number of teeth to a target chain wheel, adjacent thereto in the sequential direction, with a smaller number of teeth, on the starting chain wheel, at least one tooth may be in the form of a deflector tooth with a tooth shape that differs from the matching tooth shape of the standard teeth. What was stated above applies with respect to the standard teeth. In this case, a deflector tooth is that particularly designed first tooth on the sprocket of the starting chain wheel that is passed by the bicycle chain, leaving the starting chain wheel as a result of derailleur actuation, during the second shifting operation, axially with respect to the assembly axis on the side of the deflector tooth that faces the target chain wheel. The deflector tooth is therefore the first tooth of the starting chain wheel which no longer engages in a tooth engagement space of a chain link of the bicycle chain during the second shifting operation that is now being discussed. During the second shifting operation, the deflector tooth generally trails, with respect to the forward-travel direction of rotation of the starting chain wheel, a series of successive teeth which each engage in tooth engagement spaces of chain links of the bicycle chain.

In an embodiment, a deflector tooth has, on its side facing a smaller target chain wheel, a deflector recess which extends from a tooth tip of the deflector tooth in the radial direction towards an assembly axis, beyond a root circle of the starting chain wheel. In another embodiment, a deflector recess extends, on a tooth side, pointing towards a target chain wheel, of the deflector tooth, over an entire circumferential width or over the entire radial extension of the deflector tooth.

The deflector recess, as a result of which the deflector tooth is formed in an axially thinner manner than the standard teeth of the starting chain wheel, brings about an arrangement, effectively offset axially away from the target chain wheel compared with the standard teeth, of the deflector tooth on the starting chain wheel, this making it easier for it to fulfil its function. The deflector recess may extend away from the deflector tooth in the circumferential direction and into the circumferential region of the tooth intermediate space that directly trails the deflector tooth with regard to the forward-travel direction of rotation, as far as the tooth that directly trails the deflector tooth with regard to the forward-travel direction of rotation. In an embodiment, a deflector recess does not extend, in a circumferential direction, over a circumferential centre of a directly trailing tooth, and in another embodiment no further than 20% of the circumferential dimension thereof, into said tooth at the respective radial coordinate.

The deflector recess may approach the assembly axis differently along the circumferential path about the assembly axis of the chain wheel assembly, wherein the deflector recess radially approaches the assembly axis away from the deflector tooth counter to the forward-travel direction of rotation, in order to at least approximately reproduce the course of the bicycle chain from the starting chain wheel to the target chain wheel in the radial direction.

The deflector tooth may have, on its side facing the target chain wheel, as a deflection aid, an inclined surface or bevel that extends directly from its meshing surface or meshing line, as outer surface portions, at least partially delimiting the deflector recess, of the deflector tooth. The inclined surface or bevel faces in the axial direction towards the target chain wheel and in the radial direction away from the assembly axis. As a result of the inclined surface or bevel, the meshing line or meshing surface of the deflector tooth can be located axially farther away from the target chain wheel than the meshing line or meshing surface of standard teeth of the starting chain wheel.

Outer surface portions, delimiting the deflector recess, of the deflector tooth on the side, facing the target chain wheel, of the starting chain wheel may be formed at least partially in a polyhedral manner, forming edges at their boundary regions, and/or may at least partially be in the form of a curved common outer surface region, with at least one axis of curvature that is tangential to a circumferential path about the assembly axis or is inclined through no more than 20°, or in another embodiment through no more than 10°, with respect to a tangent to a circumferential path about the assembly axis. In another embodiment, a curvature of a curved outer surface region may, to form outer surface portions, vary away from a meshing line or meshing surface in a radial direction towards an assembly axis, wherein the curvature is then greater closer to the meshing line or meshing surface, i.e. has a shorter radius of curvature, than radially farther away from the meshing line or meshing surface. A curvature, varying in the radial course of the deflector tooth, of the outer surface thereof means a plurality of curvature axes that determine the respectively local curvature of the outer surface portions.

A tooth that is directly ahead of the deflector tooth in the forward-travel direction of rotation has, as supporting tooth, on the tooth side facing away from the target chain wheel, a supporting recess, in order to reduce cross-chaining of the bicycle chain that is unavoidable during the shifting operation and to allow the bicycle chain to axially approach the target chain wheel. The leading supporting tooth has, on account of the supporting recess in the half of its radial extension that is radially farther out, a smaller axial thickness than a standard tooth. The supporting recess, which extends over the entire circumferential width of the supporting tooth, likewise does not extend, at both opposite circumferential ends of the leading tooth, starting from the tooth tip, as far as the root circle of the starting chain wheel.

The deflector tooth with the deflector recess and the supporting tooth form a particularly effective feature combination that promotes the shifting capability of the chain on the shifting chain wheel assembly.

It is also the case, for the second shifting operation that is discussed herein, that smooth shifting of the bicycle chain from the starting chain wheel with a larger number of chain wheel teeth to the adjacent target chain wheel with a smaller number of chain wheel teeth can take place only along a second shifting gate formed on the starting chain wheel. For the at least one second shifting gate, what was stated above for the first shifting gate applies. The number of second shifting gates on the starting chain wheel is less than or equal to the difference in the number of teeth between the starting chain wheel and the target chain wheel. In another embodiment, second shifting gates are arranged in a manner distributed equidistantly in a circumferential direction over a circumference of the starting chain wheel as defined above.

To achieve high mechanical strength and a long lifetime of the starting chain wheel, each second shifting gate has exactly one deflector tooth.

The first and second shifting gates, discussed herein, with their particularly shaped teeth: catching tooth and deflector tooth, and with their recesses: catching recess and deflector recess, optionally also with the preparation recess and/or the supporting recess and/or the auxiliary recess, are in each case always formed on the larger of the two chain wheels from the starting chain wheel and target chain wheel.

In the case of a considered chain wheel assembly with a larger and a smaller chain wheel, that chain wheel that is the target chain wheel in the first shifting operation is the starting chain wheel in the second shifting operation. The chain wheel assembly may, of course, have more than two chain wheels. In a chain wheel assembly with more than two chain wheels, each chain wheel apart from the smallest chain wheel may be both the target chain wheel in a first shifting operation and the starting chain wheel in a second shifting operation.

Ordinal numbers that are used as an attribute for a technical feature identify only an order of naming. The presence of a feature with a lower ordinal number is not a prerequisite for the presence of a feature with the same designation but with a higher ordinal number. It is thus possible theoretically for a second shifting operation to exist or be discussed without a first shifting operation.

The present application also relates to a chain wheel on its own, which is formed as per the target chain wheel described in the first shifting operation and/or which is formed as per the starting chain wheel described in the second shifting operation. Likewise, the present disclosure relates to a chain wheel assembly on its own, comprising the abovementioned chain wheel and an immediately adjacent smaller chain wheel. Optionally, the chain wheel assembly may have at least one further chain wheel with a different size, i.e. a different number of teeth.

According to an embodiment of a bicycle drive assembly, when a bicycle chain is moved in a direction of circulation that drives forward travel, a narrower longitudinal end of a chain link leads and a wider longitudinal end trails. The chainring assembly of this embodiment has only one chainring, but, by contrast, the bicycle pinion assembly has a plurality of coaxial pinions with different numbers of teeth, such that, in this embodiment, a shifting operation is carried out only at the pinion assembly of the rear wheel. For this shifting operation at the pinion assembly, the specified orientation has the narrower longitudinal ends leading during forward travel.

Figure 15:
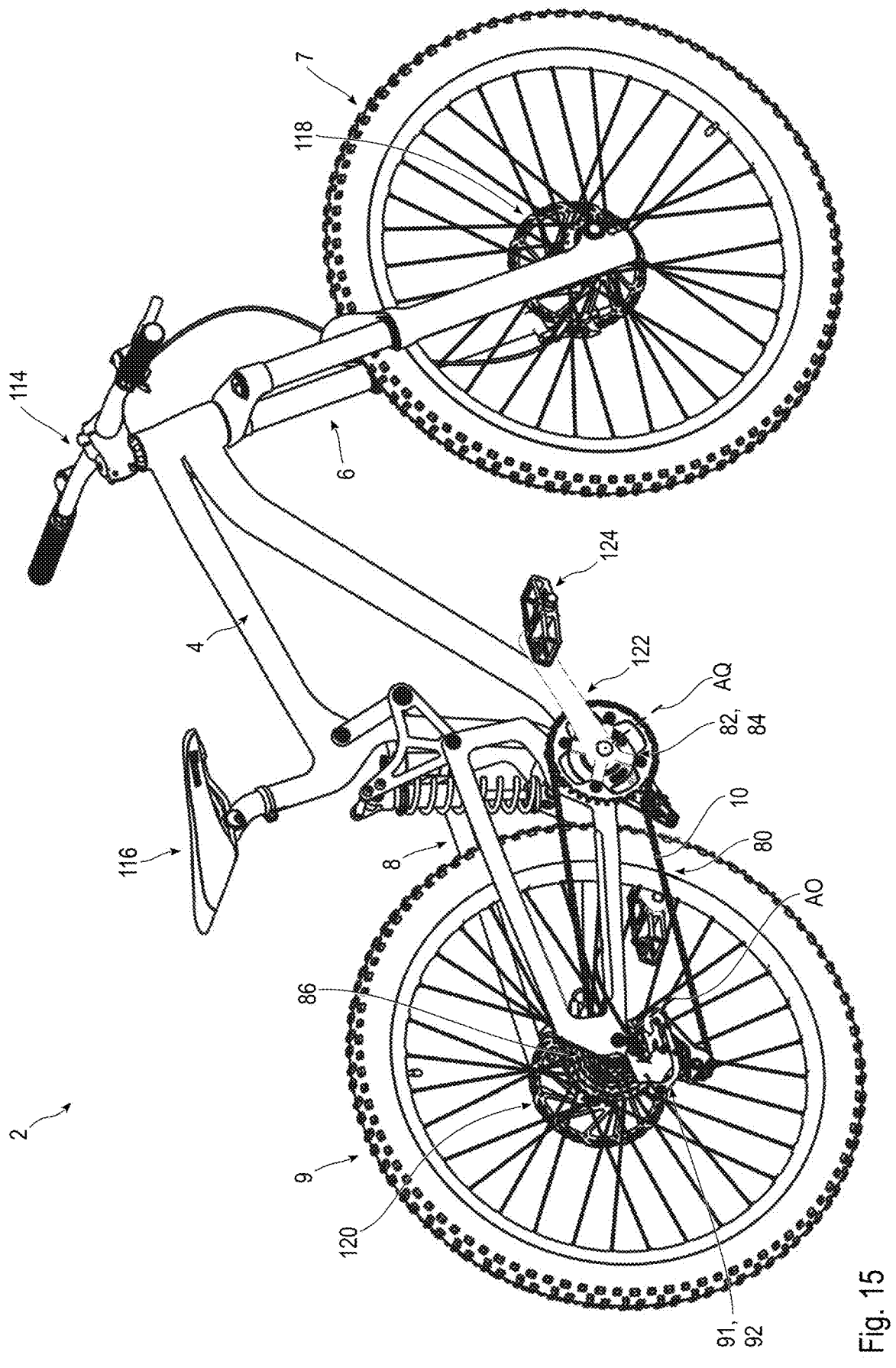
FIG. 15 is a schematic perspective illustration of a bicycle having a drive assembly according to the disclosure.

A bicycle 2 is depicted in a perspective manner by way of example in FIG. 15. The bicycle 2 has a frame 4, to which a sprung front wheel fork 6, on which a front wheel 7 is rotatably received, is fastened in a steerable manner and to which a sprung rear wheel fork 8, on which a rear wheel 9 is rotatably received, is fastened.

The front wheel 7 is steerable via a handlebar 114 in a manner known per se. A saddle 116 allows the bicycle rider to sit while riding.

The front wheel 7 and the rear wheel 8 are each able to be braked via brake discs 118 and 120, respectively, by corresponding brake actuation at the handlebar 114.

The bicycle 2 is driven in a manner known per se by a crank assembly 122 with pedals 124. A bicycle drive assembly 80 comprises, in the example illustrated, a front chainring assembly 82 with exactly one front chainring 84. This is connected directly to the crank assembly 122 in a torque-transmitting manner. The front chainring assembly rotates, like the crank assembly 122, about the common assembly axis AQ.

The bicycle drive assembly 80 also comprises a rear bicycle pinion assembly 86, which is coupled to a hub of the rear wheel 9 in a torque-transmitting manner. The bicycle pinion assembly 86, which has a plurality of parallel and coaxial pinions that are connected for conjoint rotation, is illustrated in a more detailed view in FIGS. 8 and 9. The bicycle pinion assembly 86 rotates, like the rear wheel 9, about the common assembly axis AO. The assembly axes AO and AQ are parallel to one another.

A bicycle chain 10, which is described in detail below and is likewise part of the bicycle drive assembly 80, circulates, in the operational state, in a closed manner about the chainring assembly 82 and about the bicycle pinion assembly 86, wherein it is in form-fitting, meshing engagement with the single front chainring 84 and with one of the pinions of the bicycle pinion assembly 86. The bicycle chain 10, transmitting torque from the chainring assembly 82 to the bicycle pinion assembly 86, can be shifted by a chain wheel shifter 91 having a derailleur 92 for engaging with different pinions of the bicycle pinion assembly 86 as the shifting chain wheel assembly of the bicycle drive assembly 80. The rear derailleur 92, which is the only derailleur 92 of the bicycle in the exemplary embodiment illustrated, is displaced in a manner known per se along the assembly axis
AO of the pinions of the bicycle pinion assembly 86 either
by a Bowden cable or by electrical signals as a result of
corresponding actuation of associated shifters on the handle-
bar 114.

In FIGS. 1 to 4, a stretched-out portion of one embodi-
ment, according to the disclosure, of a bicycle chain of the
present application bears the general reference 10. An arrow
VD indicates the direction in which the respectively illus-
trated portion of the chain 10 moves when the drive assem-
bly 80 is driven for forward travel.

The bicycle chain 10 extends along a virtual longitudinal
chain path LB. Along this longitudinal chain path LB,
substantially identical chain links 12 follow one another.

A chain link 12 has, as an offset chain link 12, a wider
longitudinal end 14 and a narrower longitudinal end 16 (see
in this regard the frontmost chain link 12 in FIG. 1). The
inner chain link width iKW and the outer chain link width
aKW (see in each case FIG. 4), which is intended to be
measured along a virtual transverse chain axis BA, is greater
at the wider longitudinal end 14 than at the narrower
longitudinal end 16. The virtual transverse chain axis BA
orthogonal to the virtual longitudinal chain path LB extends
parallel to and coaxially with pivot axes S about which chain
links 12 that immediately follow one another along the
longitudinal chain path LB are connected so as to be
pivotable relative to one another.

A virtual vertical chain axis HA that is orthogonal both to
the virtual longitudinal chain path LB and to the virtual
transverse chain axis BA completes the Cartesian coordinate
system used herein to describe the bicycle chain 10. The
height dimension h of the bicycle chain 10 (see FIG. 2) is
intended to be measured along the virtual vertical chain axis
HA.

Since the chain links 12 that immediately follow one
another along the longitudinal chain path LB are connected
so as to be pivotable about pivot axes S relative to one
another and the bicycle chain circulates, in operation, in a
closed manner about two chain wheels that are arranged at
a distance from one another, the longitudinal chain path LB
can and will extend in a partially curved manner during
operation of the bicycle chain 10. Likewise, in these curved
portions of the bicycle chain 10, the vertical chain axis HA
will be oriented in a locally different manner in space. The
smallest unit, to be considered normally to be non-deform-
able, of the bicycle chain 10 is a chain link 12, and so, to
illustrate the spatially different orientation of the longitudi-
nal chain path LB and of the vertical chain axis HA, it makes
sense to allocate each chain link 12 a local longitudinal chain
path LB and a local vertical chain axis HA, which locally
correspond to the respective longitudinal chain path LB and
the vertical chain axis HA of the bicycle chain 10. The
Cartesian coordinate system used is therefore not only a
coordinate system of the bicycle chain 10 but also a coor-
dinate system of each chain link 12.

The wider longitudinal end 14 is adjoined, along the
longitudinal chain path LB in the direction of the narrower
longitudinal end 16, by a wider longitudinal end region 18.
The narrower longitudinal end 16 is adjoined, along the
longitudinal chain path LB in the direction of the wider
longitudinal end 14, by a narrower longitudinal end region
20. Located between the wider longitudinal end region 18
and the narrower longitudinal end region 20 is a narrowing
portion 22, in which the width dimension of the bicycle
chain 10 or of a chain link 12 transitions from the wider dimension of the chain link 12 in the wider longitudinal end
region 18 to its narrower dimension in the narrower longi-
tudinal end region 20.

Each chain link 12 has a chain plate 24 and a chain plate
26 formed separately from the chain link 24, which are
located opposite one another along the transverse chain axis
BA and are formed in a substantially mirror-symmetric
manner with respect to an axis of mirror symmetry orthogo-
nal to the transverse chain axis BA. On account of the
described mirror symmetry, the description of a chain plate
24 suffices in the following text. The shape of the chain plate
26 located opposite the latter will be apparent from the
described shape of the chain plate 24 taking the condition of
mirror symmetry into consideration.

The chain plate 24 has a first longitudinal end region 28,
which contributes to forming the wider longitudinal end
region 18 of the chain plate 12. Only because of the
allocation of the first longitudinal end region 28 of the chain
plate 24 to the wider longitudinal end region 18 of the chain
link 12 is the first longitudinal end region 28 of the chain
plate 24 referred to in the following text as the "wider"
longitudinal end region 28 of the chain plate 24.

The chain plate 24 also has a second longitudinal end
region 30, which, with the meaning given herein of "nar-
rower" longitudinal end region 30, contributes to forming
the narrower longitudinal end region 20 of the chain link 12.

The chosen designations of the first and the second
longitudinal end regions 28 and 30, respectively, do not
provide any information about the actual width dimensions
of the regions or the dimensional relationships thereof with
one another.

Located along the longitudinal chain path LB, between
the wider longitudinal end region 28 and the narrower
longitudinal end region 30 of the chain plate 24, is a third
longitudinal portion 32, inclined with respect to these lon-
gitudinal end regions 28 and 30, of the chain plate 24, said
third longitudinal portion, with the present allocated mean-
ing of narrowing portion 32 of the chain plate 24, contrib-
uting to forming the narrowing portion 22 of the chain link
12.

In the narrower longitudinal end region 20 of the chain
link 12, a chain roller 34 is accommodated between the
narrower longitudinal end regions 30 of the chain plates 24
and 26. The chain roller 34 is rotatable about the virtual
pivot axis S relative to the chain plates 24 and 26. The virtual
pivot axis S is thus also the chain roller axis KR of the chain
roller 34 of a chain link 12.

A pin 36 extending along the transverse chain axis BA
connects the chain plates 24 and 26 together in their narrow
longitudinal end regions 30. In an embodiment a hollow
cylindrical chain roller 34 surrounds the pin 36 all around
the latter.

As can already be seen in FIG. 1, the narrower longitu-
dinal end region 20 of a chain link 12 extends, along the
longitudinal chain path LB, into the wider longitudinal end
region 18 of a chain link 12 that is immediately adjacent
along the longitudinal chain path LB. The pin 36 thus passes
through not only the narrower longitudinal end regions 30 of
the chain plates 24 and 26 of a chain link 12 but also the
wider longitudinal end regions 28 of the chain plates 24 and
26 of the chain link 12 that is adjacent along the longitudinal
chain path LB, between which the inwardly projecting
narrower longitudinal end region 20 of the first-mentioned
chain link 12 is accommodated. The pin 36 ends, in the
region of the wider longitudinal end region 18, flush with the
respective chain plate outer surface 38 of the chain plates 24
and 26.

A part of the chain plate inner surfaces 40 of the chain plates 24 can be seen in FIG. 1. The chain plate inner surfaces 40 of the chain plates 24 and 26 face one another, but, by contrast, the chain plate outer surfaces 38 face away from one another.

Figure 2:
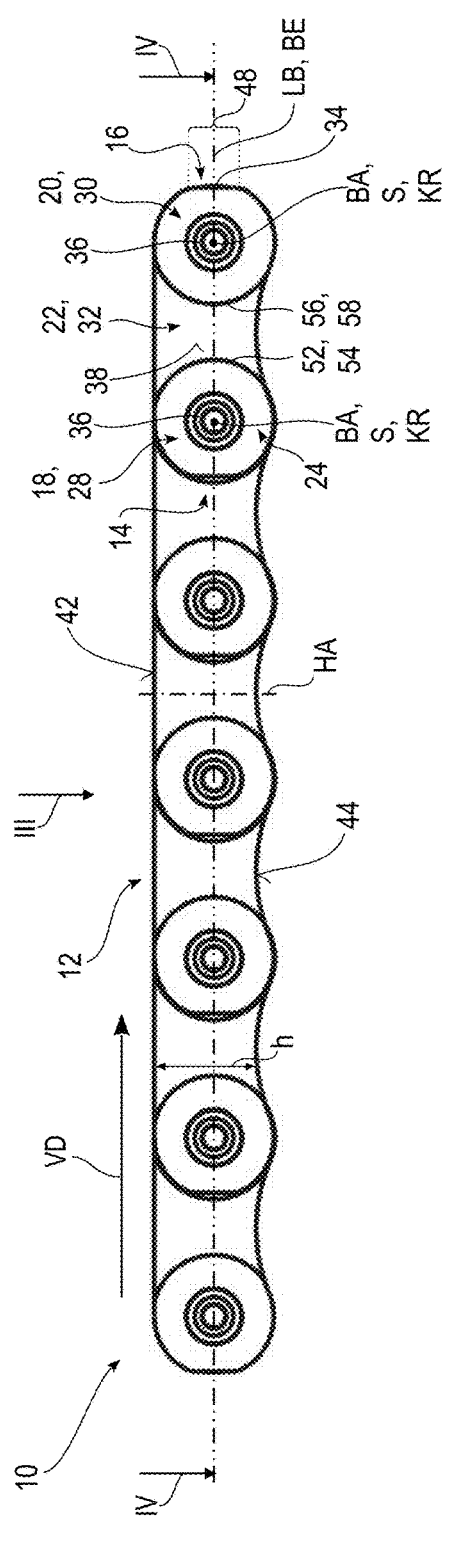
FIG. 2 is a side view of the bicycle chain in FIG. 1, as viewed along the transverse chain axis along the arrow II in FIG. 3, 3                                                                          4
Figure 3:
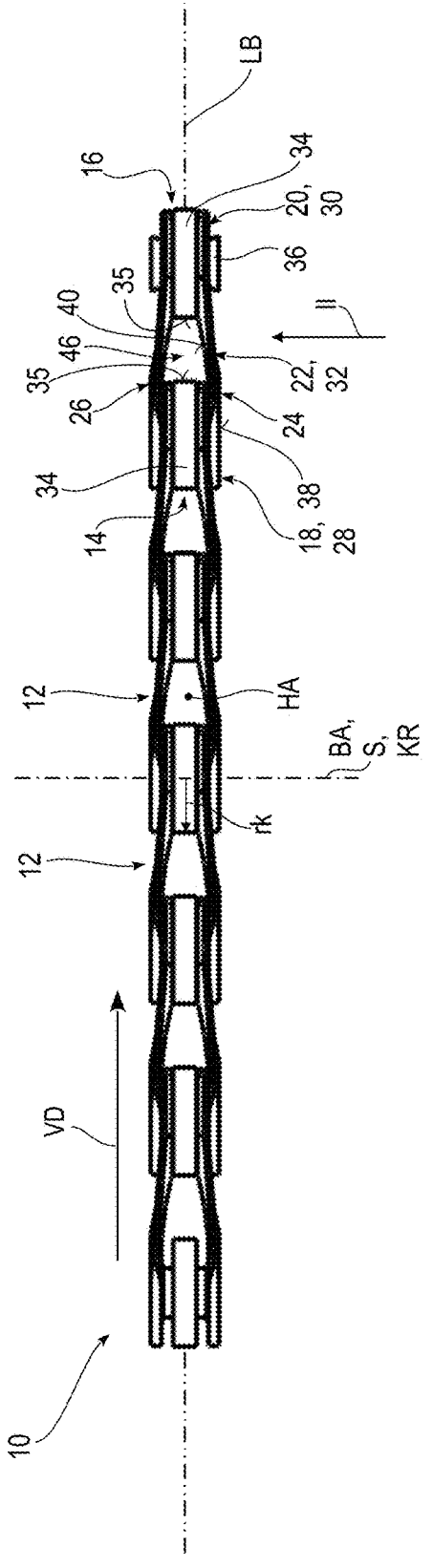
FIG. 3 is a plan view of the bicycle chain in FIGS. 1 and 2, as viewed along the vertical chain axis along the arrow III in FIG. 2.
Figure 4:
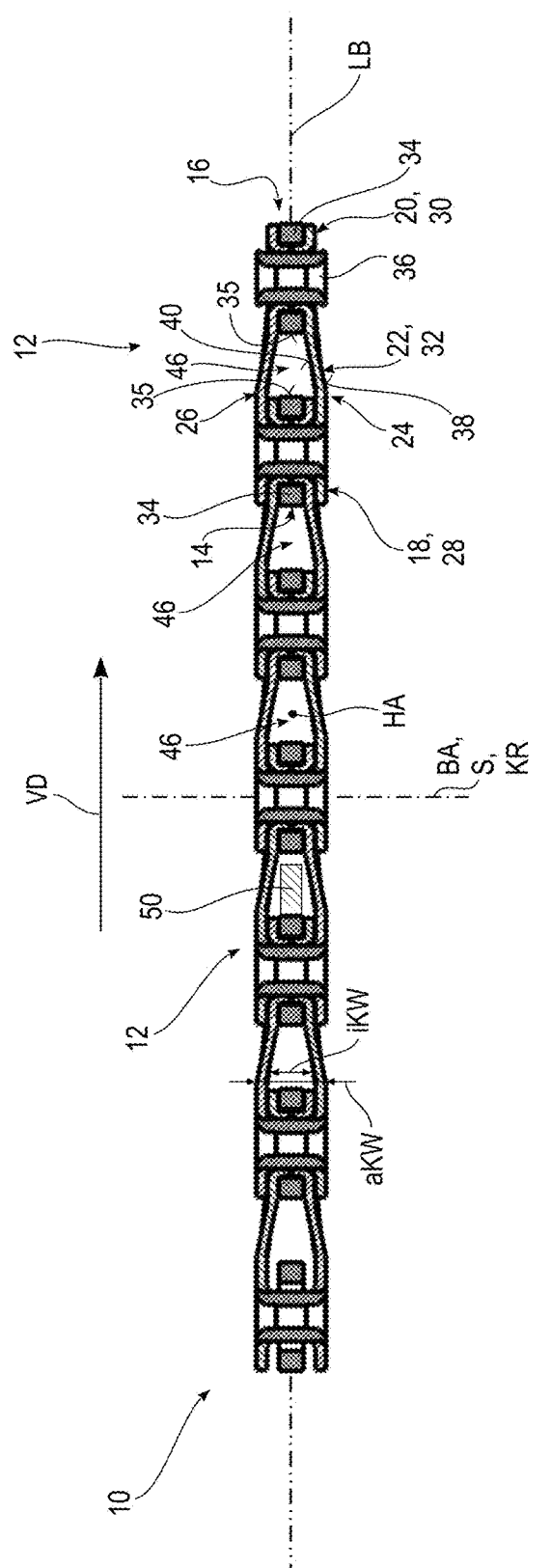
FIG. 4 is a view in longitudinal section of the bicycle chain with the reference plane as section plane, as viewed along the arrows IV in FIG. 2.

FIGS. 2 to 4 show different views of the same bicycle chain 10 from FIG. 1.

For greater clarity, features which apply to all the chain links 12 and the chain plates 24 thereof that face the viewer of FIG. 2, are illustrated on different chain links 12 in FIGS. 2 to 4, in order to spread the labelling of the figures over the drawing area.

FIG. 2 shows a side view of the bicycle chain 10 from FIG. 1 along the arrow II in FIG. 3. The direction of view extends along the transverse chain axis BA. In the embodiment shown in FIG. 2, the upper longitudinal edge 42 of the chain plates 24 and consequently of the chain links 12 is in the form of a rectilinear longitudinal edge 42. The opposite longitudinal edge 44, which is the lower one in FIG. 2, is, by contrast, formed in a concave manner in the region of the narrowing portion 22 and 32, respectively. In the wider longitudinal end region 18 and 28, respectively, and in the narrower longitudinal end region 20 and 30, respectively, the lower longitudinal edge 44 is formed, by contrast, in a convex manner. The height dimension h of a chain plate 24 and thus of a chain link 12 therefore varies along the longitudinal extension of the chain plate 24 and chain link 12.

The engagement side of the bicycle chain 10, at which a chain wheel tooth enters and exits a tooth engagement space 46, shown in FIGS. 3 and 4, of a chain link 12, is that of the lower longitudinal edge 44. The partially concave formation of the lower longitudinal edge 44, which, in the case of a bicycle chain 10 circulating in a closed manner, is a radially inner longitudinal edge 44 of the bicycle chain 10, makes it easier for the bicycle chain 10 to move over a tooth tip of a chain wheel tooth. This movement takes place when the bicycle chain 10 is shifted in the region of the concave portion of the lower longitudinal edge 44.

The narrowing portion 22 and 32, respectively, is that portion of the chain link 12 and of the chain plate 24, respectively, which delimits the tooth engagement space 46 along the transverse chain axis BA. The tooth engagement space 46 is delimited, along the longitudinal chain path LB, by two immediately adjacent chain rollers 34, or by the lateral surfaces 35 thereof.

FIG. 2 shows the reference plane BE, which is orthogonal to the drawing plane of FIG. 2, is coincident with the longitudinal path LB, and is defined by the virtual pivot axes S of a chain link 12.

In FIG. 2, the narrower longitudinal end 16 of the chain link 12 is illustrated at the right-hand end of the illustrated portion of the bicycle chain 10. At this narrower longitudinal end 16 of the chain link 12, the chain plates 24 and 26 are flattened, as will be described in more detail below in conjunction with FIGS. 5 to 7. At the flattened narrower longitudinal end 16, the chain roller 34, which is accommodated between the chain plates 24 and 26 in the narrower longitudinal end regions 30 thereof, protrudes slightly, by about 3% to 5% of the radial dimension rk of the chain roller 34 with respect to its chain roller axis KR (see FIG. 3), beyond the narrower longitudinal end 16 of the chain link 12, along the longitudinal chain path LB. The protrusion of the chain roller 34 beyond the narrower longitudinal end 16 occurs in a height portion 48, extending along the vertical chain axis HA, of the chain link 12, said height portion containing the reference plane and extending symmetrically about the reference plane.

As a result of the chain roller 34 protruding beyond the longitudinal end 16, a chain wheel tooth, which engages in the tooth engagement space 46 delimited, along the longitudinal chain path LB, by the lateral surfaces 35 of two chain rollers 34 that follow one another, comes only into bearing engagement with the chain roller 34, but not with a chain plate 24 or 26, for instance with a portion of the peripheral edge of the chain plate 24 or 26. As a result, force between the bicycle chain 10 and a chain wheel tooth can be transmitted only via the chain rollers 34 that are rotatable about their chain roller axis KR.

A chain wheel tooth 50 engaging in a tooth engagement space 46 is illustrated schematically and by way of example for illustration in FIG. 4. The chain wheel tooth 50 in FIG. 4 is, like the entire bicycle chain 10, illustrated in section in the reference plane BE.

The tooth engagement space 46 has, in the sectional illustration in FIG. 4, in the reference plane BE, a trapezoidal shape which allows the bicycle chain 10 to rotate relative to the engaging tooth 50 about an axis of rotation parallel to its vertical chain axis HA. This rotation makes it possible to incline the chain relative to parallel chain wheel planes of two coaxial chain wheels, such that the inclined bicycle chain 10 can bridge the spacing between the two parallel chain wheel planes and consequently between the two coaxial chain wheels and can be shifted from one of the parallel chain wheels to the other in each case. On account of the trapezoidal shape of the tooth engagement space 46 at least in the reference plane BE, the clear inner chain link width iKW decreases, along the longitudinal chain path LB, from the wider longitudinal end region 18 to the narrower longitudinal end region 20. The decrease in the clear inner chain link width iKW is linear, constant and continuous.

The engagement situation in FIG. 4 is an engagement situation in which the bicycle chain 10, which has been moved to the right along the longitudinal chain path LB in FIG. 4, transmits force to the chain wheel tooth 50. This situation is a typical engagement situation, as occurs at rear wheel pinions at which the bicycle chain 10 transmits force or torque.

In the sectional illustration in FIG. 4, the pins 36 are hollow pins or sleeves 36, the central axes of which on the fully mounted bicycle chain 10 are the pivot axis S. Furthermore, in FIG. 4 the pins 36 do not protrude, along the transverse chain axis BA, beyond the outer faces 38 of the wider longitudinal end regions 18 of the chain links 12. As a result, the pins 36 are excluded from being a possible physical obstacle at the outer side of the bicycle chain 10.

A further factor for the present bicycle chain 10 relating to the promotion of its shifting capability between two coaxial chain wheels lies in the configuration of offset regions, which, in the present exemplary embodiment, form the transition, for the one part, between the wider longitudinal end region 18 and the narrowing portion 22 and, for the other part, between the narrowing portion 22 and the narrower longitudinal end region 20 of a chain link 12.

In the side view in FIG. 2, in the chain plate outer surface 38, a first offset region 52 of the chain link 12 can be seen between the wider longitudinal end region 18 and the narrowing portion 22 of the chain link 12, which is also a first offset region 54 of the chain plate 24 between its wider longitudinal end region 28 and its narrowing portion 32. Furthermore, a second offset region 56 of the chain link 12 can be seen between the narrowing portion 22 and the narrower longitudinal end portion 20 of the chain link 12. This second offset region 56 is also a second offset region 58 of the chain plate 24 between its narrowing portion 32 and its narrower longitudinal end region 30.

Figure 5:
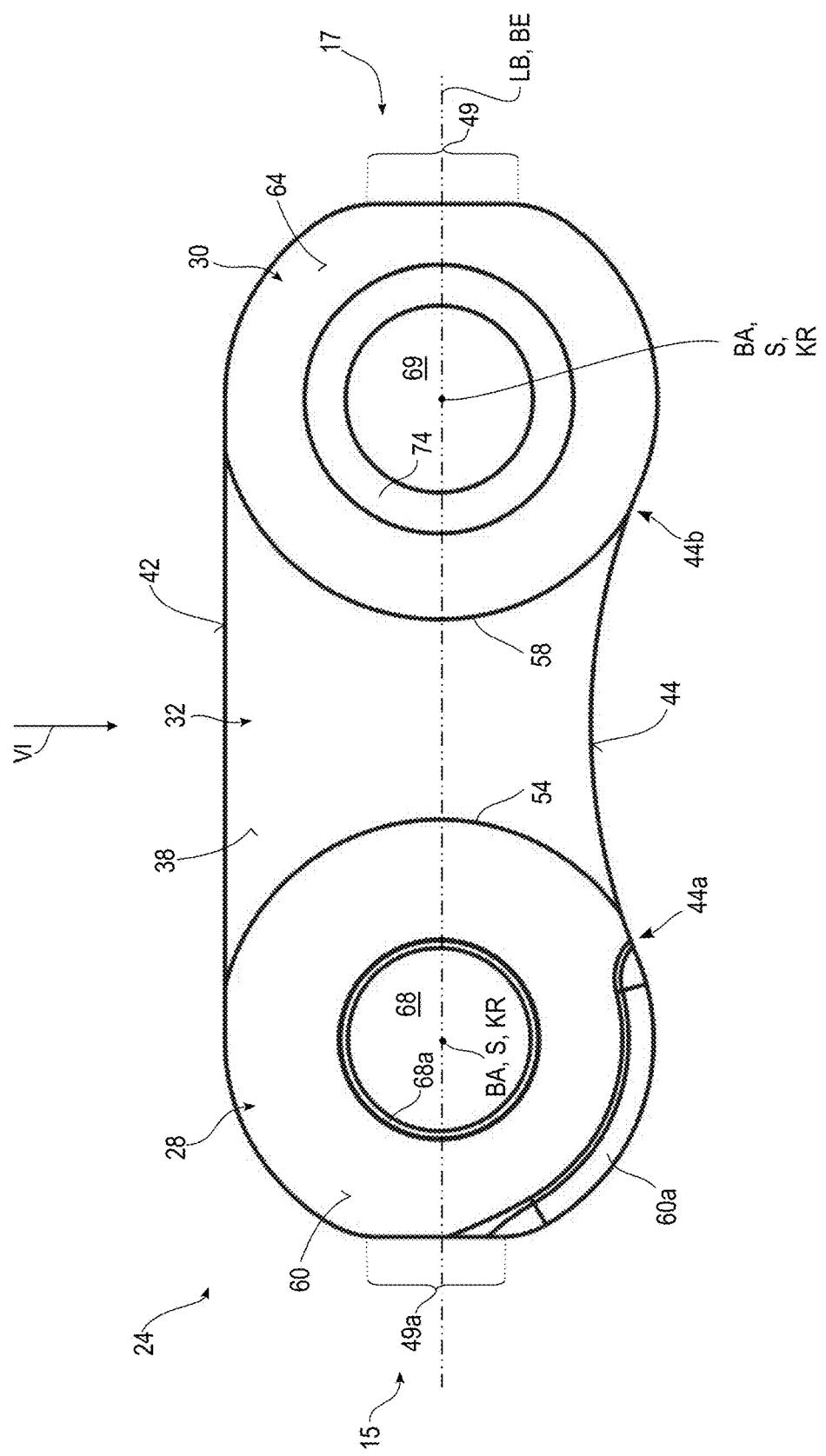
FIG. 5 is a side view of the chain plate outer surface of a chain plate 24 of the bicycle chain in FIGS. 1 to 3, as viewed along the transverse chain axis along the arrow II in FIG. 3 and along the arrow V in FIG. 6, respectively.
Figure 6:
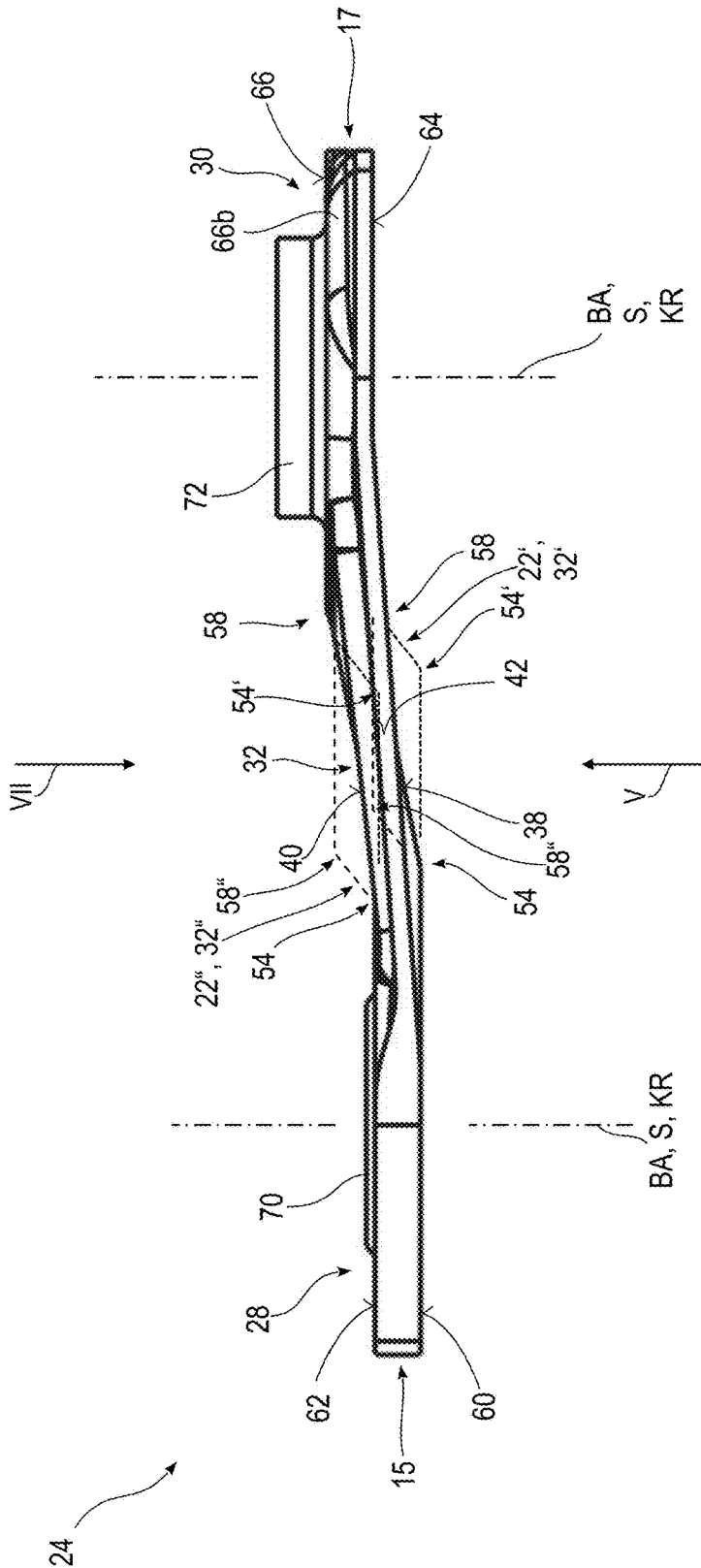
FIG. 6 is a plan view of the longitudinal edge, located away from the engagement side, of the chain plate 24 in FIG. 5, as viewed along the vertical chain axis along the arrow Ill in FIG. 2 and along the arrow VI in FIGS. 5 and 7, respectively.
Figure 7:
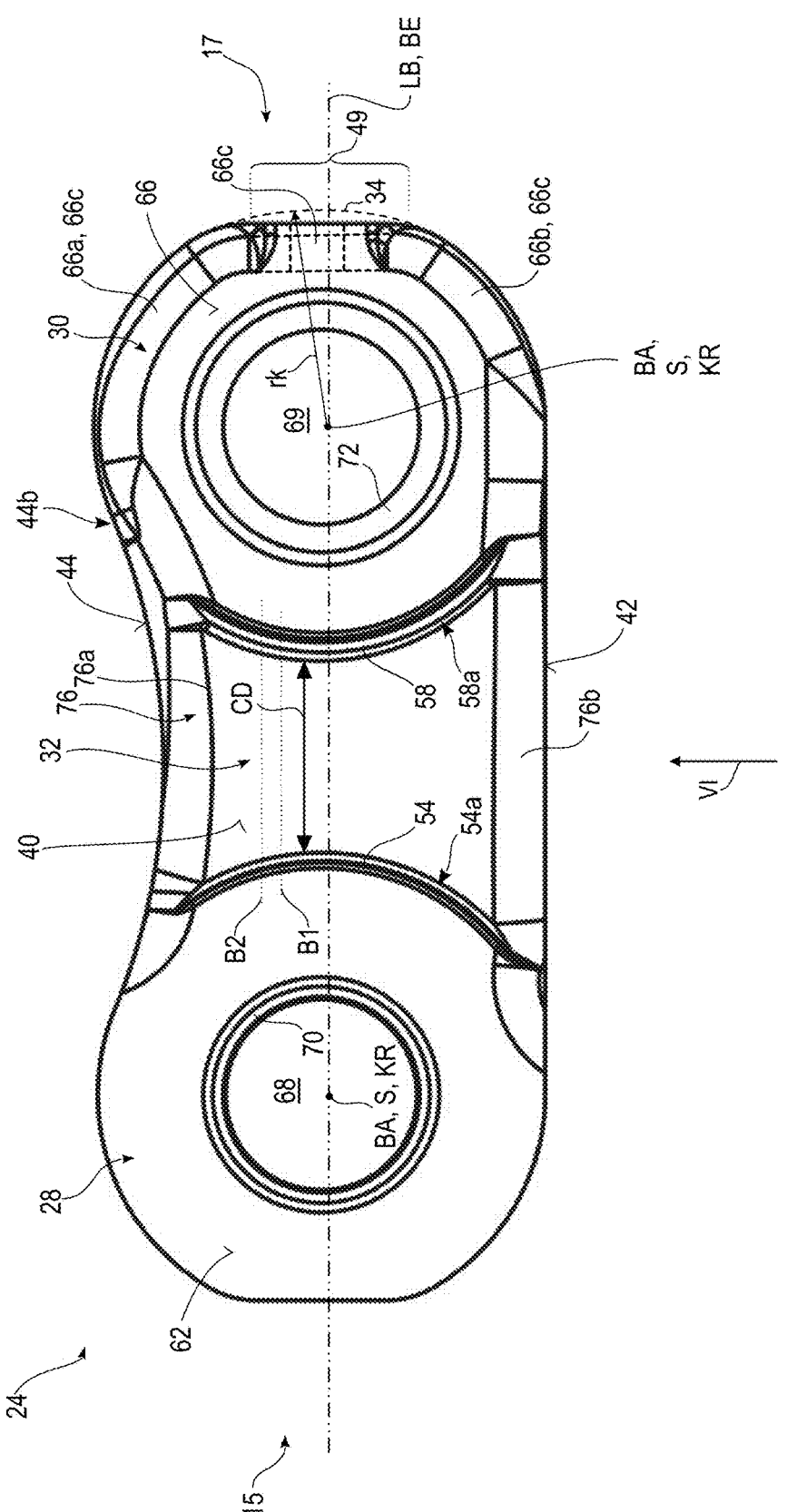
FIG. 7 is a side view of the chain plate inner surface of the chain plate 24 in FIGS. 5 and 6, as viewed along the transverse chain axis along the arrow VII in FIG. 6.

Since the offset regions 52 and 56 of the chain link 12 result from the offset regions 54 and 58 of the chain plates 24 and 26, the offset regions will be described in more detail in the following text as offset regions 54 and 58 of the chain plate 24. The illustrations of the chain plate 24 in FIGS. 5 to 7 are most suitable for this. In FIGS. 5 to 7, a first longitudinal end, contributing to the formation of the wider longitudinal end 14 of the chain link 12, of the chain plate 24 is indicated by the reference sign 15 and a second longitudinal end, contributing to the formation of the narrower longitudinal end 16 of the chain link 12, of the chain plate 24 is identified by the reference sign 17. It is only because of the stated allocation that the first longitudinal end 15 is also referred to as wider longitudinal end 15 in the following text and the second longitudinal end 17 is referred to as narrower longitudinal end 17. The flattened height portion, contributing to the formation of the height portion 48 of the chain link 12, of the chain plate 24 at the narrow longitudinal end 17 is provided with the reference sign 49. In the flattened height portion 49, the edge of the chain plate 24 is less curved than in adjacent edge portions, and may be uncurved or planar. At the height portion 49 in FIG. 7, the course of the chain roller 34 and its radius rk are indicated by dashed lines.

For the sake of completeness, it should be noted that the edge of the chain plate 24 also has, at the wider longitudinal end 15, a height portion with a flattened portion that is less curved, or uncurved, compared with adjacent edge portions.

In the chain plate outer surface 38, the first offset region 54 represents a convex curvature of the chain plate outer surface 38 and the second offset region 58 represents a concave curvature thereof. In the chain plate inner surface 40, the opposite is the case (see FIG. 6). In that case, the first offset region 54 forms a concave curvature of the chain plate inner surface 40 and the second offset region 58 forms a convex curvature thereof. Therefore, the two offset regions 54 and 58, following one another along the longitudinal chain path LB, result in an offset formation of the chain plate 24.

The two offset regions 54 and 58 have, in the illustrated exemplary embodiment, a partially circular course about the longitudinal end region respectively adjoining the offset region (see FIGS. 5 and 7). The wider longitudinal end region 28 has, in the chain plate outer surface 38, a substantially planar annular surface 60, which extends in a closed manner about the virtual pivot axis S passing through the wider longitudinal end region 28. In FIG. 5, the planar annular surface 60 is adjoined, towards the lower chain plate longitudinal edge 44, by a bevel 60a, which extends as far as the lower chain plate longitudinal edge 44. The bevel 60a extends out of a flattened height portion 49a, opposite to the flattened height portion 49, at the wider longitudinal end 15 and extends along the convexly curved edge of the chain plate 24 until shortly before or as far as the turning point 44a, located closer to the wider longitudinal end 15, of the lower chain plate longitudinal end 44, where its curvature changes from convex to concave. The bevel 60a extends, in the illustrated exemplary embodiment, through more than a quarter, but less than a third, of a full revolution about the chain roller axis KR passing through the wider longitudinal end region 28.

The bevel 60a may, in a section plane which contains the chain roller axis KR passing centrally through an opening 68 in the wider longitudinal end region 28, have a straight or curved course. In the case of a curved course, this is convexly curved in plane view of the chain plate outer surface 38.

The opening 68 is surrounded, in the chain plate outer surface 38, by an encircling depression 68a. The depression 68a serves to receive material at the longitudinal end of a pin 36. At its two longitudinal ends, the pin 36 may be widened radially, in a plastically deforming manner, into a respective depression 68a in the respective wider longitudinal end region 28 of the chain plates 24 of a chain link 12. As a result, a pin can hold the two wider longitudinal end regions 28 of the chain plates 24 of a chain link 12 and the two narrower longitudinal end regions 30, enclosed by these two wider longitudinal end regions 28, of the two chain plates 24 of a chain link 12 immediately adjacent to the aforementioned chain link 12 in a form-fitting manner between one another. Furthermore, as a result of the receiving space, provided by the depression 68a, for material of the pin 36, the pin 36 can be arranged flush with the outer surface of the wider longitudinal end region 18 of a chain link, this considerably improving the shifting behaviour of the bicycle chain 10, since its outer surface does not having any protrusions that impede shifting, which could collide, during a shifting operation, with other components such as a chain guide, a chain wheel or a chain pinion.

Likewise, the narrower longitudinal end region 30 has, in the chain plate outer surface 38, a substantially planar annular surface 64, which extends in a closed manner about the pivot axis S passing through the narrower longitudinal end region 30.

In the chain plate inner surface 40, the wider longitudinal end region 28 has a substantially planar annular surface 62, which extends in a closed manner about the virtual pivot axis S passing through the wider longitudinal end region 28. Likewise, the narrower longitudinal end region 30 has, in the chain plate inner surface 40, a substantially planar annular surface 66, which extends in a closed manner about the pivot axis S passing through the narrower longitudinal end region 30.

As is illustrated in the side view, showing the inner side of the chain plate 24, in FIG. 7, in the first offset region 54, the transition from the planar annular surface 62 to the adjacent narrowing portion 32 is formed by a stepped arrangement 54a with one or more steps. The stepped arrangement 54a graduates, in FIG. 7, the inner surface of the chain plate 24 in the direction away from the viewer of FIG. 7. In the same way, in the second offset region 58, the transition from the planar annular surface 66 to the adjacent narrowing portion 32 is formed by a stepped arrangement 58a with one or more steps. The stepped arrangement 58a also graduates, in FIG. 7, the inner surface of the chain plate 24 away from the viewer of FIG. 7.

Since, as FIG. 5 shows, the transition from the annular surfaces 60 and 64 in each case to the adjacent narrowing portion 32 is formed without steps at the chain plate outer surface 38, but with steps at the chain plate inner surface 40, the chain plate 24 is formed, in the narrowing portion 32, with a smaller material thickness than in the longitudinal end regions 28 and 30, where the material thickness of the chain plate 24 is defined by the spacing of the mutually opposite annular surfaces 60 and 62 (in the wider longitudinal end region 28) and, respectively, by the mutually opposite annular surfaces 64 and 66 (in the narrower longitudinal end region 30). As a result of a reduced material thickness of the chain plate 24 in the region between the longitudinal end regions 28 and 30, a tooth engagement space 46 formed with the involvement of the chain plate 24 is enlarged along the virtual transverse chain axis BA, this facilitating tooth engagement. In an embodiment, a narrowing portion 32 forms the majority of the section between two virtual chain roller axes KR of a chain plate 24, such that, to facilitate tooth engagement, a inclined narrowing portion 32 is thinner than material regions, orthogonal to the virtual chain roller axes KR, of the chain plate 24, which directly surround openings 68 and 69.

As is apparent from the view in FIG. 6, in which the viewer is looking at the upper chain plate longitudinal edge 42, and in FIG. 7, in which the viewer is looking at the chain plate inner surface 40, the circular opening 68 that passes through the chain plate 24 in the wider longitudinal end 28 and receives a longitudinal end of a pin 36 when the bicycle chain 10 is fully mounted, is surrounded, on the inner side of the chain plate 24, by a bead 70 encircling the circular opening 68. The bead 70 projects, along the transverse chain axis BA, by less than half, or in another embodiment by less than a quarter, of the spacing, to be measured along the transverse chain axis BA, between the planar annular surfaces 60 and 62.

A second embodiment of the chain plate 24 and thus of the bicycle chain 10 is also indicated schematically by way of dashed lines in FIG. 6. The first offset region 54' is located, in this second embodiment, closer to the chain roller axis KR passing through the narrower longitudinal end region 30 than to the chain roller axis KR passing through the wider longitudinal end region 28. The position and design of the second offset region 58 is unchanged in this second embodiment compared with the above-described first embodiment illustrated by solid lines in FIG. 6. The narrowing portion 22' and 32', respectively, of the second embodiment is therefore shorter along the longitudinal chain path LB and the portion having the maximum inner chain link width is longer along the longitudinal chain path LB than the corresponding portions of the above-described first embodiment. Since the first offset region 54' of the second embodiment is located at a distance from the encircling lateral surface of the chain roller accommodated in the wider longitudinal end region and the narrowing portion 22' and 32', respectively, of the second embodiment scarcely supports an insertion movement of a chain wheel tooth into the tooth engagement space 46, the first offset region 54' can extend in a rectilinear manner, for instance parallel to the vertical chain axis HA. The first offset region 54' can therefore be produced by bending or, again, by stamping.

Furthermore, a third embodiment of the chain plate 24 and thus of the bicycle chain 10 is indicated highly schematically by way of dashed lines in FIG. 6. The position and design of the first offset region 54 is unchanged in this third embodiment compared with the above-described first embodiment illustrated by solid lines in FIG. 6. The second offset region 58" is located, in this third embodiment, closer to the chain roller axis KR passing through the wider longitudinal end region 28 than to the chain roller axis KR passing through the narrower longitudinal end region 30. The narrowing portion 22" and 32", respectively, of the third embodiment is therefore shorter along the longitudinal chain path LB and the portion having the maximum inner chain link width is longer along the longitudinal chain path LB than the corresponding portions of the above-described first embodiment. Since the second offset region 58" of the third embodiment is located at a distance from the encircling lateral surface of the chain roller accommodated in the wider longitudinal end region 28 and the narrowing portion 22" and 32", respectively, of the third embodiment scarcely supports an insertion movement of a chain wheel tooth into the tooth engagement space 46, the second offset region 58" can extend in a rectilinear manner, for instance parallel to the vertical chain axis HA. The second offset region 58" can therefore be produced by bending or, again, by stamping.

In the case of the second and third embodiments, indicated merely with different dashed lines, either the wider longitudinal end region 28, orthogonal to the chain roller axes KR, is embodied in a longer manner along the longitudinal chain path LB than the narrower longitudinal end region 30, or vice versa. Therefore, in the case of the indicated second embodiment, a portion, located between the narrowing portion 32' and the opening 68, of the chain plate is thinner than a chain plate region, immediately surrounding the opening 68, with the planar surfaces 60 and 62. Analogously thereto, in the case of the indicated third embodiment, a portion, located between the narrowing portion 32" and the opening 69, of the chain plate is thinner than a chain plate region, immediately surrounding the opening 69, with the planar surfaces 64 and 66. Again, the thinner formation of the chain plate region delimiting the tooth engagement space is intended to enlarge the volume available for tooth engagement in the tooth engagement space and thus facilitate tooth engagement.

On the inner side of the chain plate 24, a collar 72 projects away from the chain plate 24 along the transverse chain axis BA. This collar 72, which is formed coaxially with the circular opening 69 that passes all the way through the chain plate 24 in the narrower longitudinal end region 30 and surrounds said opening all around the latter, projects, in the fully mounted bicycle chain 10, into the central recess in the chain roller 34. The pin 36 that connects the two chain plates 24 and 26 that are opposite one another along the transverse chain axis BA passes through the collar 72.

FIG. 5 shows an annular region 74 that surrounds the opening 69, said annular region adjoining the planar annular surface 64 radially on the inside and forming, as, for instance, a quarter-torus surface, a transition between the substantially planar annular region 64 and a radially inner surface of the collar 72.

The projecting length of the collar 72 from the planar annular surface 66, surrounding it, along the transverse chain axis BA amounts to more than three times, or in another embodiment more than four times the projecting length of the bead 70 with regard to the planar annular surface 62 surrounding the bead 70. In the fully mounted state, the bead 70 projects into the space, opened up by the curved region 74, radially on the inside of the planar annular surface 64 and contributes to defining the pivot axis S of the chain plates, 24 on one side and 26 on the other side, that immediately follow one another along the longitudinal chain path LB.

The centre of the abovementioned partially circular course of the first offset region 54 and of the second offset region 58 is formed by the in each case closest pivot axes S, which are also the centre of the opening 68 and 69, respectively, surrounding them. The partially circular first offset region 54 is in this case formed, especially in the chain plate inner surface 40, in the present case also in the chain plate outer surface 38, concentrically with the opening 68 which it surrounds radially on the outside along a portion. The partially circular second offset region 58 is formed, especially in the chain plate inner surface 40, in the present case also in the chain plate outer surface 38, concentrically with the opening 69 which is surrounds along a portion radially on the outside.

The partially circular formation of the offset regions 54 and 58 in the chain plate inner surface form, in the chain plate inner surface 40, starting from the chain plate longitudinal edge 44 on the engagement side of the chain plate 24, in the direction of the reference plane BE, an insertion aid for a tooth engagement space delimited by the chain plate 24.

Figure 6A:
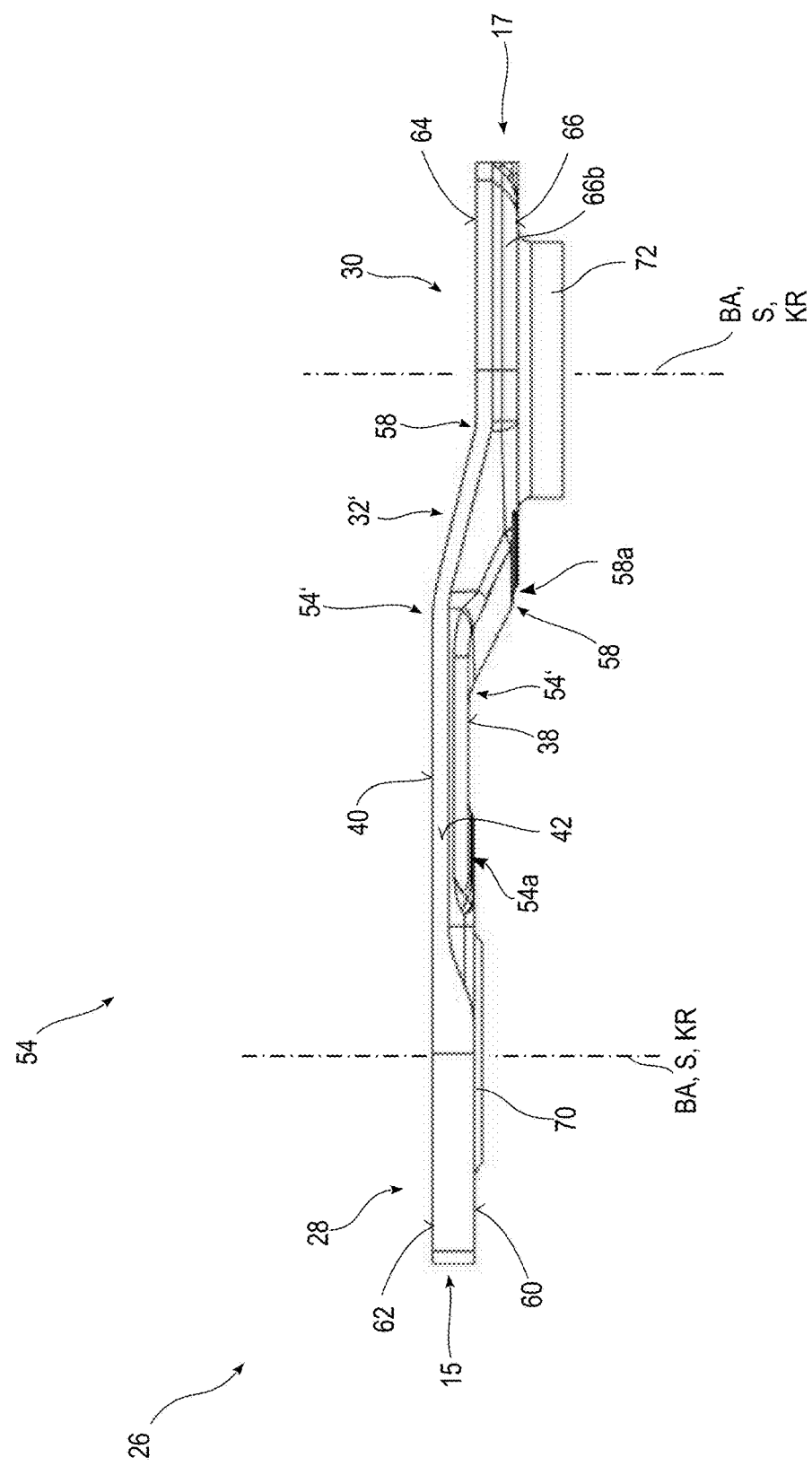
FIG. 6A is a plan view, corresponding to FIG. 6, of the longitudinal edge, located away from the engagement side, of a chain plate 26 of a second embodiment indicated in FIG. 6.

FIG. 6A shows a further possible configuration of a chain plate of the abovementioned second embodiment with a first offset region 54' offset closer to the narrower longitudinal end region 30. The perspective of the chain plate 26 in FIG. 6A corresponds to that in FIG. 6. However, in FIG. 6A, a chain plate 26 located opposite a chain plate 24 in the direction of the virtual transverse chain axis BA is illustrated. A chain plate 24 that matches the chain plate 26 in FIG. 6A is formed mirror-symmetrically to the chain plate 26 in FIG. 6A, specifically with regard to an axis of mirror symmetry which is oriented orthogonally to the virtual transverse chain axis BA and orthogonally to the drawing plane of FIG. 6A. It is also readily apparent from FIG. 6A that the thickness, to be measured along the virtual transverse chain axes BA and along the chain roller axes KR, respectively, of the chain plate 26, is smaller in the region between the inclined narrowing region 32' and the planar annular surfaces 60 and 62 surrounding the opening 68 than in the region, immediately surrounding the openings 68 and 69, of the chain plate. As a result, a tooth engaging, between the chain roller axes KR, in a tooth engagement space 46 formed by the chain plate 26 in FIG. 6A and its chain plate 24 formed in a mirror-inverted manner has a greater engagement volume available to it than without this thinner formation. This facilitates tooth engagement in the tooth engagement space 46.

As is illustrated in FIG. 7, the spacing CD that the first and the second offset region 54 and 58, respectively, have from one another along the longitudinal chain path LB increases continuously from the reference plane BE to the longitudinal edge 44 on the engagement side of a chain link 12 or of the chain plates 24 and 26. Thus, the spacing CD increases in viewing planes B1 and B2 that are parallel to the reference plane BE with increasing distance from the reference plane BE. This is the case, in the illustrated embodiment, on both sides of the reference plane BE. On account of the asymmetric configuration, with respect to the reference plane BE, of the chain plate 24, only the course of the offset regions 54 and 58 on the side, facing the concave portion of the chain plate longitudinal edge 44, of the reference plane BE is relevant as an insertion aid, however, since a chain wheel tooth is inserted into a tooth engagement space 46 delimited by the chain plate 24 and withdrawn therefrom again only from the side of the chain plate longitudinal edge 44.

The second offset region 58 is formed, in the chain plate outer surface 38, with a partially circular shape with the pivot axis S as its centre. In this example the planar annular surface 64, surrounded by the curved second offset region 58, at the narrower longitudinal end 30 of the chain plate 24, on the fully mounted bicycle chain 10, is arranged opposite the planar annular surface 62, in the chain plate inner surface 38, at the wider longitudinal end 28 of another chain plate 24, and these two mutually opposite surfaces 64 and 62 are intended to be able to pivot about a pivot axis S that is then a common pivot axis. For this purpose, a coaxial planar annular surface about the pivot axis S that is then a common pivot axis is provided.

The longitudinal spacing CD between the first and the second offset region 54 and 58, respectively, is at a minimum in the reference plane and corresponds there, in the illustrated exemplary embodiment, approximately to the radius rk of a chain roller 34.

As is shown in FIG. 7, the chain plate 24 has, in its chain plate inner surface 40, starting from its partially concave chain plate longitudinal edge 44, a bevel 76 with which an entry opening, leading into the tooth engagement space 46 on the engagement side, of a chain link 12 is enlarged. The bevel 76 is formed in an inclined and/or curved manner in FIG. 7 such that its surface gets farther away from the viewer of FIG. 7 starting from its peripheral line 76a, located closer to the reference plane, in the direction of the chain plate longitudinal edge 44. This also creates an insertion aid for a tooth entering the tooth engagement space 46 from the chain plate longitudinal edge 44, but this time an insertion aid caused by a reduction in the clear inner chain link width iKW on approaching the reference plane BE. The curved offset regions 54 and 58 provide, in contrast, an insertion aid by reducing the clear width of the tooth engagement space 46 along the longitudinal chain path LB. Between the chain plates 24 and 26, the tooth engagement space 46 is defined, along the longitudinal chain path LB, substantially by the lateral surfaces 35 of the chain rollers 34. Since the curved offset regions 54 and 58 follow the course of the lateral surface 35 of the chain roller 34 that is located closest to them in each case, or extend flush therewith, the curvature of the lateral surfaces 35 of the chain rollers can be exploited as far as the chain plate longitudinal edge 44. A rectilinear offset region that extends along the vertical chain axis H, as is obtained by simply bending a chain plate 24 or 26 about a bending axis parallel to the vertical chain axis HA, would reduce the clear inner chain link width iKW precisely in the entry region, close to the entry opening, that is important for a shifting operation.

For this purpose, the chain plate longitudinal edge 44, in the narrower longitudinal end region 30 of the chain plate 24, is also designed to follow the lateral surface 35 of the chain roller 34 immediately adjacent to the narrower longitudinal end region 30, and is designed to be flush with the lateral surface 35, such that the narrower longitudinal end region 20, projecting into the wider longitudinal end region 18 of another chain link 12, of a chain link 12 that is immediately adjacent along the longitudinal chain path LB also does not occupy, and thus reduce the size of, the entry region of the chain link 12 into the tooth engagement region 46 with its chain plates.

Formed on the chain plate inner surface 40 of the chain plate 24, in the region of the annular surface 66, are two bevels 66a and 66b, which extend from the annular surface 66 to the respective edge of the chain plate 24.

The bevel 66a extends, at the lower chain plate longitudinal edge 44, approximately from the turning point 44b which is closer to the narrower longitudinal end 17 and at which the lower chain plate longitudinal edge 44 changes its curvature between concave and convex into the flattened height portion 49. The bevel 66a ends, in the illustrated embodiment, below the reference plane BE.

The bevel 66b extends from the flattened height portion 49, starting above the reference plane BE, into the straight portion of the upper chain plate longitudinal edge 42, where the bevel 66b continues as a bevel 76b into the region of the annular surface 62 and finally ends.

The bevels 66a and 66b may have a straight or a curved course in a section plane containing the chain roller axis KR that passes centrally through the opening 69. In the case of a curved course, this course is convexly curved in plan view of the chain plate inner side 40. Likewise, the bevel 76b may have a straight or a curved course in a section plane orthogonal to the longitudinal chain path LB. Again, in the case of a curved course, the bevel 76*b* is convexly curved on viewing the chain plate inner side 40.

As a result of the described bevels 66*a* and 66*b*, the bicycle chain 10 as a whole obtains greater twistability about a torsion axis extending parallel to its longitudinal chain path LB. The bendability of the bicycle chain 10 about a bending axis extending parallel to its vertical chain axis HA can also be increased compared with a bicycle chain without such bevels, this enhancing shifting of the chain from one chain pinion onto another, coaxial chain pinion and thus improving the shifting capability of the chain.

Between the two bevels 66*a* and 66*b*, a portion of the planar annular surface 66 extends, in the region of the flattened height portion 49, as far as the narrower longitudinal end 17 of the chain plate 24, or of the chain link 12 formed by the chain plate 24. Alternatively, this portion can also be bevelled in the flattened height portion 49, such that a bevel, referred to herein as bevel 66*c*, extends all around the opening 69 from the bevel 76 to the bevel 76*b* in the narrowing portion 32. This region that is bevelled all around is indicated additionally by dashed lines in FIG. 7.

As a result of a continuous bevel 66*c*, the deflectability of the bicycle chain 10 from its course along the longitudinal chain path LB about a bending axis orthogonal to the longitudinal chain path LB and parallel to the virtual vertical chain axis HA is increased further, thereby further improving the shifting capability of the chain. The deflectability of the bicycle chain 10 about a bending axis parallel to the virtual vertical chain axis HA creates leeway for a rear derailleur to move the bicycle chain 10 circulating in an unchanged manner on a front chainring, in spite of its basically stiff and rigid chain links 12, in the region of a rear pinion assembly parallel to the transverse chain axis BA and thus to shift it between adjacent coaxial pinions.

Figure 7A:
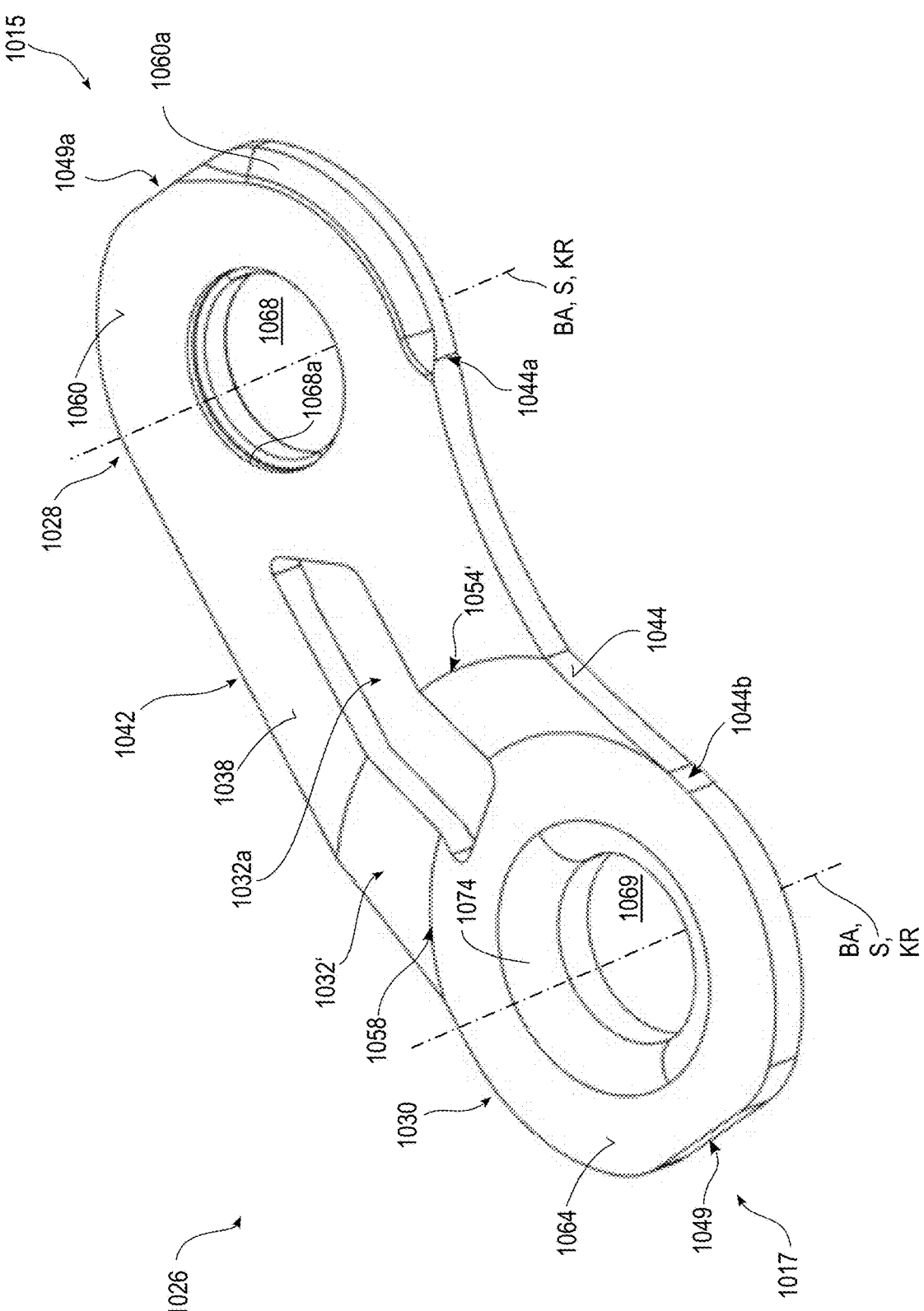
FIG. 7A is a perspective view of the chain plate outer surface of a fourth embodiment of a chain plate 1026.
Figure 7B:
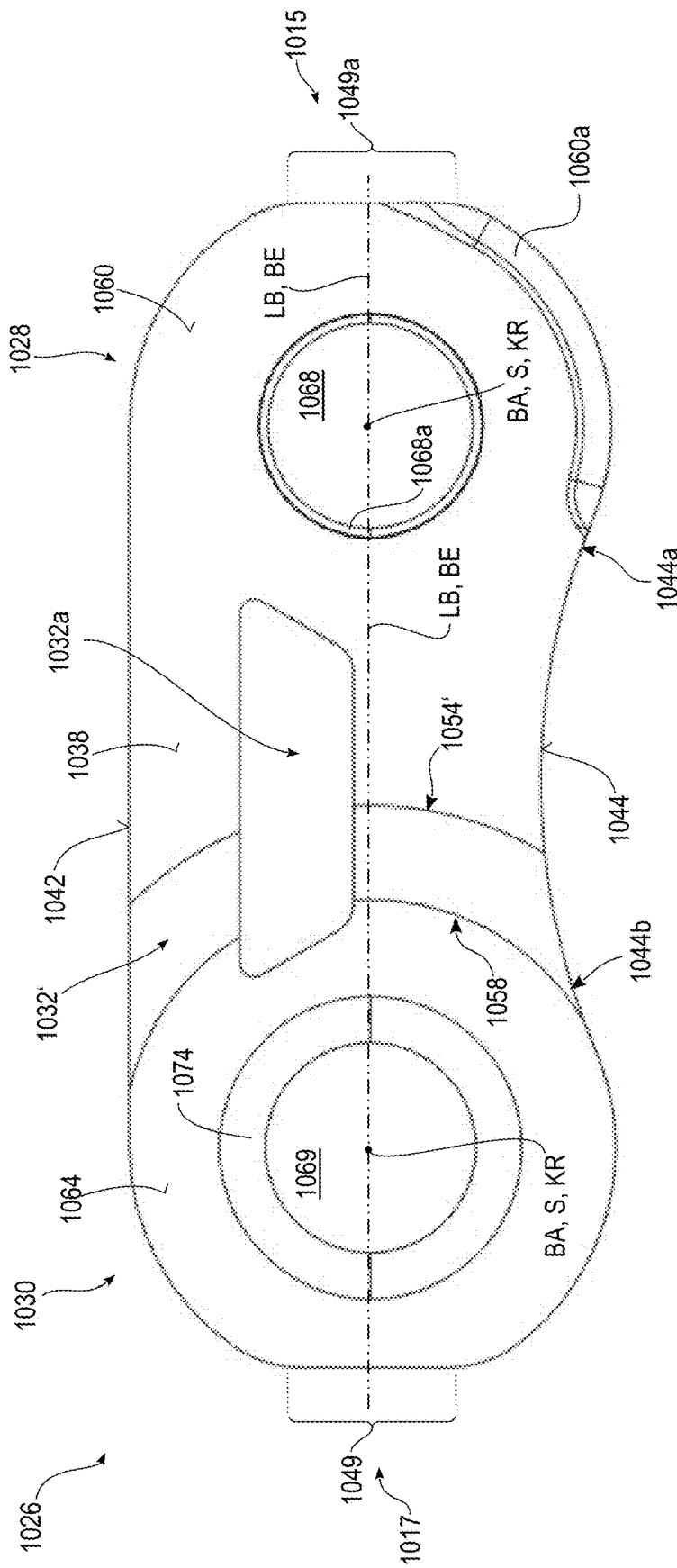
FIG. 7B is a side view of the chain plate outer surface of the chain plate 1026 in FIG. 7A, as viewed along the transverse chain axis.

FIG. 7A shows a fourth embodiment of a chain plate, corresponding, in a specific exemplary form, to a chain plate 26, in a perspective view looking predominantly at its chain plate outer side. Components and component portions that are identical and functionally identical to the components and component portions, explained above, of the first to third embodiments of a chain plate are provided with the same reference signs in FIG. 7A, but increased by the number 1000. The chain plate 1026 in FIG. 7A is explained in the following text only in as much as it differs from the above-described chain plates 24 and 26, to the description of which reference is otherwise also made in order to explain FIG. 7A. FIG. 7B shows the chain plate 1026 from FIG. 7A in a side view looking at the chain plate outer surface 1038. With regard to the position of its offset regions, the chain plate 1026 is formed like the above-described second embodiment. This is only by way of example, however. It could, alternatively, be configured like the above first or third embodiment with regard to the position of its offset regions.

The chain plate 1026 of the fourth embodiment has, to save weight, a recess 1032*a*, which passes all the way through the chain plate 1026 in the thickness direction and which is surrounded all around by material of the chain plate 1026.

As is shown in particular in FIG. 7B, the recess has a roughly trapezoidal shape with rounded corners, wherein the longer of the two parallel trapezium sides is located closer to a longitudinal edge of the chain plate 1026, in this case: closer to the rectilinear longitudinal edge 1042, and extends parallel to the rectilinear longitudinal edge 1042, and wherein the shorter trapezium side, parallel to the longer trapezium side, of the recess 1032*a* is located closer to the vertical centre, i.e. closer to the reference plane BE containing the chain roller axes KR, and extends parallel thereto.

The trapezoidal recess 1032*a* is formed mirror-symmetrically with respect to a plane of symmetry extending in the direction of the virtual vertical chain axis and parallel to the virtual transverse chain axis.

The oblique trapezium sides, extending between the longer and the shorter of the two parallel trapezium sides, at each longitudinal end of the trapezoidal recess 1032*a* are at the same distance from the opening 1068 and 1069, respectively, located closest to them. The two parallel trapezium sides of the recess 1032*a* are longer than the inclined sides connecting them. The direction of inclination of the inclined sides corresponds roughly to the direction of curvature of the portion, located closest to an inclined side, of the boundary wall of an opening 1068 or 1069, respectively, located closest to the inclined side.

In order not to excessively weaken the chain plate 1026 structurally with the recess 1032*a*, the recess 1032*a* is located entirely between the reference plane BE and the rectilinear longitudinal edge 1024, wherein the distance of the recess 1032*a* from the rectilinear longitudinal edge 1042 is greater than from the reference plane BE.

The recess 1032*a* may have been formed, for example, by punching a corresponding surface region out of the chain plate 1026. In the illustrated exemplary embodiment, the recess 1032*a* passes through both the offset regions 1054 and 1058. This would also be the case if the chain plate 1026 were formed as per the first or the third embodiment with regard to the position of the offset regions 1054 and 1058.

Figure 7C:
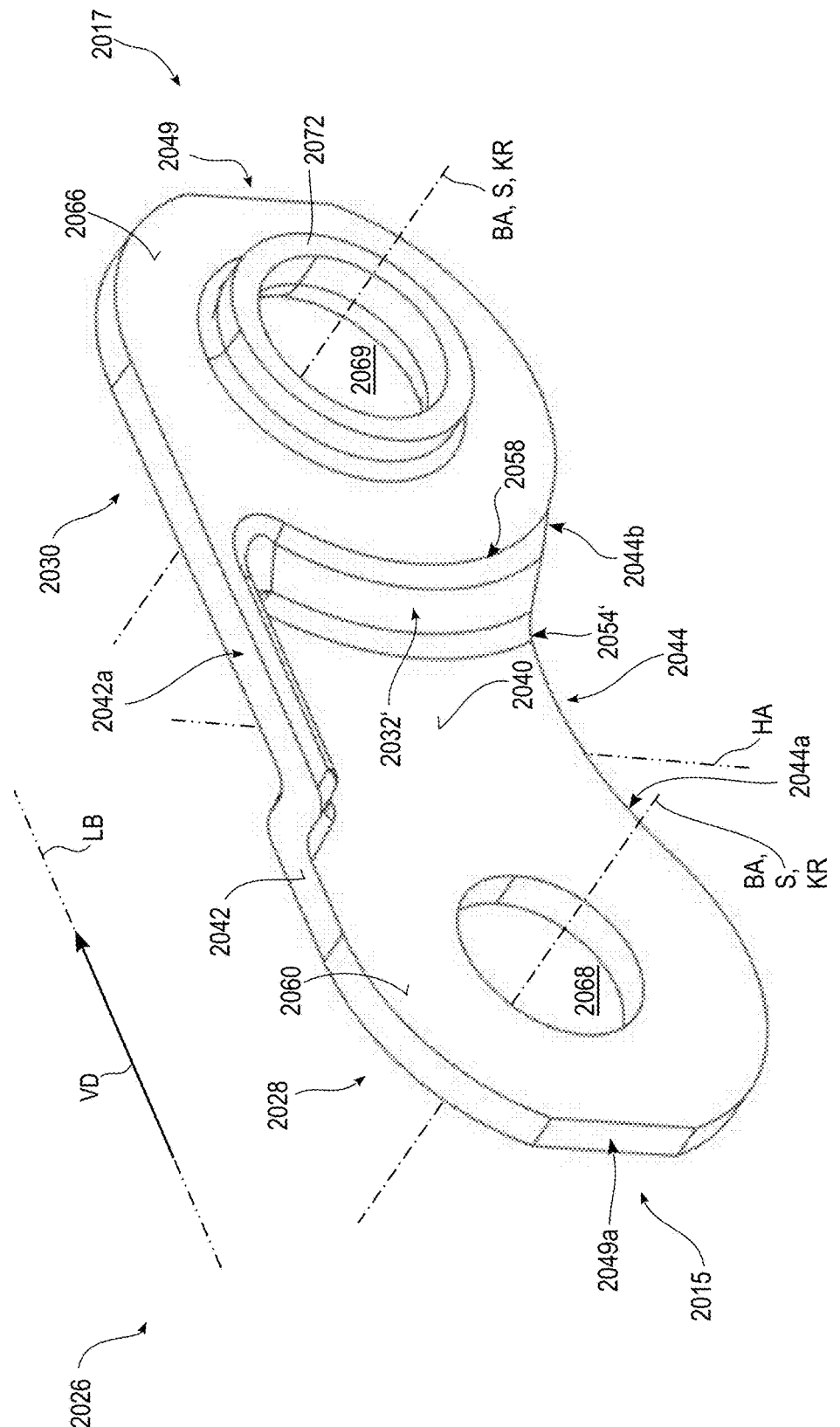
FIG. 7C is a perspective view of the chain plate inner surface of a fifth embodiment of a chain plate 2026.

FIG. 7C illustrates a fifth embodiment of a chain plate 26 according to the disclosure. Components and component portions that are identical and functionally identical to the components and component portions, explained above, of the first to fourth embodiments of a chain plate are provided with the same reference signs in FIG. 7C, but in the number range 2000 to 2999. The chain plate 2026 in FIG. 7C is explained in the following text only in as much as it differs from the above-described chain plates 24 and 26, and 1026, respectively, to the description of which reference is otherwise also made in order to explain FIG. 7C. FIG. 7C shows the chain plate 2026 in a perspective view looking predominantly at the chain plate inner side 2040. With regard to the position of its offset regions, the chain plate 2026 is formed like the above-described second embodiment. This is only by way of example, however. It could, alternatively, be configured like the above first or third embodiment with regard to the position of its offset regions.

To reinforce the chain plate 2026, in particular to reinforce it with respect to bending about a bending axis extending centrally between the openings 2068 and 2069 and orthogonal to the virtual transverse chain axis BA, parallel to the virtual vertical chain axis HA, the chain plate 2062 has a reinforcing rib 2042*a*. The reinforcing rib 2042*a* extends directly at the rectilinear edge 2042 of the chain plate 2026. Although the reinforcing rib 2042*a* could extend at a distance from the rectilinear edge 2042, it is formed directly at the edge 2042 in order to provide a tooth passing from the opposite edge 2044 into a tooth engagement space 2046 formed with involvement of the chain plate 2026 with sufficient receiving space.

The reinforcing rib 2042*a* is parallel to the longitudinal chain path LB in the illustrated exemplary embodiment. It is formed by forming a chain plate blank, but, alternatively, may also be formed by deposition of material.

The reinforcing rib 2042*a* extends along the virtual vertical chain axis HA over no more than 10% of the greatest dimensions of the chain plate 2026 along the virtual vertical chain axis HA. A surface, facing the annular surface 2066 along the virtual transverse chain axis BA towards the opposite chain plate 2024 (not illustrated), of the reinforcing rib 2042*a*, which, in spite of its small dimension along the virtual vertical chain axis HA, forms a part of the chain plate inner side 2040, extends, without steps and jumps, flush with the annular surface 2066, which surrounds the collar 2072 all around. The surface, facing along the virtual transverse chain axis, of the reinforcing rib 2042*a* and the annular surface 2066 form a common, planar surface orthogonal to the virtual transverse chain axis BA.

The reinforcing rib 2042*a* therefore extends from the narrower longitudinal end region 2030 to the wider longitudinal end region, wherein it ends early, however, such that a collision with a narrower longitudinal end region, located in the region of the opening 2068, of a following chain plate along the longitudinal chain path and possibly with a chain roller located around the opening 2068 is reliably avoided. The chain plate 2026 may have a weight-saving recess 2032*a*, as was illustrated and explained in the previous fourth embodiment.

Figure 7D:
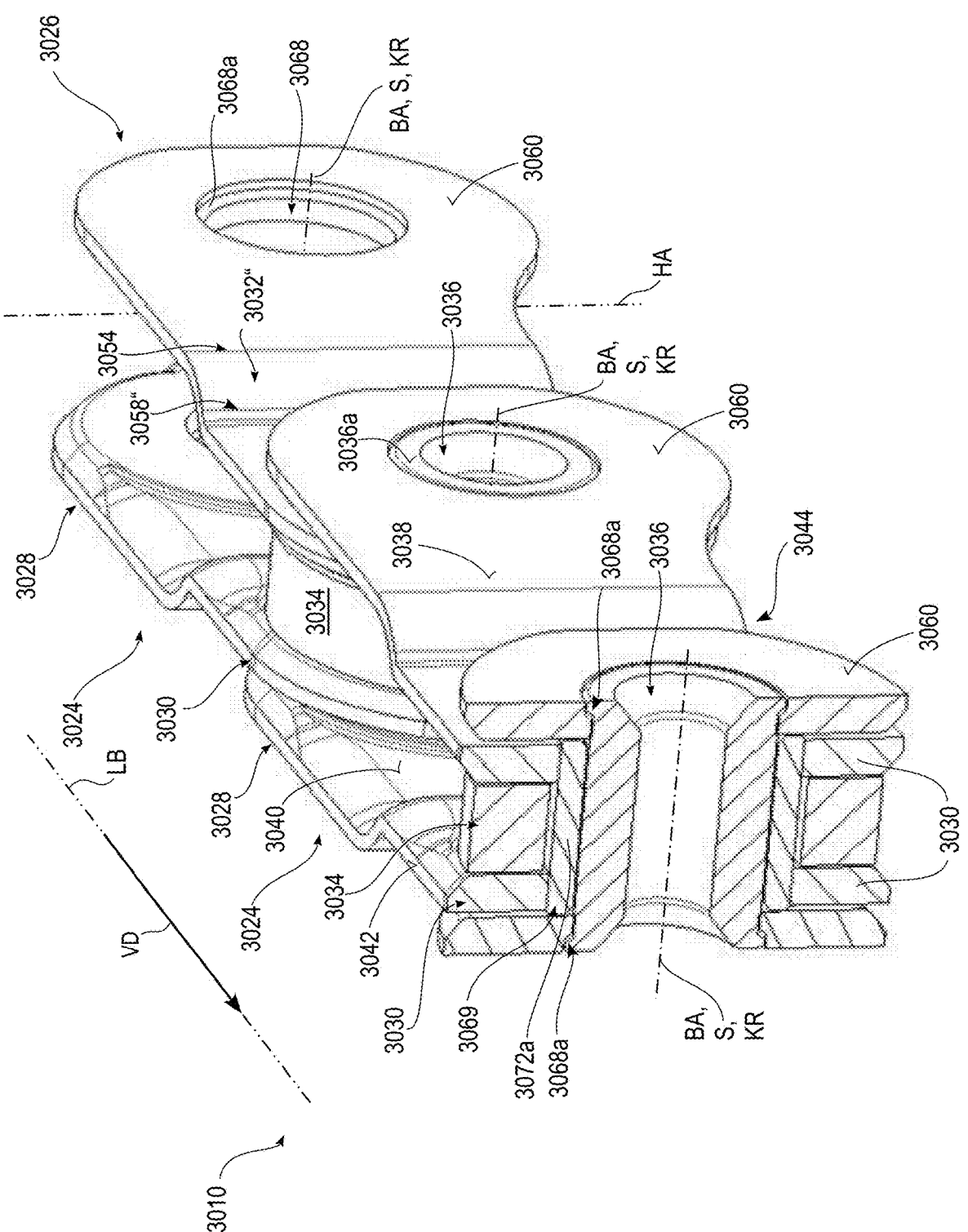
FIG. 7D is a perspective view with a view in cross section of a further embodiment, according to the disclosure, of a bicycle chain having a sixth embodiment of chain plates.

FIG. 7D shows a further embodiment, according to the disclosure, of the bicycle chain. Identical components and component portions to those in the previous embodiments are provided with the same reference signs in the embodiment in FIG. 7D, but in the number range 3000 to 3999. The embodiment in FIG. 7D is explained in the following text only in as much as it differs from the above-described bicycle chain 10 and from the above-described chain plates 24 and 26, and 1026 and 2026, respectively, to the description of which reference is otherwise also made in order to explain FIG. 7D.

The chain plates 3024 and 3026 in FIG. 7D correspond, with regard to the position of their offset regions 3054 and 3058, to the above-described third embodiment, with a second offset region 3058" located closer to the opening 3068 than to the opening 3069. This is only by way of example, however. The chain plates 3024 and 3026 could also be formed as per the first or as per the second embodiment with regard to the position of their offset regions.

The bicycle chain 3010 in FIG. 7D is illustrated not only in perspective, but also in a cross-sectional view in a section plane containing a chain roller axis KR and parallel to the virtual vertical chain axis HA.

As has already been set out above, the pins 3036 that connect the chain plates located opposite one another along the virtual transverse chain axis BA are in the form of hollow pins. It is readily apparent from the sectional view in FIG. 7D how the pin 3036 was formed, at its two longitudinal ends, in order to form a form fit, into the removed annular space of the depression 3068*a* at the chain plate outer surface 3038 of the wider longitudinal end region 3028. Thus, each longitudinal end of the hollow pin 3036 forms a rivet head, wherein the two rivet heads of a pin 3036 hold, by way of a form fit, the chain plates 3024 and 3026 arranged therebetween and the chain roller 3034 likewise arranged therebetween. An end face 3036*a* of the hollow pin 3036 is in this case substantially flush with the annular surface 3060 on the chain plate outer side 3038 of the wider longitudinal end regions 3028 of the mutually opposite chain plates 3024 and 3026. At the least, the pin 3036 does not protrude axially beyond the annular surfaces 3060 of the wider longitudinal end regions 3028 that are connected by it.

In contrast to the embodiments discussed above, the chain plates 3024 and 3026 do not have, in their narrower longitudinal end regions 3030, a protruding collar. Instead, a sleeve 3072*a* has been inserted into the mutually aligned surfaces 3069 of a chain link and connected, by way of a press fit, to the narrower longitudinal end regions 3030 of the chain links 3024 and 3026 forming the chain link.

The bead 3070 surrounding the openings 3068 on the chain plate inner side 3040, which bead is not visible in FIG. 7D, but the position of which is able to be determined by comparison with FIG. 7, can be located opposite a negative-conical surface, formed in a substantially complementary manner, at the longitudinal ends of the sleeve 3072*a*, which thus together form a kind of sliding guide for a pivoting movement of the wider longitudinal end portions 3028 of a chain link relative to the narrower longitudinal end portions 3030, arranged between them, of the further chain link that is immediately adjacent along the longitudinal chain path LB, and centre the openings 3068 in the wider longitudinal end portions 3028 relative to the openings 3069 in the narrower longitudinal end portions 3030 arranged between them.

In the case of the embodiment in FIG. 7D, the coaxially arranged components: sleeve 3072*a* and pin 3036 form a pivot joint which defines the pivot axis S for each roller 3034 of a chain link. The roller 3034 can rotate freely about the sleeve 3072*a*.

Figure 8:
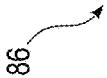
FIG. 8 is an axial front view of a pinion assembly for a rear wheel of a bicycle, driven by the bicycle chain in FIGS. 1 to 7, as per FIG. 15 with a direction of view extending along the assembly axis of the pinion assembly, along the arrow VIII in FIG. 9.
Figure 9:
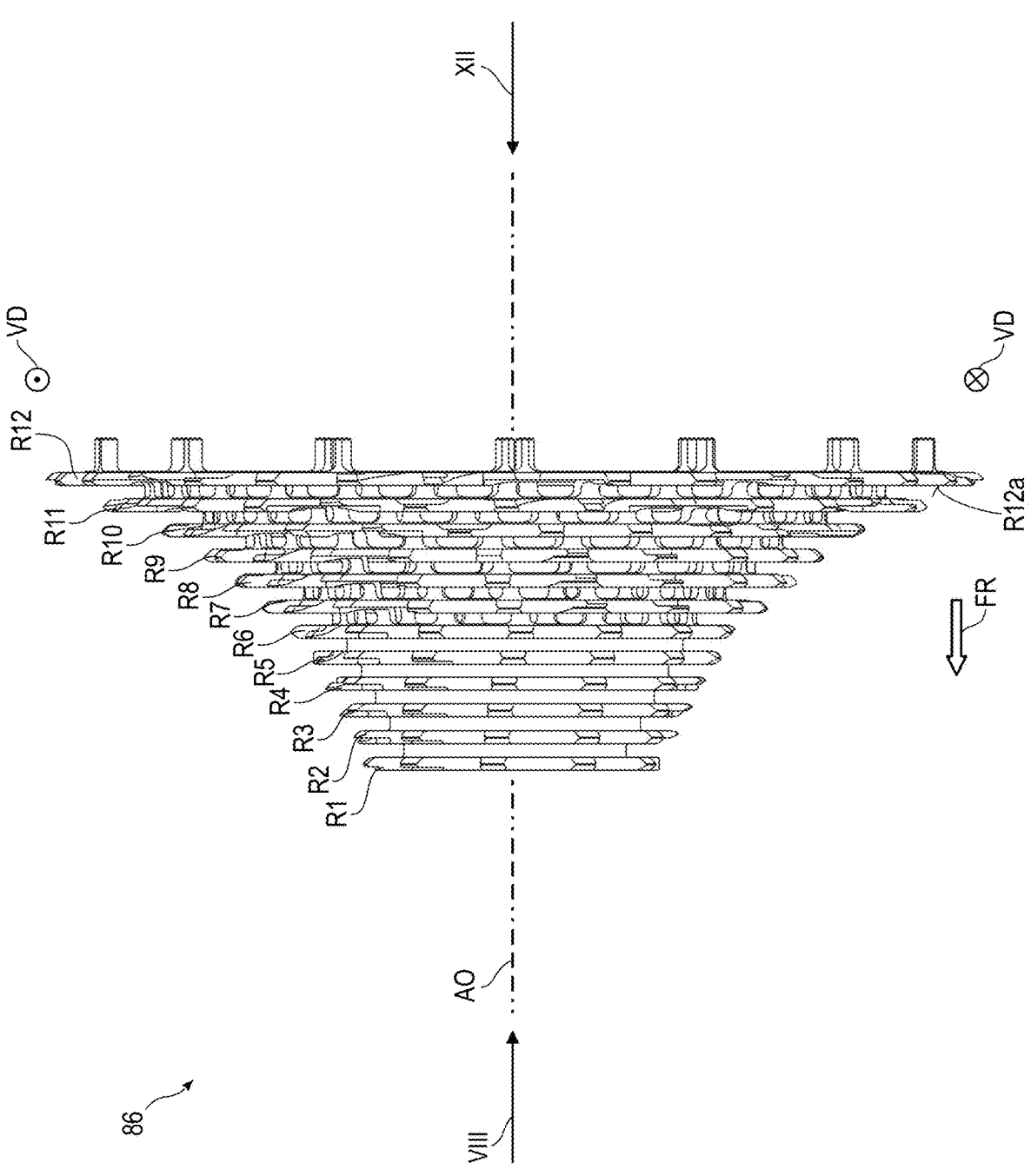
FIG. 9 is a side view of the pinion assembly in FIG. 8 with a direction of view orthogonal to the assembly axis, along the arrow IX in FIG. 8.

In FIG. 8, the rear bicycle pinion assembly 86 is illustrated as a shifting chain wheel assembly as seen along the assembly axis AO, extending orthogonally to the drawing plane of FIG. 8, of the bicycle pinion assembly 86, corresponding to the arrow VIII in FIG. 9. During operation, the bicycle pinion assembly 86 rotates about the assembly axis AO. The bicycle pinion assembly 86 is a 12-fold pinion assembly, of which the pairing of the second largest pinion R11 with 28 teeth and of the largest pinion R12 with 32 teeth is used in the following text to explain the first and second shifting operations set out in the introductory part of the description.

The forward-travel direction of rotation of the bicycle pinion assembly 86, in which the bicycle pinion assembly 86 rotates about the assembly axis when a bicycle bearing the bicycle pinion assembly 86 is driven for forward travel by the bicycle chain 10, is indicated by the arrow VD in FIGS. 8 to 12.

For the sake of completeness, the construction of the bicycle pinion assembly 86 is explained in conjunction with the side view in FIG. 9, in which the assembly axis AO extends parallel to the drawing plane of FIG. 9. The bicycle pinion assembly 86 having 12 coaxial pinions with respect to the assembly axis AO has, starting from the largest pinion R12 with 32 teeth, in the sequential direction FR, the further pinions R11 with 28 teeth, R10 with 24 teeth, R9 with 21 teeth, R8 with 19 teeth, R7 with 17 teeth, R6 with 15 teeth, R5 with 14 teeth, R4 with 13 teeth, R3 with 12 teeth, R2 with 11 teeth and R1 with 10 teeth.

Figure 10:
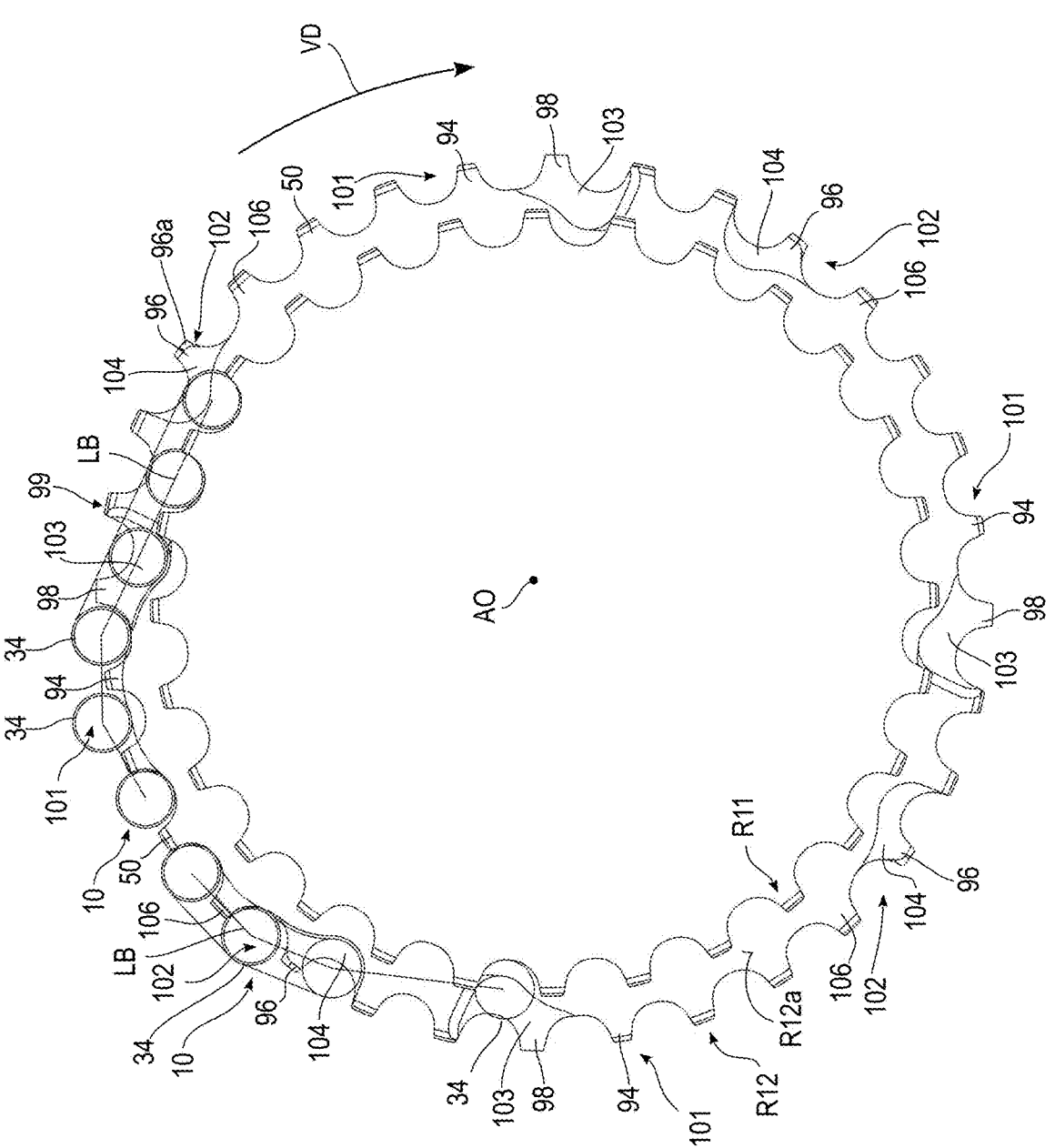
FIG. 10 is an axial front view of only the second largest and the largest pinion of the pinion assembly in FIGS. 8 and 9 with a direction of view extending along the assembly axis of the pinion assembly, along the arrow VIII in FIG. 9, wherein the course of the bicycle chain is schematically shown both when shifting from the larger to the smaller pinion and from the smaller to the larger pinion.
Figure 12:
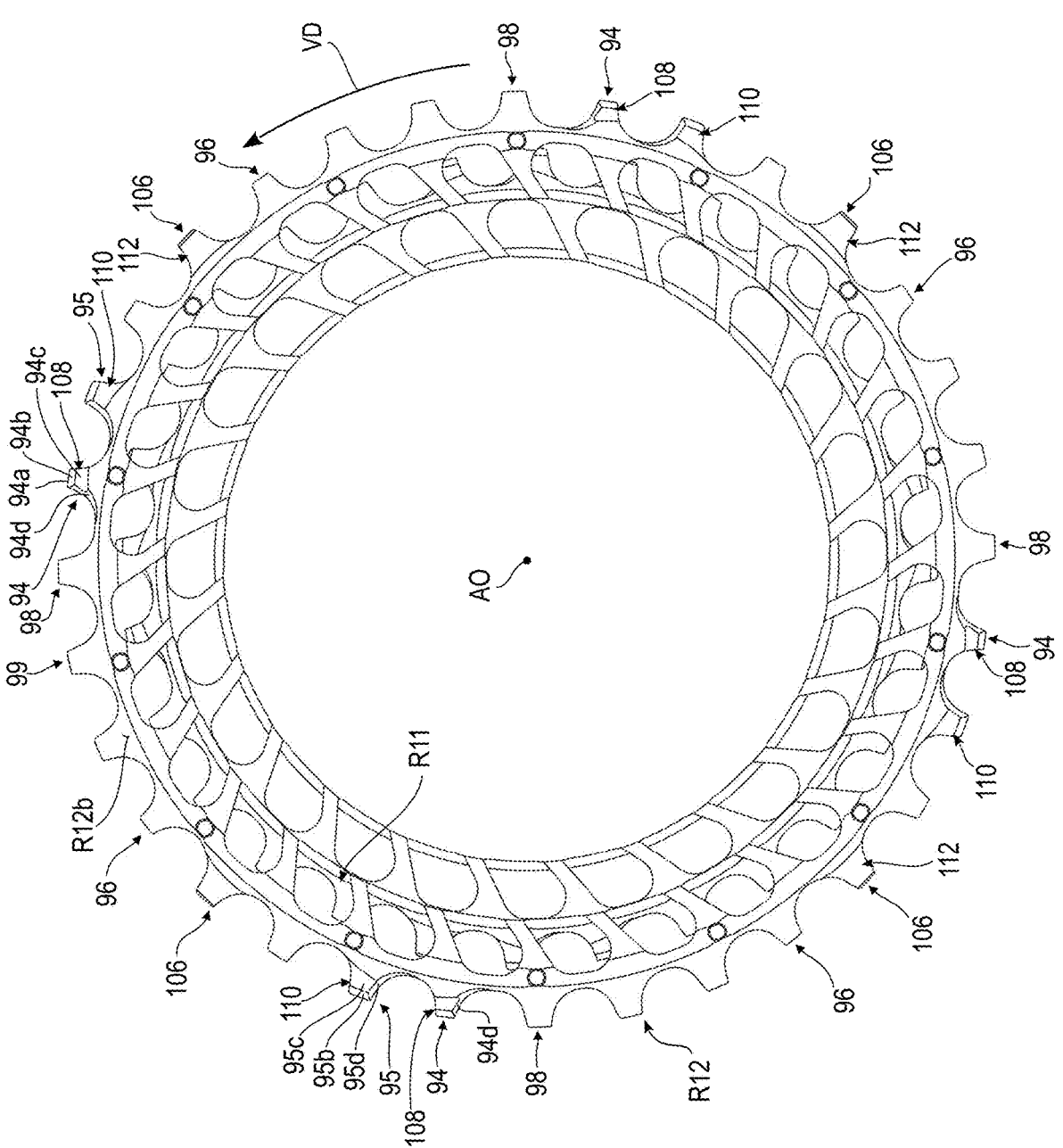
FIG. 12 is an axial rear view of the two pinions in FIG. 10 with a direction of view along the assembly axis of the pinion assembly, along the arrow XII in FIG. 9.

In FIGS. 10 and 12, only the two largest pinions R12 and R11 are illustrated to demonstrate a first shifting operation from the smaller pinion R11 to the immediately adjacent larger pinion R12 and a second shifting operation from the larger pinion R12 to the immediately adjacent smaller pinion R11, and to illustrate the structural design, chosen for this, of the pinions R11 and R12.

Figure 11:
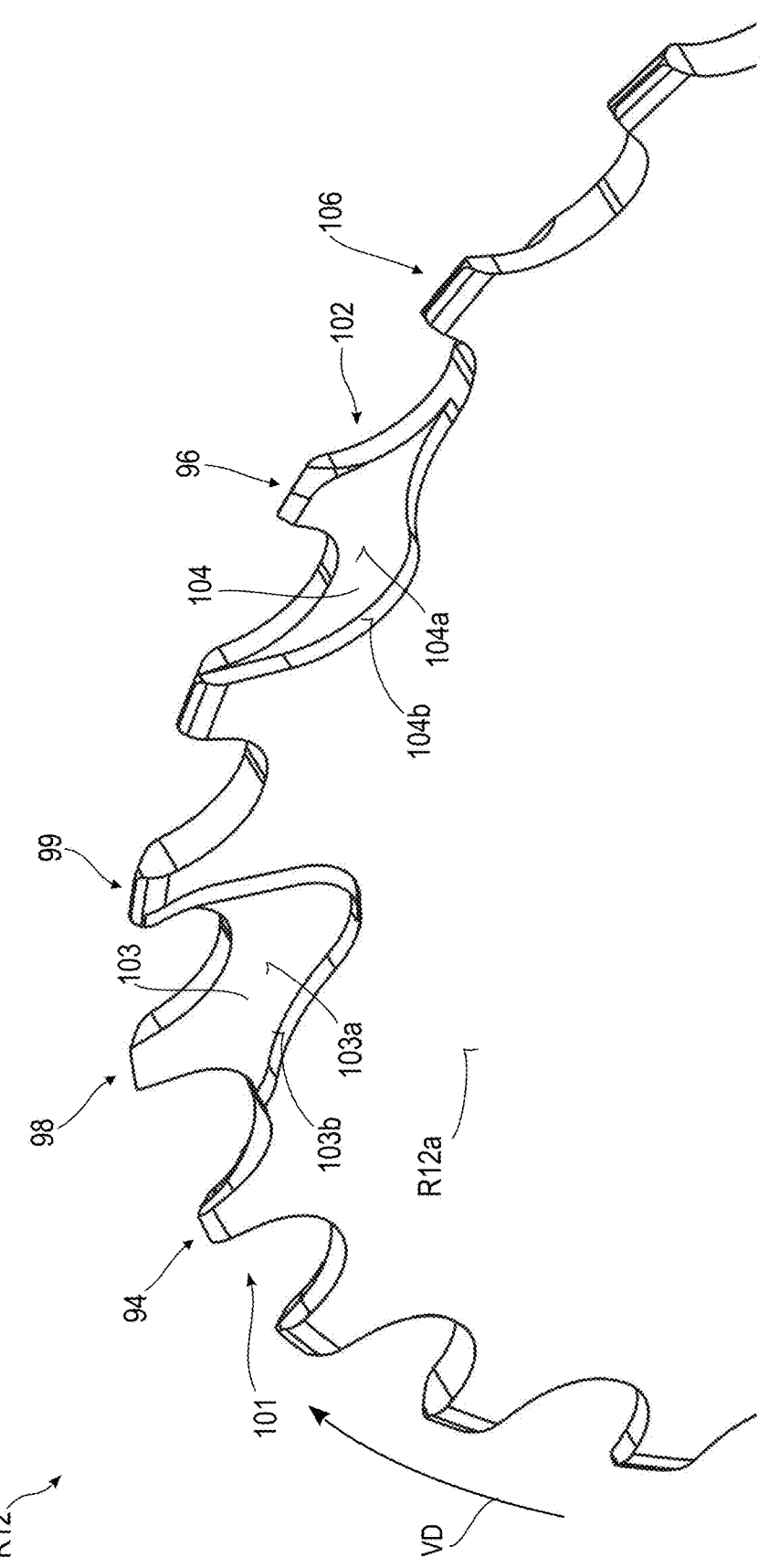
FIG. 11 is a perspective detail view of a circumferential portion of the larger of the two pinions in FIG. 10 with two different shifting gates, wherein the side, facing the smaller pinion in FIG. 10, of the larger of the two pinions in FIG. 10 is viewed.
Figure 13:
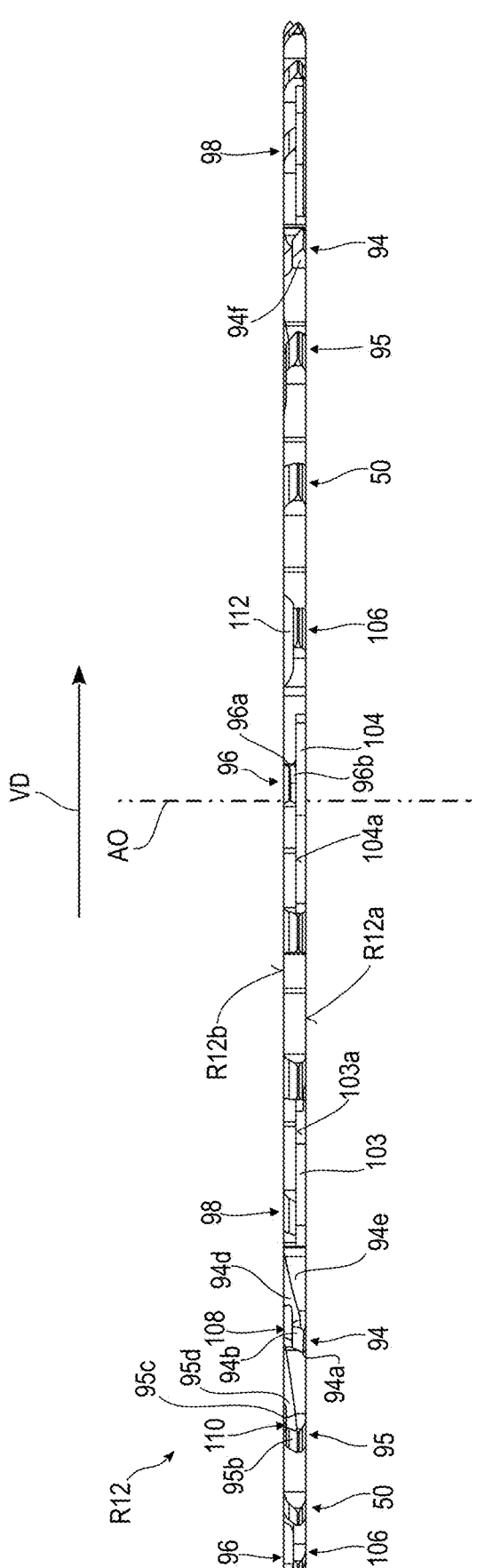
FIG. 13 is a schematic view of the circumference of the largest pinion with a direction of view orthogonal to the assembly axis of the pinion assembly, along the arrow XIII in FIG. 8

In FIGS. 11 and 13, only the largest pinion R12 is illustrated in each case.

The following description of the pinions R11 and R12 refers to all of FIGS. 8 to 13, in which these pinions are illustrated.

On the largest pinion R12, first shifting gates 101 for a first shifting operation, in which the chain 10 is shifted from the smaller pinion R11 as the starting chain wheel onto the larger pinion R12 as the target chain wheel, can be seen primarily through, planar, preparation recesses 103 on the side R12a, facing the starting chain wheel R11, of the target chain wheel R12. Second shifting gates 102 for a second shifting operation, in which the chain 10, compared with the first shifting operation, is shifted in the opposite direction from the larger pinion R12 as the starting chain wheel onto the smaller chain wheel R11 as the target chain wheel, can be seen primarily through, planar, deflector recesses 104 on the side R12a, facing the target chain wheel R11, of the starting chain wheel R11. Since the difference in the number of teeth between the largest pinion R12 and the second largest pinion R11 amounts to four teeth (32 teeth minus 28 teeth), at most four first shifting gates 101 and four second shifting gates 102 can be formed on the larger pinion R12. As large a number of shifting gates as possible increases the shifting comfort for the bicycle rider, since the latter, on actuating the chain shifter 91 at the bicycle pinion assembly 86, has at most to wait for the reaching of chain engagement of the starting chain wheel in the region of the next shifting gate. For this reason, the maximum number of first and/or second shifting gates 101 and 102, respectively, in each case is formed at each pinion R12 to R2 on the bicycle pinion assembly 86. Since the first and the second shifting gates 101 and 102, respectively, are always formed on the larger of two pinions that are immediately adjacent in the sequential direction FR and there is not a smaller pinion adjacent to the pinion R1, no shifting gates are formed on the pinion R1.

The preparation recesses 103 are directly ahead, in the forward-travel direction of rotation VD, of a catching tooth 94 which, during a first shifting operation, engages as first tooth of the target chain wheel R12 in a tooth engagement space 46 of a chain link 12 of the bicycle chain 10.

The deflector recesses 104 of the second shifting gates 102 are located directly at the circumferential position of a deflector tooth 96 which, during a second shifting operation from the pinion R12 as the starting chain wheel to the pinion R11 as the target chain wheel, no longer engages, as first tooth of the pinion R12, in a tooth engagement space 46 of a chain link 12 of the bicycle chain 10. The deflector recess 104 effectively offsets the deflector tooth 96 axially along the assembly axis AO away from the target chain wheel.

As can be seen in FIG. 8, the catching teeth 94 and thus the first shifting gates 101 are distributed equidistantly in the circumferential direction about the assembly axis AO, i.e. starting from a first catching tooth 94, each further eighth tooth in the circumferential direction is another catching tooth. The spacing of the catching teeth 94 results from the total number of teeth of the pinion R12 divided by the number of first shifting gates 101.

Likewise, the second shifting gates 102 are arranged in a manner distributed equidistantly in the circumferential direction about the assembly axis AO. This again means that, starting from any desired chosen first deflector tooth 96, every further eighth tooth in the circumferential direction is likewise a deflector tooth 96. By contrast, the first shifting gates 101 and the second shifting gates 102 are not spaced apart equidistantly from one another.

The preparation recesses 103, which allow the chain 10 to approach the pinion R12, which is the target chain wheel in the first shifting operation, to a greater axial extent, i.e. along the assembly axis AO, during the first shifting operation, are formed on a preparation tooth 98. The preparation tooth 98 is directly ahead of the catching tooth 94, which it supports, in the forward-travel direction of rotation VD.

A tooth that is directly ahead of the deflector tooth 96 in the forward-travel direction of rotation VD has, as supporting tooth 106 on its side that faces away from the pinion R11 as the target chain wheel of the second shifting operation and faces away from the viewer of FIG. 8, a supporting recess 112, in order, on shifting the chain from the pinion R12 to the pinion R11, to allow the chain 10 to axially approach the target chain wheel of the second shifting operation and thus to reduce cross-chaining of the bicycle chain 10 during the second shifting operation.

It is apparent from FIG. 10 how the chain 10, indicated by its chain rollers 34 and the longitudinal chain path LB connecting the chain roller axes KR together, is shifted from the smaller pinion R11 as the starting chain wheel, in a first shifting operation, onto the larger pinion R12 as the target chain wheel by the derailleur (not illustrated in FIG. 10). The preparation recess 103 in the region of the preparation tooth 98 allows the chain 10 to axially approach the pinion R12 further than only as far as the undisturbed outer surface R12a of the pinion R12. The chain link located in the region of the preparation recess 103 during the first shifting operation bears axially on the side of the preparation tooth 98. The catching tooth 94 is the first tooth in the shifting gate 101 of the larger pinion R12 that engages in a tooth intermediate space of a chain link 12 of the chain 10. All the teeth that follow the catching tooth 94 counter to the forward-travel direction of rotation VD then likewise engage in tooth intermediate spaces of chain links of the chain 10.

In FIG. 13, to the left of the centre of the illustrated circumference of the pinion R12, the preparation recess 103 with its planar recess surface 103a, facing the smaller pinion R11, is illustrated. It is apparent how the preparation tooth 98, located entirely in the region of the preparation recess 103 in the illustrated exemplary embodiment, has a smaller axial width compared with a conventional standard tooth 50. The recess surface 103a may be formed in a manner inclined with respect to the assembly axis AO or orthogonally to the latter. In the case of an inclination, the depth of the recess surface 103a increases in the circumferential direction towards the catching tooth, such that the inclination of the recess surface 103a corresponds qualitatively to the inclination of the bicycle chain 10 shifted from the smaller pinion R11 to the larger pinion R12.

The edge 103b of the preparation recess 103 extends in the circumferential direction about the assembly axis AO depending on the circumferential location at a different radial distance from the assembly axis AO. The basic concept is that the edge 103b follows the course of the chain 10 during the first shifting operation, such that, during the first shifting operation, there is no collision, preventing shifting, between the pinion R12 and the chain 10. In an embodiment, an edge 103b follows the contour of a chain plate longitudinal edge 44 on an engagement side of the chain plate, bearing on a preparation tooth 98 or arranged in a preparation recess 103, of a chain 10, such that the chain 10, during the first shifting operation, can be supported physically on the edge 103b by the chain plate longitudinal edge 44.

The edge 103b extends, starting from the tooth 99 that is directly ahead of the preparation tooth 98 in the forward-travel direction of rotation VD, initially steeply towards the assembly axis AO, then reaches, in the circumferential region of the tooth intermediate space between the preparation tooth 98 and the tooth 99 directly ahead, a location closest to the assembly axis AO, as long as material of the pinion R12 is present in this region on account of the lightweight construction, and rises, from this closest location, on continuing to travel counter to the forward-travel direction of rotation, into the circumferential region of the tooth intermediate space between the catching tooth 94 and the preparation tooth 98 towards the radial boundary surface of this tooth intermediate space.

In FIG. 13 and also in FIG. 12, a catching recess 108 is formed on the side R12b, facing away from the target chain wheel R11, of the pinion R12 in the region of the radially outer half of the catching tooth 94. The catching tooth 94 has, on its side R12b facing away from the pinion R11, a catching bevel 94b, which extends radially inwards from its meshing line 94a and which extends both in the radial direction and in the axial direction. The catching bevel 94b delimits, as an outer surface portion of the catching tooth 94, a region, located radially further out, of the catching recess 108. The catching bevel 94b is adjoined, radially on the inside, i.e. on the side facing the assembly axis AO, by a second outer surface portion 94c, which, compared with the catching bevel 94b, extends much more in the radial direction and much less in the axial direction than the catching bevel 94b. The second outer surface portion 94c also delimits a region of the catching recess 108.

FIG. 13 shows how, compared with a standard tooth 50, a considerable displacement of the meshing line 94a of the catching tooth 94 towards the starting chain wheel R11 of a first shifting operation is brought about by the catching tooth 94b and the second outer surface portion 94c. This makes it easier for the catching tooth 94 to be inserted into a tooth engagement space 46 of a chain link 12 of the chain 10 during the first shifting operation.

FIG. 12 also shows how a tooth 95, directly trailing the catching tooth 94 with respect to the forward-travel direction of rotation VD, can have, on the side R12b facing away from the starting chain wheel R11, an auxiliary recess 110 which helps to reduce cross-chaining of the chain 10 during a first shifting operation. A slightly less inclined position of the chain 10 then suffices, in order that the catching tooth 94 can engage in the tooth engagement space 46 of a chain link 12 of the chain 10, than if the tooth 95 directly trailing the catching tooth 94 were in the form of a standard tooth 50 without an auxiliary recess 110. For reasons of greater clarity, in FIG. 12, the auxiliary recess 110 is illustrated at a different first shifting gate than the catching recess 108. The auxiliary recess 110 may also be delimited in a radially outer region by a bevel 95b as a first outer surface region of the tooth 95 and in a radially inner region by a second outer surface region 95c that extends more radially and less axially than the bevel 95b, wherein the auxiliary recess 110 projects axially less deeply into the tooth 95 than the catching recess 108 projects into the catching tooth 94. The auxiliary recess 110 extends in the circumferential direction over the entire tooth bearing it, as does the catching recess 108. While the catching recess 108 on the catching tooth 94 can be formed slightly closer to the assembly axis AO on the circumferential side leading in the forward-travel direction of rotation VD than on the circumferential side trailing with respect to the forward-travel direction of rotation VD, this is the reverse for the auxiliary recess 110 on the tooth 95 directly trailing the catching tooth 94.

The catching tooth 94 extends radially less far away from the assembly axis AO than the other teeth of the pinion R12.

FIG. 10 shows, away from the chain course of the first shifting operation, counter to the forward-travel direction of rotation VD, a course of the chain 10 during a second shifting operation, in which the chain 10 is shifted from the larger pinion R12 as the starting chain wheel to the smaller pinion R11 as the target chain wheel. As a result of the deflector recess 104, the chain link 12 located in the circumferential region of the deflector tooth 96 can axially pass the deflector tooth 96 on the side R12a facing the pinion R11 when the chain 10 is shifted onto the pinion R11. All the teeth, ahead of the deflector tooth 96 in the forward-travel direction of rotation VD during the second shifting operation, of an engagement section are engaged with the tooth engagement spaces 46 of the chain links 12 of the chain 10.

As a result of its shape, the deflector recess 104 supports the radial approaching of the smaller pinion R11 by the chain 10. The recess surface 104a facing the smaller pinion R11 is planar and may, qualitatively following the axial course of the chain 10 during the second shifting operation, be arranged in the circumferential direction so as to be inclined about a radius line as inclination axis such that the recess surface 104a approaches the pinion R11, as the target chain wheel of the second shifting operation, in the opposite direction to the forward-travel direction of rotation VD.

FIG. 13 shows how the deflector recess 104 brings about an increased axial distance of the deflector tooth 96 from the pinion R11 compared with teeth without a recess. A bevel 96b, formed on the side R12a facing the target chain wheel R11 of the second shifting operation, on the tooth tip of the deflector tooth 96 brings about an even greater displacement of the meshing line 96a of the deflector tooth 96 away from the target chain wheel R11, this further supporting an axial movement of the chain 10 past the deflector tooth 96 during a second shifting operation.

For the edge 104b of the deflector recess 104, what was stated above for the edge 103b of the preparation recess 103 applies qualitatively in a corresponding manner: the edge 104b qualitatively follows the course of the chain 10 during the second shifting operation in the second shifting gates 102 and is designed to follow the contour of the chain plate longitudinal edge 44 on the engagement side of the chain plate bearing on the deflector tooth 96 and arranged in the deflector recess 104, such that the chain plate can be physically supported, with its chain plate longitudinal edge 44 on the engagement side, on the edge 104b of the deflector recess 104.

The edge 104b of the deflector recess 104 begins, in the illustrated exemplary embodiment, in the circumferential region of the point, located closest to the assembly axis AO, of the tooth intermediate space directly ahead of the deflector tooth 96 in the forward-travel direction of rotation VD, and extends from there in the circumferential direction, counter to the forward-travel direction of rotation VD, radially approaching the assembly axis AO. In the circumferential region of the point, located closest to the assembly axis AO, of the tooth intermediate space that directly trails the deflector tooth 96 with respect to the forward-travel direction of rotation VD, the deflector recess 104 comes closest to the assembly axis AO and then rises, on travelling further counter to the forward-travel direction of rotation VD, radially steeply in the region of the closest flank of the tooth directly following counter to the forward-travel direction of rotation VD, as far as the outer surface of the pinion R12.

It is apparent from FIG. 12 that, on the side R12b, facing away from the pinion R11 as the target chain wheel of the second shifting operation, of the supporting tooth 106 that is directly ahead of the deflector tooth 96 in the forward-travel direction of rotation VD, a supporting recess 112 is formed, which reduces the axial thickness of the supporting tooth 106 and thus allows the chain 10 guided on the pinion R12 to approach the pinion R11 as the target chain wheel of the second shifting operation. The supporting recess 112 reduces the cross-chaining of the chain 10 during the second shifting operation, since the inclined position of the chain 10 can be realized over a greater circumferential area than would be the case without the supporting recess 112. The supporting recess 112 has, for the second shifting operation, substantially the same effect as the auxiliary recess 110 has for the first shifting operation.

What was stated above for the two largest pinions R11 and R12 applies in a corresponding manner to the further pairings of pinions of different sizes that are axially immediately adjacent to one another. As the difference in the number of teeth between the larger and the smaller pinion of a shifting operation pairing decreases, the number of maximally possible shifting gates decreases. Furthermore, the size of the described recesses at the functional teeth of first and second shifting gates on smaller pinions may be smaller than explained herein for the pinion R12.

Figure 14:
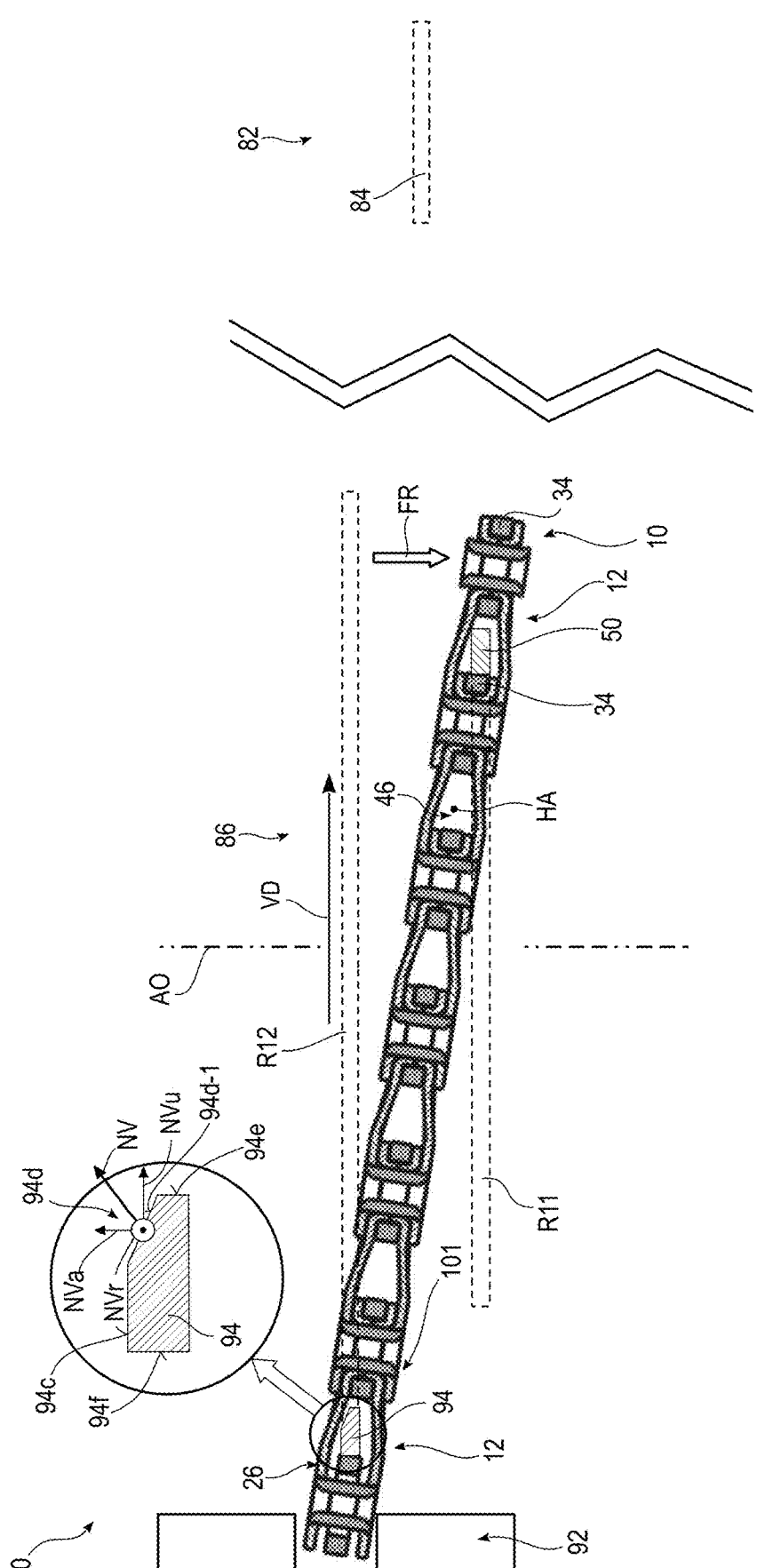
FIG. 14 is a schematic illustration of a first shifting operation of the bicycle chain in FIGS. 1 to 4 on a bicycle pinion assembly of a bicycle rear wheel.

FIG. 14 illustrates in a schematic manner, for further illustration, an operating situation of the drive assembly 80 during a first shifting operation. There, the bicycle drive assembly 80 is illustrated in a schematic manner, as was described above in conjunction with FIG. 15 and with further figures. Of the bicycle pinion assembly 86, for greater clarity, only the second largest chain pinion R11 and the largest chain pinion R12 are shown, which rotate about the common assembly axis AO. The assembly axis AQ of the chainring assembly 82 is not illustrated in FIG. 14. It extends, as customary, parallel to the assembly axis AO of the bicycle pinion assembly 86. The chain wheel tooth 50 already indicated in FIG. 4 is intended to be a standard tooth 50 of the smaller chain pinion R11. The spacing of the chain wheel assemblies 82 and 86 from one another is illustrated in a greatly reduced manner in FIG. 14.

The circulating bicycle chain 10, illustrated in accordance with the sectional illustration in FIG. 4, is shifted, in FIG. 14, by the derailleur 92 from the plane, orthogonal both to the drawing plane of FIG. 14 and to the assembly axis AO, of the smaller chain pinion R1 as the starting chain pinion R11, with which the bicycle chain 10 is initially engaged, to the plane, orthogonal both to the drawing plane of FIG. 14 and to the assembly axis AO, of the larger chain pinion R12 as the target chain pinion R12, with which the bicycle chain 10 is intended to be engaged after the shifting operation. For the description of the bicycle chain 10 in FIG. 14, reference is made to the description of FIG. 4 and of FIGS. 1 to 3 that are associated therewith.

According to the above description, the target chain wheel R12 has, in the currently active first shifting gate 101 of the target chain pinion R12, exactly one catching tooth 94. A schematic cross section of the catching tooth 94 in a section plane orthogonal to a radius line through the catching tooth 94 is illustrated in an enlarged manner in the magnification shown in FIG. 14. The catching tooth 94 is designed, as the first chain wheel tooth of the target chain pinion R12, to engage the bicycle chain 10 shifted to the target chain pinion R12. The formation of the catching tooth 94 as a catching tooth is based, inter alia, on a sliding bevel 94d (see also FIG. 12) which is intended to facilitate entry into a tooth engagement space 46. In the portion depicted in FIG. 14, the sliding bevel 94d is formed between the second outer surface portion 94c facing away from the starting chain pinion R11 and the unloaded flank 94e leading in the forward-travel direction of rotation VD. The flank 94f which is opposite the flank 94e in the circumferential direction, which is a load-bearing flank in the present case and which trails in the forward-travel direction of rotation VD is formed in a wider manner, to achieve a greater load-bearing capacity, than the leading unloaded flank 94e.

The surface 94d-1 of the sliding bevel 94d is inclined in such a way that its normal vector NV has three non-zero Cartesian vector components, of which the axial vector component NVa is directed away from the starting chain pinion R11, the radial vector component NVr is directed away from the common assembly axis AO of the bicycle pinion assembly 86, and the vector component NVu extending in the circumferential direction is directed away from the trailing load-bearing flank 94f. The surface 94d-1 of the sliding bevel 94d extends over a certain radial height of the catching tooth 94 radially outwardly as far as the tooth tip or as far as the catching bevel 94b and radially inwardly at least as far as the central circumferential third of the tooth intermediate space directly trailing the catching tooth (see FIG. 12).

As can be seen from the engagement situation, illustrated in FIG. 14, of the catching tooth 94, the sliding bevel 94d allows an inclined position, supporting the first shifting operation, of the bicycle chain 10, such that the latter can run from the pinion R11 to the pinion R12 and can run onto the pinion R12 along the first shifting gate 101. The chain plate 26 that is axially directly opposite the sliding bevel 94d can, during the first shifting operation, bear on the sliding bevel 94d, in order to establish a form-fitting engagement of the catching tooth 94 with the tooth engagement space 46, and slide along said sliding bevel radially in the direction of the assembly axis AO. Such sliding contact engagement does not have to exist, however.

As FIG. 12 shows, the tooth 95 that is immediately adjacent to the catching tooth 94 counter to the forward-travel direction of rotation VD can have, on its side facing away from the starting pinion R11, on its leading flank in the forward-travel direction of rotation VD, a further sliding bevel 95d which is designed substantially like the sliding bevel 94d. What was stated above in relation to the design of the sliding bevel 94d also applies, mutatis mutandis, to the further sliding bevel 95d of the tooth 95.

In the embodiment in FIG. 14, the chain links 12 are arranged in the bicycle chain 10 in such a way that, during a circulating movement of the bicycle chain 10 circulating in a closed manner for forward travel, i.e., in FIG. 14, a movement of the bicycle chain 10 from the left-hand edge to the right-hand edge of FIG. 14, the narrower longitudinal end 20 of each chain link 12 leads and the wider longitudinal end 18 trails.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment.

Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of stream-lining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A bicycle chain comprising:
a plurality of chain links that follow one another along a virtual longitudinal chain path, wherein chain links that immediately follow one another along the longitudinal chain path are pivotable relative to one another about mutually parallel virtual pivot axes, wherein the pivot axes extend along a virtual transverse chain axis ori-ented transversely to the longitudinal chain path, wherein the two pivot axes of a chain link that are spaced apart from one another along the longitudinal chain path define a virtual reference plane, containing the pivot axes, for the chain link, wherein each chain link has two flat chain plates that are formed separately from one another and are located opposite one another along the transverse chain axis, wherein the chain plates have their greatest dimensions along the longi-tudinal chain path and along a vertical chain axis that extends both transversely to the longitudinal chain path and transversely to the transverse chain axis, wherein the chain plates are formed and arranged in an offset manner along the longitudinal chain path such that each chain link has a wider longitudinal end, along the transverse chain axis, with a larger link width and a narrower longitudinal end, opposite the wider longitu-dinal end along the longitudinal chain path, with a smaller link width, wherein a chain roller is accommo-dated between the chain plates in a narrower longitu-dinal end region located closer to the narrower longi-tudinal end than to the wider longitudinal end, wherein, for chain links that follow one another along the longitudinal chain path, it is the case that in each case a narrower longitudinal end region of a chain link projects into a wider longitudinal end region, located closer to the wider longitudinal end than to the nar-rower longitudinal end, of a chain link that is imme-diately adjacent along the longitudinal chain path, such that the bicycle chain has chain rollers following one another along the longitudinal chain path that are arranged between chain plates of one and the same chain link once in the narrower longitudinal end region thereof and once more in the wider longitudinal end region thereof such that the chain plates of a chain link, together with the two chain rollers arranged between them, enclose a tooth engagement space for the engage-ment of a tooth of a chain wheel assembly, wherein the bicycle chain is configured for shifting between two coaxial chain wheels that are adjacent along the trans-verse chain axis, wherein the tooth engagement space, which is enclosed by the chain plates of a chain link along the transverse chain axis and by the two chain rollers, arranged between the chain plates of the chain link, along the longitudinal chain path, has a trapezoi-dal cross section in the reference plane as section plane.

2. The bicycle chain of claim 1, wherein for a plurality of the chain links, each of the chain plates of a chain link has a first offset region located closer to the wider longitudinal end and a second offset region located closer to the narrower longitudinal end, wherein a clear inner chain link width to be measured between the chain plates along the transverse chain axis decreases on progressing along the longitudinal chain path from the first to the second offset region, wherein the longitudinal spacing of the first and the second offset region from one another along the longitudinal chain path, at least in the chain plate inner surface of a chain plate, differs from the radius of the chain rollers, at least in the virtual reference plane, by no more than 15% relative to the radius of the chain rollers.

3. The bicycle chain of claim 1, wherein both the first offset region and the second offset region of a chain link are located, at least in the reference plane, closer to the narrower longitudinal end region than to the wider longitudinal end region of the chain link.

4. The bicycle chain of claim 1, wherein one component assembly made up of the chain plates of a chain link and the chain roller, arranged in the narrower longitudinal end region, of the chain link projects beyond the respectively other component assembly made up of the chain plates and the chain roller at the narrower longitudinal end along the longitudinal chain path, at least in the reference plane, by no more than 5% of the radius of the chain roller.

5. The bicycle chain of claim 4, wherein for the chain plates of at least a plurality of the chain links, a longitudinal spacing, to be measured along the longitudinal chain path, of the first and the second offset region of a chain plate from one another, at least in the chain plate inner surface, is greater in at least one virtual viewing plane parallel to the reference plane than in the reference plane.

6. The bicycle chain of claim 5, wherein the longitudinal spacing of the first and the second offset region from one another, at least in the chain plate inner surface, is greater in a plurality of virtual viewing planes parallel to the reference plane than in the reference plane, wherein the longitudinal spacing becomes greater with increasing distance of the viewing planes from the reference plane.

7. The bicycle chain of claim 5, wherein at least one offset region from the first and the second offset region, at least in a chain plate inner surface of a chain plate, is formed at least partially in a curved manner, at least on the chain plate portion located on one side of the reference plane.

8. The bicycle chain of claim 7, wherein both offset regions from the first and the second offset region, at least in the chain plate inner surface, are formed at least partially in a curved manner at least on the same chain plate portion between the reference plane and an edge of the chain plate.

9. The bicycle chain of claim 7, wherein at least one partially curved offset region from the first and the second offset region, at least in the chain plate inner surface, is concavely curved as seen from the chain roller axis of rotation of the chain roller located closer to the partially curved offset region, and is convexly curved as seen from the chain roller axis of rotation of the chain roller located farther away from the partially curved offset region.

10. The bicycle chain of claim 7, wherein at least one offset region from the first and the second offset region, at least in the chain plate inner surface, is formed at least partially concentrically with the chain roller located closest to the respective offset region.

11. The bicycle chain of claim 1, wherein for a plurality of the chain links, each of the chain plates of a chain link, on its side facing the chain roller, has a planar surface portion, located in the extension of the chain roller, in the wider longitudinal end region and/or in the narrower longitudinal end region.

12. The bicycle chain of claim 11, wherein the first offset region at least partially delimits the planar surface portion in the wider longitudinal end region, and/or in that the second offset region at least partially delimits the planar surface portion in the narrower longitudinal end region.

13. The bicycle chain of claim 1, wherein for a plurality of the chain links, a pin connects together the wider longitudinal end regions of chain plates, located opposite one another along the transverse chain axis, of the respective chain link, wherein the pin does not protrude, in the wider longitudinal end region of the respective chain link, with respect to the respective chain plate outer surfaces of the chain plates located opposite one another.

14. A bicycle drive assembly comprising, as chain wheel assemblies:

a chainring assembly;

a bicycle pinion assembly arranged at a distance therefrom, wherein the chainring assembly and the bicycle pinion assembly are each rotatable about mutually parallel assembly axes; and a bicycle chain that runs in a closed manner about the assembly axes and, in order to transmit torque from the chainring assembly to the bicycle pinion assembly, is in form-fitting engagement with each of these chain wheel assemblies, wherein the bicycle chain comprises a plurality of chain links that follow one another along a virtual longitudinal chain path, wherein chain links that immediately follow one another along the longitudinal chain path are pivotable relative to one another about mutually parallel virtual pivot axes, wherein the pivot axes extend along a virtual transverse chain axis oriented transversely to the longitudinal chain path, wherein the two pivot axes of a chain link that are spaced apart from one another along the longitudinal chain path define a virtual reference plane, containing the pivot axes, for the chain link, wherein each chain link has two flat chain plates that are formed separately from one another and are located opposite one another along the transverse chain axis, wherein the chain plates have their greatest dimensions along the longitudinal chain path and along a vertical chain axis that extends both transversely to the longitudinal chain path and transversely to the transverse chain axis, wherein the chain plates are formed and arranged in an offset manner along the longitudinal chain path such that each chain link has a wider longitudinal end, along the transverse chain axis, with a larger link width and a narrower longitudinal end, opposite the wider longitudinal end along the longitudinal chain path, with a smaller link width, wherein a chain roller is accommodated between the chain plates in a narrower longitudinal end region located closer to the narrower longitudinal end than to the wider longitudinal end, wherein, for chain links that follow one another along the longitudinal chain path, it is the case that in each case a narrower longitudinal end region of a chain link projects into a wider longitudinal end region, located closer to the wider longitudinal end than to the narrower longitudinal end, of a chain link that is immediately adjacent along the longitudinal chain path, such that the bicycle chain has chain rollers following one another along the longitudinal chain path that are arranged between chain plates of one and the same chain link once in the narrower longitudinal end region thereof and once more in the wider longitudinal end region thereof such that the chain plates of a chain link, together with the two chain rollers arranged between them, enclose a tooth engagement space for the engagement of a tooth of a chain wheel assembly, wherein the bicycle chain is configured for shifting between two coaxial chain wheels that are adjacent along the transverse chain axis; and wherein at least one chain wheel assembly from the chainring assembly and the bicycle pinion assembly has, as a shifting chain wheel assembly, at least two coaxial chain wheels with different numbers of chain wheel teeth, wherein the bicycle drive assembly has a derailleur which is displaceable at least also along the parallel assembly axes, has the bicycle chain passing through it, and is designed, by being displaced along the assembly axis of the shifting chain wheel assembly, to shift the bicycle chain from one of the at least two coaxial chain wheels, with which the bicycle chain is engaged, onto at least another of the at least two coaxial chain wheels, in order to bring the other chain wheel into engagement with the bicycle chain, wherein the tooth engagement space, which is enclosed by the chain plates of a chain link along the transverse chain axis and by the two chain rollers, arranged between the chain plates of the chain link, along the longitudinal chain path, has a trapezoidal cross section in the reference plane as section plane.

15. The bicycle drive assembly of claim 14, wherein the coaxial chain wheels of the shifting chain wheel assembly are arranged in a sequential direction with decreasing numbers of chain wheel teeth, wherein, in order to carry out a first shifting operation from a starting chain wheel with a smaller number of teeth to a target chain wheel, adjacent thereto counter to the sequential direction, with a larger number of teeth, on the target chain wheel at least one tooth, in contrast to a matching tooth shape of a plurality of teeth of the target chain wheel, is in the form of a catching tooth for a first shifting operation.

16. The bicycle drive assembly of claim 15, wherein the bicycle chain is shifted from the starting chain wheel with a smaller number of chain wheel teeth to the adjacent target chain wheel with a larger number of chain wheel teeth only along a first shifting gate, wherein the number of first shifting gates on the target chain wheel is less than or equal to the difference in the number of teeth between the starting chain wheel and the target chain wheel.

17. The bicycle drive assembly of claim 16, wherein each first shifting gate has exactly one catching tooth.

18. The bicycle drive assembly of claim 14, wherein the catching tooth has, on its tooth side facing away from the starting chain wheel, a bevel which is formed in an inclined manner such that the normal vector thereof has a circumferential vector component in the direction away from the load flank of the tooth, an axial vector component parallel to the assembly axis of the shifting chain wheel assembly in the direction away from the starting chain wheel, and a radial vector component in the direction away from the assembly axis of the shifting chain wheel assembly.

19. The bicycle drive assembly of claim 14, wherein the coaxial chain wheels of the shifting chain wheel assembly are arranged in a sequential direction with decreasing numbers of chain wheel teeth, wherein, to carry out a second shifting operation from a starting chain wheel with a larger number of teeth to a target chain wheel, adjacent thereto in the sequential direction, with a smaller number of teeth, on the starting chain wheel at least one tooth, in contrast to a matching tooth shape of a plurality of teeth of the starting chain wheel, is in the form of a deflector tooth for the second shifting operation.

20. The bicycle drive assembly of claim 19, wherein the bicycle chain is shifted from the starting chain wheel with a larger number of chain wheel teeth to the adjacent target chain wheel with a smaller number of chain wheel teeth only along a second shifting gate, wherein the number of second shifting gates on the starting chain wheel is less than or equal to the difference in the number of teeth between the starting chain wheel and the target chain wheel.

21. The bicycle drive assembly of claim 20, wherein second shifting gate has exactly one deflector tooth.

22. The bicycle drive assembly of claim 14, wherein when the bicycle chain is moved in a direction of circulation that drives forward travel, the narrower longitudinal end of a chain link leads and the wider longitudinal end trails.

23. A bicycle chain comprising:
a plurality of chain links that follow one another along a virtual longitudinal chain path, wherein chain links that immediately follow one another along the longitudinal chain path are pivotable relative to one another about mutually parallel virtual pivot axes,
wherein the pivot axes extend along a virtual transverse chain axis oriented transversely to the longitudinal chain path,
wherein the two pivot axes of a chain link that are spaced apart from one another along the longitudinal chain path define a virtual reference plane, containing the pivot axes, for the chain link,
wherein each chain link has two flat chain plates that are formed separately from one another and are located opposite one another along the transverse chain axis,
wherein the chain plates have their greatest dimensions along the longitudinal chain path and along a vertical chain axis that extends both transversely to the longitudinal chain path and transversely to the transverse chain axis,
wherein the chain plates are formed and arranged in an offset manner along the longitudinal chain path such that each chain link has a wider longitudinal end, along the transverse chain axis, with a larger link width and a narrower longitudinal end, opposite the wider longitudinal end along the longitudinal chain path, with a smaller link width,
wherein a chain roller is accommodated between the chain plates in a narrower longitudinal end region located closer to the narrower longitudinal end than to the wider longitudinal end,
wherein, for chain links that follow one another along the longitudinal chain path, it is the case that in each case a narrower longitudinal end region of a chain link projects into a wider longitudinal end region, located closer to the wider longitudinal end than to the narrower longitudinal end, of a chain link that is immediately adjacent along the longitudinal chain path, such that the bicycle chain has chain rollers following one another along the longitudinal chain path that are arranged between chain plates of one and the same chain link once in the narrower longitudinal end region thereof and once more in the wider longitudinal end region thereof such that the chain plates of a chain link, together with the two chain rollers arranged between them, enclose a tooth engagement space for the engagement of a tooth of a chain wheel assembly,
wherein the bicycle chain is configured for shifting between two coaxial chain wheels that are adjacent along the transverse chain axis,
wherein each chain plate includes a rectilinear upper longitudinal edge and a convex lower longitudinal edge, the convex lower longitudinal edge being opposite the rectilinear upper longitudinal edge.

24. The bicycle chain of claim 23, wherein each chain plate comprises a recess extending through each of the chain plates in the thickness direction, the recess disposed between the pivot axes and surrounded by material of the chain plate.

\* \* \* \* \*